(12) United States Patent
Funabiki et al.

(10) Patent No.: US 8,427,525 B2
(45) Date of Patent: Apr. 23, 2013

(54) METHOD OF TRANSMITTING VIDEO DATA FOR WIRELESSLY TRANSMITTING THREE-DIMENSIONAL VIDEO DATA

(75) Inventors: Makoto Funabiki, Osaka (JP); Akihiro Tatsuta, Kyoto (JP); Hiroshi Ohue, Osaka (JP); Hiroshi Mitani, Osaka (JP); Toshiroh Nishio, Osaka (JP)

(73) Assignee: Panasonic Corporation, Osaka (JP)

( * ) Notice: Subject to any disclaimer, the term of this patent is extended or adjusted under 35 U.S.C. 154(b) by 695 days.

(21) Appl. No.: 12/648,376

(22) Filed: Dec. 29, 2009

(65) Prior Publication Data

US 2010/0289872 A1    Nov. 18, 2010

Related U.S. Application Data

(60) Provisional application No. 61/178,219, filed on May 14, 2009.

(30) Foreign Application Priority Data

May 22, 2009    (JP) ................................. 2009-124344

(51) Int. Cl.
*H04N 15/00* (2006.01)
(52) U.S. Cl.
USPC ........................................................... 348/43
(58) Field of Classification Search .............. 348/42–50; 382/154
See application file for complete search history.

(56) References Cited

U.S. PATENT DOCUMENTS

| | | | |
|---|---|---|---|
| 2002/0030675 A1* | 3/2002 | Kawai | 345/204 |
| 2007/0296859 A1* | 12/2007 | Suzuki | 348/473 |
| 2008/0320539 A1 | 12/2008 | Ohkita | |
| 2009/0031365 A1 | 1/2009 | Kwon et al. | |

FOREIGN PATENT DOCUMENTS

| | | |
|---|---|---|
| EP | 2 096 796 | 9/2009 |
| JP | 2002-95018 | 3/2002 |
| JP | 2007-336518 | 12/2007 |
| JP | 2008-252929 | 10/2008 |
| JP | 2009-4877 | 1/2009 |

OTHER PUBLICATIONS

International Search Report issued Apr. 6, 2010 in International (PCT) Application No. PCT/JP2009/007269.
International Preliminary Report on Patentability issued Dec. 22, 2011 in International (PCT) Application No. PCT/JP2009/007269.
WirelessHD Specification Version 1.0 Overview, Oct. 9, 2007, pp. 1-77.

\* cited by examiner

*Primary Examiner* — Sath V Perungavoor
*Assistant Examiner* — Alisha V Acoff
(74) *Attorney, Agent, or Firm* — Wenderoth, Lind & Ponack, L.L.P.

(57) ABSTRACT

A sink device transmits a video information message to the source device, the video information message including video format information identifiers for identifying video formats supported by the sink device, which are selected from among a plurality of video format information identifiers for identifying video formats each including a resolution of the video data and a type of the video data, and a three-dimensional transmission method for three-dimensional video data when the type of the video data is the three-dimensional video data including first and second video frame data.

4 Claims, 42 Drawing Sheets

Fig.5

| TYPE OF DEVICE CAPABILITY REQUESTED USING REQUEST TYPE FIELD 12 |
|---|
| DEVICE INFORMATION |
| DEVICE NAME |
| MAC ADDRESS |
| INPUT FORMAT INFORMATION |
| VENDOR DEFINITION |

Fig.10

| VALUE STORED IN FORMAT TYPE FIELD 55 | FORMAT TYPE |
|---|---|
| 0x01 | VIDEO INFORMATION (VIDEO_INFO) |
| 0x02 | AUDIO INFORMATION (AUDIO_INFO) |
| 0x03 | SPEAKER ALLOCATION INFORMATION (SPEAKER_ALLOCATION) |
| 0x04 | DETAILED TIMING INFORMATION (DETAILED_TIMING_INFO) |
| 0x05 | MAXIMUM VIDEO BUFFER INFORMATION (MAX_VIDEO_BUFFER) |
| 0x06 | MAXIMUM AUDIO BUFFER INFORMATION (MAX_AUDIO_BUFFER) |
| 0x07 | THREE-DIMENSIONAL INFORMATION (3D_INFO) |
| 0x08-0xFF | RESERVED |

Fig.22

| VIDEO FORMAT IDENTIFICATION CODE (VIC) | FORMAT (OUTPUT SPECIFICATIONS) | FIELD RATE (Hz) | REMARKS |
|---|---|---|---|
| 1 | 640x480p | 59.94/60 | 2D |
| 2 | 720x480p | 59.94/60 | 2D |
| 3 | 1280x720p | 59.94/60 | 2D |
| 4 | 1920x1080i | 59.94/60 | 2D |
| 5 | 720(1440)x480i | 59.94/60 | 2D (PIXEL REPLICATION) |
| 6 | 720(1440)x240p | 59.94/60 | 2D (PIXEL REPLICATION) |
| 7 | 2880x480i | 59.94/60 | 2D (PIXEL REPLICATION) |
| 8 | 2880x240p | 59.94/60 | 2D (PIXEL REPLICATION) |
| 9 | 1440x480p | 59.94/60 | 2D (PIXEL REPLICATION) |
| 10 | 1920x1080p | 59.94/60 | 2D |
| 11 | 720x576p | 50 | 2D |
| 12 | 1280x720p | 50 | 2D |
| 13 | 1920x1080i | 50 | 2D |
| 14 | 720(1440)x576i | 50 | 2D (PIXEL REPLICATION) |
| 15 | 720(1440)x288p | 50 | 2D (PIXEL REPLICATION) |
| 16 | 2880x576i | 50 | 2D (PIXEL REPLICATION) |
| 17 | 2880x288p | 50 | 2D (PIXEL REPLICATION) |
| 18 | 1440x576p | 50 | 2D (PIXEL REPLICATION) |
| 19 | 1920x1080p | 50 | 2D |
| 20 | 1920x1080p | 23.97/24 | 2D |
| 21 | 1920x1080p | 25 | 2D |
| 22 | 1920x1080p | 29.97/30 | 2D |
| 23 | 2880x480p | 59.94/60 | 2D (PIXEL REPLICATION) |
| 24 | 2880x576p | 50 | 2D (PIXEL REPLICATION) |
| 25 | 1920x1080i(1250total) | 50 | 2D |
| 26 | 1920x1080i | 100 | 2D |
| 27 | 1280x720p | 100 | 2D |
| 28 | 720x576p | 100 | 2D |

Fig.23

| VIDEO FORMAT IDENTIFICATION CODE (VIC) | FORMAT (OUTPUT SPECIFICATIONS) | FIELD RATE (Hz) | REMARKS |
|---|---|---|---|
| 29 | 720(1440)x576i | 100 | 2D (PIXEL REPLICATION) |
| 30 | 1920x1080i | 119.88/120 | 2D |
| 31 | 1280x720p | 119.88/120 | 2D |
| 32 | 720x480p | 119.88/120 | 2D |
| 33 | 720(1440)x480i | 119.88/120 | 2D (PIXEL REPLICATION) |
| 34 | 720X576p | 200 | 2D |
| 35 | 720(1440)x576i | 200 | 2D (PIXEL REPLICATION) |
| 36 | 720x480p | 239.76/240 | 2D |
| 37 | 720(1440)x480i | 239.76/240 | 2D (PIXEL REPLICATION) |
| 38 | 1920x1080p | 47.94/48 | 2D |
| 39 | 2560x1440p | 23.97/24 | 2D (QUAD HD) |
| 40 | 2560x1440p | 25 | 2D (QUAD HD) |
| 41 | 2560x1440p | 29.97/30 | 2D (QUAD HD) |
| 42 | 2560x1440p | 50 | 2D (QUAD HD) |
| 43 | 2560x1440p | 59.94/60 | 2D (QUAD HD) |
| 44 | 3840x2160p | 23.97/24 | 2D (QUAD HD) |
| 45 | 3840x2160p | 25 | 2D (QUAD HD) |
| 46 | 3840x2160p | 29.97/30 | 2D (QUAD HD) |
| 47 | 4096x2160p | 23.97/24 | 2D (DIGITAL MOVIE) |
| 48 | 4096x2160p | 25 | 2D (DIGITAL MOVIE) |
| 49 | 1920x1080p | 100 | 2D |
| 50 | 1920x1080p | 119.88/120 | 2D |
| 51-95 | RESERVED | | |
| 96 | 1920x1080p | 23.97/24 | 3D (FRAME SEQUENTIAL) |
| 97 | 1920x1080p | 25 | 3D (FRAME SEQUENTIAL) |
| 98 | 1280x720p | 59.94/60 | 3D (FRAME SEQUENTIAL) |
| 99 | 1280x720p | 50 | 3D (FRAME SEQUENTIAL) |
| 100-127 | RESERVED | | |

Fig.24

| VALUE STORED IN FORMAT TYPE FIELD 55 | FORMAT TYPE |
|---|---|
| 0x01 | VIDEO INFORMATION (VIDEO_INFO) |
| 0x02 | AUDIO INFORMATION (AUDIO_INFO) |
| 0x03 | SPEAKER ALLOCATION INFORMATION (SPEAKER_ALLOCATION) |
| 0x04 | DETAILED TIMING INFORMATION (DETAILED_TIMING_INFO) |
| 0x05 | MAXIMUM VIDEO BUFFER INFORMATION (MAX_VIDEO_BUFFER) |
| 0x06 | MAXIMUM AUDIO BUFFER INFORMATION (MAX_AUDIO_BUFFER) |
| 0x07 | CODED VIDEO INFORMATION (CODEO_VIDEO_INFO) |
| 0x08-0xFF | RESERVED |

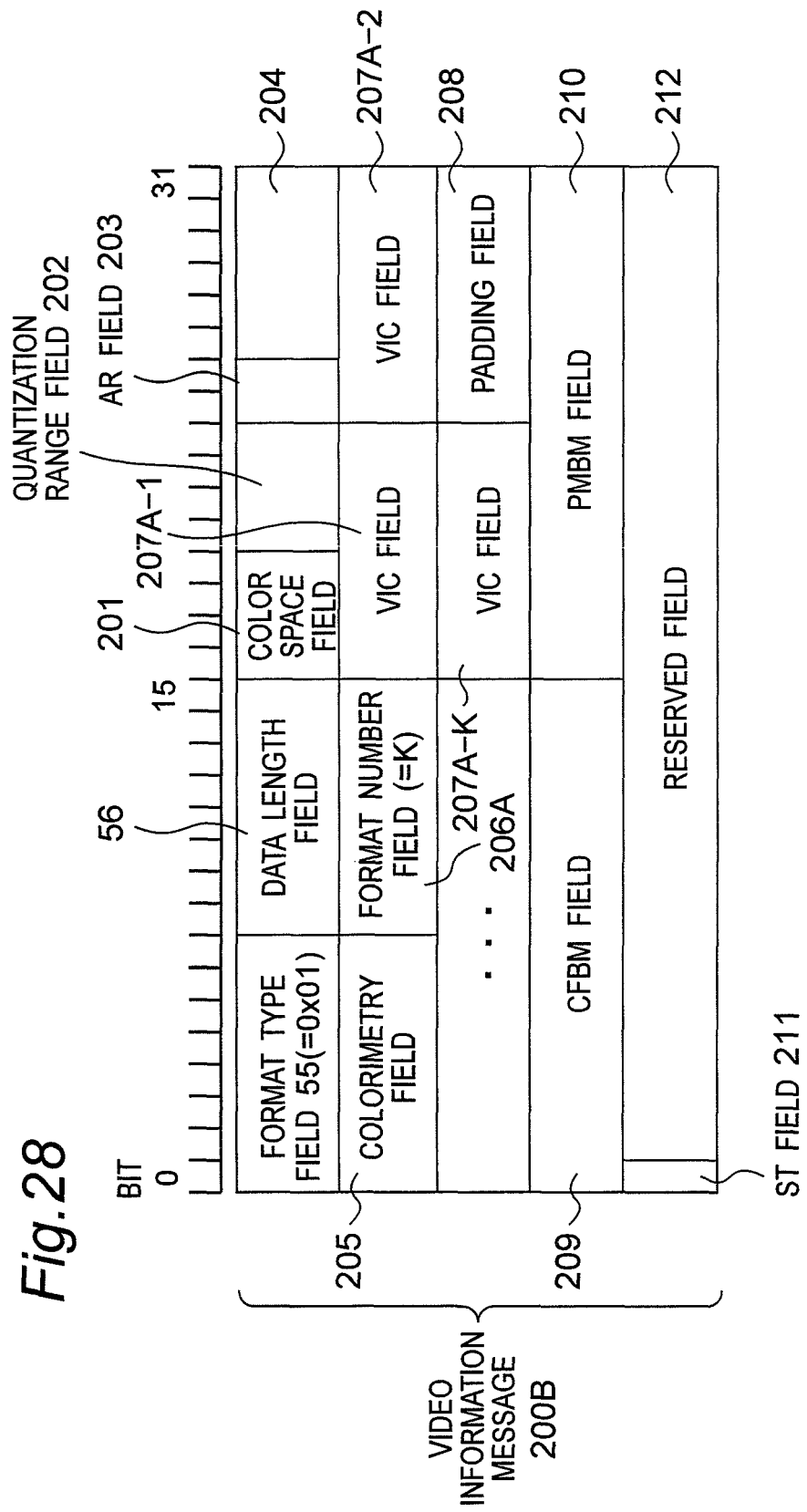

Fig.29

| VALUE STORED IN FORMAT TYPE FIELD 55 | FORMAT TYPE |
|---|---|
| 0x01 | VIDEO INFORMATION (VIDEO_INFO) |
| 0x02 | AUDIO INFORMATION (AUDIO_INFO) |
| 0x03 | SPEAKER ALLOCATION INFORMATION (SPEAKER_ALLOCATION) |
| 0x04 | DETAILED TIMING INFORMATION (DETAILED_TIMING_INFO) |
| 0x05 | MAXIMUM VIDEO BUFFER INFORMATION (MAX_VIDEO_BUFFER) |
| 0x06 | MAXIMUM AUDIO BUFFER INFORMATION (MAX_AUDIO_BUFFER) |
| 0x07 | CODED VIDEO INFORMATION (CODEO_VIDEO_INFO) |
| 0x08 | EXTENDED VIDEO INFORMATION (EXTENDED_VIDEO_INFO) |
| 0x09-0xFF | RESERVED |

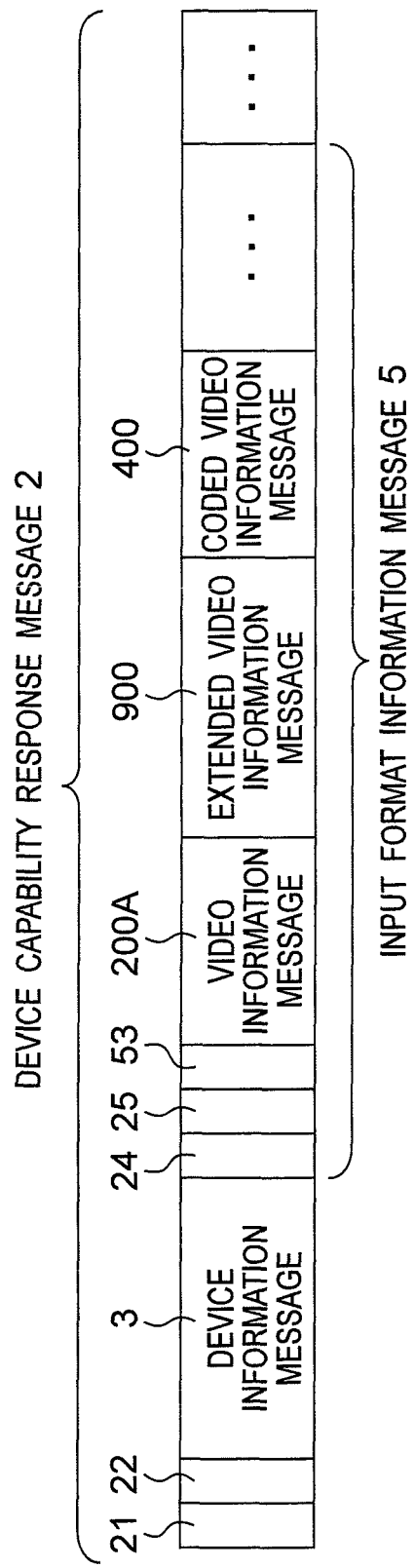

*Fig.33*

| VIDEO FORMAT IDENTIFICATION CODE (VIC) | FORMAT (OUTPUT SPECIFICATIONS) | Hactive (PIXELS) | Hblank (PIXELS) | Vactive (PIXELS) | Vblank (PIXELS) | FIELD RATE (Hz) | PIXEL FREQUENCY (MHz) |
|---|---|---|---|---|---|---|---|
| 96 | 1920x1080p | 1920 | 830 | 1080 | 45 | 23.97 / 24 | 148.352 / 148.5 |
| 97 | 1920x1080p | 1920 | 720 | 1080 | 45 | 25 | 148.5 |
| 98 | 1280x720p | 1280 | 370 | 720 | 30 | 59.94 / 60 | 148.35 / 148.5 |
| 99 | 1280x720p | 1280 | 700 | 720 | 30 | 50 | 148.5 |

Fig.34

| VIDEO FORMAT IDENTIFICATION CODE (VIC) | FORMAT (OUTPUT SPECIFICATIONS) | Hactive (PIXELS) | Hblank (PIXELS) | Vactive (PIXELS) | Vvideo (PIXELS) | Vspace (PIXELS) | Vblank (PIXELS) | FIELD RATE (Hz) | PIXEL FREQUENCY (MHz) |
|---|---|---|---|---|---|---|---|---|---|
| 96 | 1920x1080p | 1920 | 830 | 2205 | 1080 | 45 | 45 | 23.97 / 24 | 148.352 / 148.5 |
| 97 | 1920x1080p | 1920 | 720 | 2205 | 1080 | 45 | 45 | 25 | 148.5 |
| 98 | 1280x720p | 1280 | 370 | 1470 | 720 | 30 | 30 | 59.94 / 60 | 148.35 / 148.5 |
| 99 | 1280x720p | 1280 | 700 | 1470 | 720 | 30 | 30 | 50 | 148.5 |

*Fig.39*

| VALUE STORED IN FORMAT TYPE FIELD 91 | FORMAT TYPE |
|---|---|
| 0x00 | VIDEO FORMAT INFORMATION |
| 0x01 | AUDIO FORMAT INFORMATION |
| 0x02 | GAMUT METADATA (Gamut Metadata) INFORMATION |
| 0x03 | VENDER DEPENDENT INFORMATION |
| 0x04 | DETAILED TIMING INFORMATION |
| 0x05 | MAXIMUM VIDEO BUFFER INFORMATION |
| 0x06 | MAXIMUM AUDIO BUFFER INFORMATION |
| 0x07 | CODED VIDEO INFORMATION |
| 0x08-0xFF | RESERVED |

METHOD OF TRANSMITTING VIDEO DATA FOR WIRELESSLY TRANSMITTING THREE-DIMENSIONAL VIDEO DATA

This application claims the benefit of U.S. Provisional Application No. 61/178,219 filed May 14, 2009.

TECHNICAL FIELD

The present invention relates to a method of transmitting video data, a source device for transmitting the video data, a sink device for receiving the video data, and a wireless communication system including the source device and the sink device. In particular, the present invention relates to a method of transmitting three-dimensional (also referred to as 3D or stereoscopic hereinafter) video data including first and second video frame data such as right-eye video frame data and left-eye video frame data, a source device for transmitting the video data, the sink device for receiving the video data, and a communication system including the source device and the sink device.

BACKGROUND ART

A WirelessHD standard has been drawn up for wirelessly transmitting uncompressed baseband video signals and uncompressed digital audio signals among audio and visual devices (referred to as AV (Audio and Visual) devices hereinafter). The WirelessHD is a technical specification for viewing high-definition moving image data stored in a source device such as a digital video recorder, a set-top box or a personal computer on a sink device such as a high-definition television without connecting the source device to the sink device via a cable. In addition, since control signals are transmitted bi-directionally, it is possible to control a television set and a digital video recorder so as to cooperate with each other, or it is possible to construct a home theater by a plurality of AV devices and control the same AV devices integrally. In addition, protocols for these controls are defined. Further, since it is possible to transmit high-quality contents by the WirelessHD, DTCP (Digital Transmission Content Protection) is defined as a content protection method so that provided contents are not illegally reproduced or illegally replicated. For example, wireless transmission methods compliant with the WirelessHD according to prior art are described in Patent Documents 1 and 2, and a Non-patent Document 1. In addition, methods of wirelessly transmitting AV data according to prior art are described in Patent Documents 3 and 4.

CITATION LIST

Patent Documents

[Patent Document 1] Japanese patent laid-open publication No. JP-2008-252929-A.
[Patent Document 2] Japanese patent laid-open publication No. JP-2009-4877-A.
[Patent Document 3] United States Patent Application Publication No. 2008/0320539 A1.
[Patent Document 4] United States Patent Application Publication No. 2009/0031365A1.
[Patent Document 5] United States Patent Application Publication No. 2002/0030675A1.
[Patent Document 6] Japanese patent laid-open publication No. JP-2002-95018-A.

Non-Patent Documents

[Non-Patent Document 1] WirelessHD Specification Version 1.0 Overview, Oct. 9, 2007.

SUMMARY OF INVENTION

Technical Problem

However, in the WirelessHD according to the prior art, it is assumed that video data is two-dimensional (also referred to as 2D or flat) content data (referred to as two-dimensional data hereinafter) including one frame data. Therefore, when the video data is three-dimensional content data (referred to as three-dimensional data hereinafter) including first and second video frame data such as right-eye video frame data and left-eye video frame data, the source device cannot wirelessly transmit the three-dimensional content data to the sink device such as a 3D television device.

In addition, Patent Documents 5 and 6 disclose methods of transmitting the three-dimensional data. However, the Patent Documents 5 and 6 do not disclose a concrete method of wirelessly transmitting the three-dimensional data using the WirelessHD.

It is an object of the present invention to provide a method of transmitting video data, a source device for transmitting the video data, a sink device for receiving the video data, and a communication system including the source device and the sink device capable of solving the above-mentioned problems, and capable of transmitting the three-dimensional video data including the first and second video frame data such as the right-eye video frame data and left-eye video frame data.

Solution to Problem

A sink device according to a first aspect of the present invention is a sink device for a wireless communication system for wirelessly transmitting video data from a source device to the sink device. The sink device includes first controller means for transmitting a video information message to the source device. The video information message includes video format information identifiers for identifying video formats supported by the sink device, which are selected from among a plurality of video format information identifiers for identifying video formats each including a resolution of the video data and a type of the video data, and a three-dimensional transmission method for three-dimensional video data when the type of the video data is the three-dimensional video data including first and second video frame data.

In the above-mentioned sink device, the video information message further includes data representing whether or not the sink device supports the three-dimensional video data.

In addition, in the above-mentioned sink device, the first controller means transmits an extended video information message including data representing whether or not the sink device supports the three-dimensional video data, to the source device.

Further, in the above-mentioned sink device, the three-dimensional transmission method is information for identifying parameters for combining the first video frame data and the second video frame data into combined video frame data using a predetermined combining method by the source device.

Still further, in the above-mentioned sink device, the resolution of the video data represents a number of vertical active pixels, a number of horizontal active pixels, a scanning method, and a field rate of the video data.

In addition, the above-mentioned sink device further includes first storage means for previously storing:

(1) a 2D detailed timing information table showing a relation between (a) video format information identifiers of two-dimensional video data including third video frame data and (b) parameters for generating two-dimensional video frame data based on the two-dimensional video data for every video frame;

(2) a first 3D detailed timing information table showing a relation between (a) the video format information identifiers of the three-dimensional video data and (b) parameters for combining the first video frame data and the second video frame data into first combined video frame data, which does not include a blanking interval, using a predetermined first combining method for every video frame; and (3) a second 3D detailed timing information table showing a relation between (a) the video format information identifiers of the three-dimensional video data and (b) parameters for combining the first video frame data and the second video frame data into second combined video frame data, which includes the blanking interval, using a predetermined second combining method for every video frame.

Upon receiving the video data from the source device, (a) when the type of the video data is the two-dimensional video data, the first controller means selects the 2D detailed timing information table, (b) when the type of the video data is the three-dimensional video data and the video data is coded, the first controller means selects the first 3D detailed timing information table, and (c) when the type of the video data is the three-dimensional video data and the video data is not coded, the first controller means selects the second 3D detailed timing information table. The first controller means refers to a selected detailed timing information table based on the video format information identifier of the video data so as to decide parameters for decoding the video data, and decodes the video data using decided parameters.

Further, the above-mentioned sink device further includes first storage means for previously storing:

(1) a 2D detailed timing information table showing a relation between (a) video format information identifiers of two-dimensional video data including third video frame data and (b) parameters for generating two-dimensional video frame data based on the two-dimensional video data for every video frame;

(2) a first 3D detailed timing information table showing a relation between (a) the video format information identifiers of the three-dimensional video data and (b) parameters for combining the first video frame data and the second video frame data into first combined video frame data, which does not include a blanking interval, using a predetermined first combining method for every video frame; and (3) a second 3D detailed timing information table showing a relation between (a) the video format information identifiers of the three-dimensional video data and (b) parameters for combining the first video frame data and the second video frame data into second combined video frame data, which includes the blanking interval, using a predetermined second combining method for every video frame, The first controller means receives a device information message including data representing whether or not the source device supports an HDMI (High-Definition Multimedia Interface) pass-through mode specified in WirelessHD from the source device, and identifies whether or not the source device supports the HDMI pass-through mode based on the device information message. Upon receiving the video data from the source device, (a) when the type of the video data is the two-dimensional video data, the first controller means selects the 2D detailed timing information table, (b) when the type of the video data is the three-dimensional video data and the source device does not support the HDMI pass-through mode, the first controller means selects the first 3D detailed timing information table, and (c) when the type of the video data is the three-dimensional video data and the source device supports the HDMI pass-through mode, the first controller means selects the second 3D detailed timing information table. The first controller means refers to a selected detailed timing information table based on the video format information identifier of the video data so as to decide parameters for decoding the video data, and decodes the video data using decided parameters.

A source device according to a second aspect of the present invention is a source device for a wireless communication system for wirelessly transmitting video data from the source device to a sink device. The source device includes second controller means for receiving a video information message from the sink device. The video information message includes video format information identifiers for identifying video formats supported by the sink device, which are selected from among a plurality of video format information identifiers for identifying video formats each including a resolution of the video data and a type of the video data, and a three-dimensional transmission method for three-dimensional video data when the type of the video data is the three-dimensional video data including first and second video frame data. The second controller means selects one video format information identifier of the video format information identifiers included in a received video format message, generates video data having a video format corresponding to a selected video format information identifier, and transmits a generated video data to the sink device.

In the above-mentioned source device, the video information message further includes data representing whether or not the sink device supports the three-dimensional video data.

In addition, in the above-mentioned source device, the second controller means receives an extended video information message including data representing whether or not the sink device supports the three-dimensional video data, from the sink device.

Further, in the above-mentioned source device, the three-dimensional transmission method is information for identifying parameters for combining the first video frame data and the second video frame data into combined video frame data using a predetermined combining method by the source device.

Still further, in the above-mentioned source device, the resolution of the video data represents a number of vertical active pixels, a number of horizontal active pixels, a scanning method, and a field rate of the video data.

In addition, the above-mentioned source device further includes second storage means for previously storing:

(1) a 2D detailed timing information table showing a relation between (a) video format information identifiers of two-dimensional video data including third video frame data and (b) parameters for generating two-dimensional video frame data based on the two-dimensional video data for every video frame;

(2) a first 3D detailed timing information table showing a relation between (a) the video format information identifiers of the three-dimensional video data and (b) parameters for combining the first video frame data and the second video frame data into first combined video frame data, which does not include a blanking interval, using a predetermined first combining method for every video frame; and (3) a second 3D detailed timing information table showing a relation between (a) the video format information identifiers of the three-dimensional video data and (b) parameters for combining the first video frame data and the second video frame data into second combined video frame data, which includes the blanking interval, using a predetermined second combining method for every video frame.

Upon transmitting the video data to the sink device, (a) when the type of the video data is the two-dimensional video data, the second controller means selects the 2D detailed timing information table, (b) when the type of the video data is the three-dimensional video data and the sink device supports coded three-dimensional video data, the second controller means selects the first 3D detailed timing information table, and (c) when the type of the video data is the three-dimensional video data and the sink device does not support the coded three-dimensional video data, the second controller means selects the second 3D detailed timing information table. The second controller means refers to a selected detailed timing information table based on the video format information identifier of the video data so as to decide parameters for generating one of the two-dimensional video frame data, the first combined video frame data and the second combined video frame data based on the video data, generates one of the two-dimensional video frame data, the first combined video frame data and the second combined video frame data based on the video data using decided parameters, and transmits a generated combined data to the sink device.

Further, the above-mentioned source device further includes second storage means for previously storing:

(1) a 2D detailed timing information table showing a relation between (a) video format information identifiers of two-dimensional video data including third video frame data and (b) parameters for generating two-dimensional video frame data based on the two-dimensional video data for every video frame;

(2) a first 3D detailed timing information table showing a relation between (a) the video format information identifiers of the three-dimensional video data and (b) parameters for combining the first video frame data and the second video frame data into first combined video frame data, which does not include a blanking interval, using a predetermined first combining method for every video frame; and (3) a second 3D detailed timing information table showing a relation between (a) the video format information identifiers of the three-dimensional video data and (b) parameters for combining the first video frame data and the second video frame data into second combined video frame data, which includes the blanking interval, using a predetermined second combining method for every video frame.

The second controller means transmits a device information message including data representing whether or not the source device supports an HDMI pass-through mode specified in WirelessHD to the sink device. Upon transmitting the video data to the sink device, (a) when the type of the video data is the two-dimensional video data, the second controller means selects the 2D detailed timing information table, (b) when the type of the video data is the three-dimensional video data and the sink device does not support the HDMI pass-through mode, the second controller means selects the first 3D detailed timing information table, and (c) when the type of the video data is the three-dimensional video data and the sink device supports the HDMI pass-through mode, the second controller means selects the second 3D detailed timing information table. The second controller means refers to a selected detailed timing information table based on the video format information identifier of the video data so as to decide parameters for generating one of the two-dimensional video frame data, the first combined video frame data and the second combined video frame data based on the video data, generates one of the two-dimensional video frame data, the first combined video frame data and the second combined video frame data based on the video data using decided parameters, and transmits a generated combined data to the sink device.

A wireless communication system according to a third aspect of the present invention is a wireless communication system for wirelessly transmitting video data from a source device to a sink device including the above-mentioned source device and the above-mentioned sink device.

A method of transmitting video data according to a fourth aspect of the present invention is a method of transmitting video data for a wireless communication system for wirelessly transmitting the video data from a source device to a sink device, including steps of:

at the sink device, transmitting a video information message to the source device, the video information message including video format information identifiers for identifying video formats supported by the sink device, which are selected from among a plurality of video format information identifiers for identifying video formats each including a resolution of the video data and a type of the video data, and a three-dimensional transmission method for three-dimensional video data when the type of the video data is the three-dimensional video data including first and second video frame data, and at the source device, receiving the video information message including the video format information identifiers from the sink device, selecting one video format information identifier of the video format information identifiers included in a received video format message, generating video data having a video format corresponding to a selected video format information identifier, and transmitting a generated video data to the sink device.

Advantageous Effects of Invention

According to the method of transmitting video data, the source device for transmitting the video data, the sink device for receiving the video data, and the wireless communication system including the source device and the sink device according to the present invention, the sink device transmits the video information message to the source device. In this case, the video information message includes video format information identifiers for identifying video formats supported by the sink device, which are selected from among a plurality of video format information identifiers for identifying video formats each including a resolution of the video data and a type of the video data, and a three-dimensional transmission method for three-dimensional video data when the type of the video data is the three-dimensional video data including first and second video frame data. The source device selects one video format information identifier of the video format information identifiers included in a received video format message, generates video data having a video format corresponding to a selected video format information identifier, and transmits a generated video data to the sink device. Therefore, the source device can transmit the three-dimensional video data to the sink device.

BRIEF DESCRIPTION OF DRAWINGS

FIG. 5 is a table showing types of device capability requested using a request type field 12 of FIG. 4;

FIG. 10 is a table showing relation between values stored in a format type field 55 of FIG. 9 and format types;

FIG. 22 is a table showing a first part of each of VIC (Video format Identification Code) tables 115ta and 127ta of FIG. 21;

FIG. 23 is a table showing a second part of each of the VIC tables 115ta and 127ta;

FIG. 24 is a table showing relation between values stored in the format type field 55 of FIG. 9 and format types;

FIG. 28 is diagram showing a format of a video information message 208B according to a ninth preferred embodiment of the present invention;

FIG. 29 is a table showing relation between values stored in the format type field 55 of FIG. 9 according to a tenth preferred embodiment of the present invention and format types;

FIG. 30 is a diagram showing a format of the device capability response message 2 transmitted by the sink device 120A of FIG. 21 in the tenth preferred embodiment of the present invention;

FIG. 33 is a table showing each of 3D frame sequential detailed timing information tables 115-3d1 and 127-3d1 of FIG. 32;

FIG. 34 is a table showing each of 3D frame sequential detailed timing information tables 115-3d2 and 127-3d2 of FIG. 32;

FIG. 39 is a table showing relation between values stored in a format type field 91 of FIG. 38 and form at types;

DESCRIPTION OF EMBODIMENTS

Figure 1:
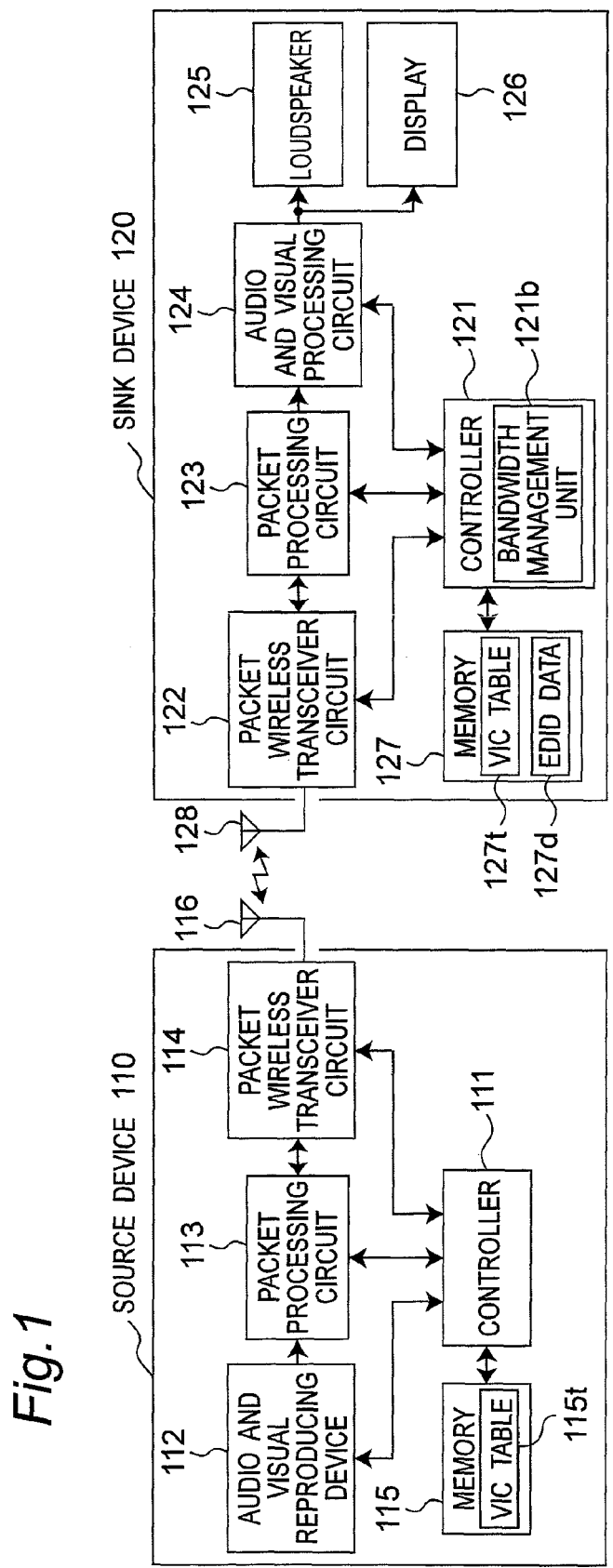
FIG. 1 is a block diagram showing a configuration of a wireless communication system for transmitting video data using a video data packet transmission method according to a first preferred embodiment of the present invention.

Preferred embodiments according to the present invention will be described below with reference to the attached drawings. Components similar to each other are denoted by the same reference numerals and will not be described herein in detail.

First Preferred Embodiment

FIG. 1 is a block diagram showing a configuration of a wireless communication system for transmitting video data using a video data packet transmission method according to a first preferred embodiment of the present invention. Referring to FIG. 1, the wireless communication system according to the present preferred embodiment complies with the WirelessHD. A source device 110 which functions as a source device of AV content data is configured to include an audio and visual reproducing device 112, a packet processing circuit 113, a packet wireless transceiver circuit 114 having an antenna 116, a memory 115 previously storing a VIC table 115t, and a controller 111 for controlling operations of these devices or circuits 112 to 115. The audio and visual reproducing device 112, which is, for example, a DVD player, reproduces video data and audio data from an external storage device or a recording medium such as an MD or a DVD, and outputs the video data and the audio data to the packet processing circuit 113. The packet processing circuit 113 converts the inputted video data and audio data into a digital signal in a predetermined packet form for every video frame, and outputs the digital signal to the packet wireless transceiver circuit 114. Further, the packet processing circuit 113 converts a control message (for example, an output format notify message 10 to be described later in detail) from the controller 111 into a digital signal in a predetermined packet form, and outputs the digital signal to the packet wireless transceiver circuit 114. The packet wireless transceiver circuit 114 digitally modulates a carrier signal according to the inputted digital signal, and wirelessly transmits the modulated wireless signal to a packet wireless transceiver circuit 122 of a sink device 120 via the antenna 116. On the other hand, the packet wireless transceiver circuit 114 receives a wireless signal wirelessly transmitted from the sink device 120 via the antenna 116, demodulates the received wireless signal into a baseband signal, and outputs the baseband signal to the packet processing circuit 113. The packet processing circuit 113 extracts only a predetermined control command from the inputted baseband signal by a predetermined packet separation processing, and thereafter, outputs the control command to the controller 111.

In addition, the sink device 120 is configured to include the packet wireless transceiver circuit 122 including an antenna 128, a packet processing circuit 123, an audio and visual processing circuit 124, a loudspeaker 125, a display 126 for displaying two-dimensional video data and three-dimensional video data, a memory 127 for previously storing EDID (Extended Display Identification Data) data 127d and a VIC table 127t, and a controller 121 for controlling operations of these circuits or the like 122 to 124 and 127. In addition, the controller 121 is configured to include a bandwidth management unit 121b which manages bandwidths used by a wireless network and timing control for signal transmission. The packet wireless transceiver circuit 122 demodulates the wireless signal received via the antenna 128 into a baseband signal, and thereafter, outputs the baseband signal to the packet processing circuit 123. The packet processing circuit 123 decodes the received packets by extracting only the video data, the audio data, and the predetermined command from an inputted digital signal by a predetermined packet separation processing, outputs the video data and the audio data to the audio and visual processing circuit 124, and outputs the control command to the controller 121. The audio and visual processing circuit 124 executes a predetermined signal processing and a D/A conversion processing on the inputted audio data, and outputs the processed audio data to the loudspeaker 125 so as to output sound. In addition, the audio and visual processing circuit 124 executes a predetermined signal processing and a D/A conversion processing on the inputted video data, and outputs the processed video data to the display 126 so as to display video.

Referring to FIG. 1, each of the VIC tables 115t and 127t includes VICs (Video format information identifiers) for identifying a plurality of video formats of the video data. In this case, each video format represents video data output specifications for the sink device 120, and includes information on a number of vertical active pixels, a number of horizontal active pixels, a scanning method (progressive scanning (p) or interlaced scanning (i)), and a vertical synchronizing frequency (also referred to as a field rate hereinafter) of the video data. In the present preferred embodiment, the VICs are allocated to the respective video format of two-dimensional video data. In addition, the EDID data 127d includes data such as respective VICs of video data, which can be displayed using the display 126, product information and a manufacturer name of the display 126, a video coding method (such as RGB, $YC_BC_R4{:}4{:}4$ or $YC_BC_R4{:}2{:}2$), and audio output specification (referred to as audio format hereinafter) such as sound output sampling. The respective VICs in the EDID data 127d are selected from among the VICs included in the VIC table 127d.

Figure 2:
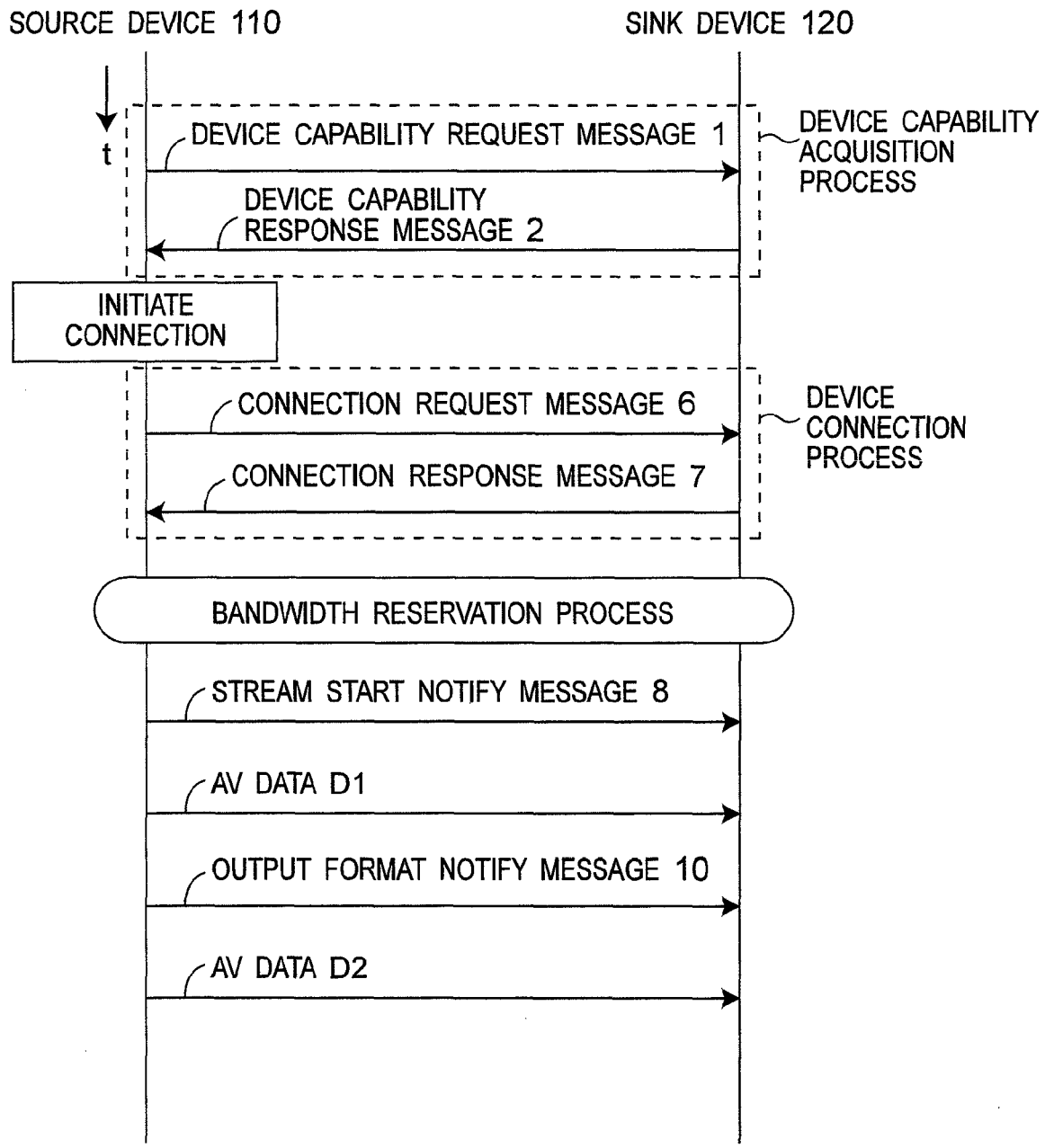
FIG. 2 is a sequence diagram showing operation of the wireless communication system of FIG. 1.

FIG. 2 is a sequence diagram showing operation of the wireless communication system of FIG. 1. First of all, a device capability acquisition process (an input format acquisition process) is executed between the source device 110 and the sink device 120 so that the source device 110 acquires information on video formats and audio formats supported by the sink device 120. In the device capability acquisition process, the source device 110 wirelessly transmits a device capability request (DEVICE_CAPABILITY_REQUEST) message (also referred to as a device information request message) 1 for requesting information on a device capability of the sink device 120, to the sink device 120. In response to this, the sink device 120 wirelessly transmits a device capability response (DEVICE_CAPABILITY_RESPONSE) message (also referred to as a device information response message) 2 to the source device 110.

Next, referring to FIG. 2, a device connection process is performed between the source device 110 and the sink device 120. In the present preferred embodiment, the source device 110 initiates the device connection process, and a port reservation and a bandwidth reservation process. First of all, in the device connection process, the source device 110 wirelessly transmits a connection request (CONNECT_REQUEST) message 6 compliant with the WirelessHD to the sink device 120 to confirm whether to transmit AV data to the sink device 120 or not. In this case, an S bit in the connection request message 6 is set to zero, and a port field in the connection request message 6 contains data representing a source port. When the sink device 120 receives the connection request message 6, the sink device 120 wirelessly transmits a connection response (CONNECT RESPONSE) message 7, which is compliant with the WirelessHD and includes a result of the connection request from the source device 110, to the source device 110. In this case, if the sink device 110 accepts the connection request from the source device 110, the sink device 110 stores data representing "Success" in a result code field in the connection response message 7, and stores data on a sink port reserved for AV data transmission in a sink port field in the connection response message 7. If an RF bit in the connection request message 6 is set to 1, the sink device 120 stores information on formats supported by the sink device 120 in predetermined fields (a total data length field, a format type field, a data length field, and a format data field) in the connection response message 7. If the RF bit in the connection request message 6 is set to zero, the sink device 120 stores zero in the total data length field of the connection response message 7. If the sink device 120 rejects the connection request from the source device 110, the sink device 120 stores data representing "Failure" with an appropriate reason in the result code field in the connection response message 7.

Referring to FIG. 2, after wirelessly receiving the connection response message 7 which indicates "Success", the source device 110 performs a bandwidth (resource) reservation process (sequence) compliant with the WirelessHD for securing a transmission bandwidth for transmitting AV content data including the video data and the audio data from the source device 110 to the sink device 120. In the bandwidth reservation process, in order to request a bandwidth for transmitting the AV data and to reserve the bandwidth, the source device 110 wirelessly transmits a bandwidth request command to the sink device 120. In response to this, the bandwidth management unit 121b of the sink device 120 allocates a reservation time period required for transmitting the AV content data from the source device 110 to the sink device 120, and wirelessly transmits an time period designation command including information on the allocated reservation time period to the source device 110.

Further, referring to FIG. 2, after the source device 120 normally completes the bandwidth reservation process, the source device 110 wirelessly transmits a stream start notify message 8 to the sink device 120. In this case, data representing "Success" is stored in a result code field 82 (See FIG. 38) in the stream start notify message 8. It is to be noted that if the source device 110 fails the bandwidth reservation process, the source device 110 wirelessly transmits the stream start notify message 8 including the result code field 82 storing data representing "Failure". As described later in detail, the stream start notify message 8 includes information on a video format and information on an audio format of AV data D1 transmitted to the sink device 120. Once an HRP (High Rate Physical Layer) stream is allocated, the source device 110 starts by transmitting HRP packets with only a PHY (Physical layer) header and a MAC (Medium Access Control) header until the source device 110 receives an ACK (Acknowledgement) signal from the sink device 120, which indicates that the sink device 120 ready to receive HRP packets with data for this stream. After the source device 110 receives the ACK signal, the source device 110 inserts AV data D1 into the HRP packets and wirelessly transmits the HRP packets to the sink device 120.

In addition, referring to FIG. 2, when at least one of the video format and the audio format of the AV data D1 is changed, the source device 110 wirelessly transmits an output format notify message (OUTPUT_FORMAT_NOTIFY) message 10 including information on the changed video format or audio format before wirelessly transmitting AV data D2 having the changed video format and audio format to the sink device 120.

Figure 4:
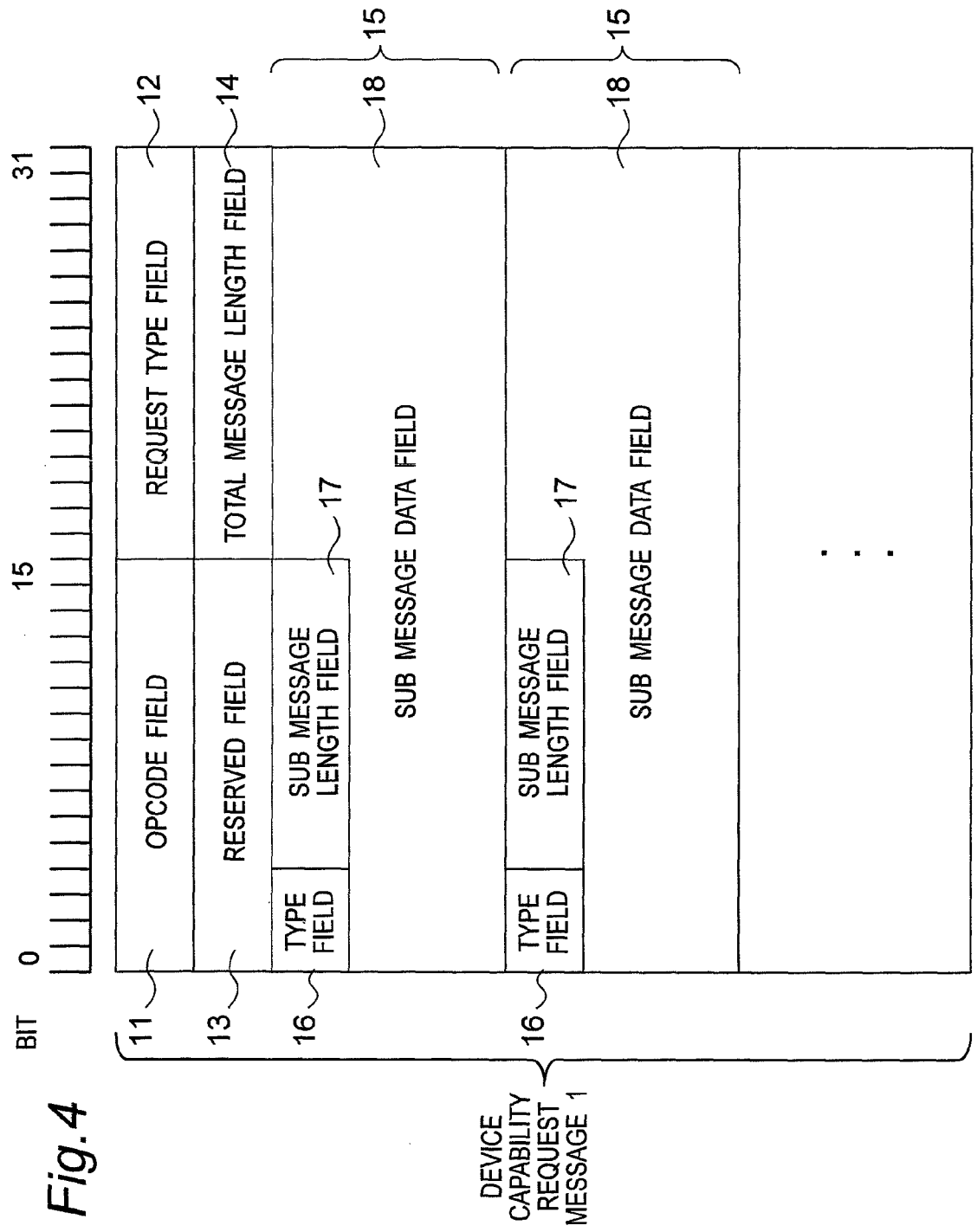
FIG. 4 is a diagram showing a format of a device capability request message 1 of FIG. 2.

FIG. 4 is a diagram showing a format of the device capability request message 1 of FIG. 2. Referring to FIG. 4, the device capability request message 1 includes the following fields:

(1) An opcode field 11 storing data representing a type of the device capability request message 1. Referring to FIG. 4, the opcode field 11 stores data representing that this device capability request message 1 is a device capability request message.

(2) A request type field 12 storing bitmap data representing a type of a device capability requested to the sink device 120.

(3) A reserved field 13 reserved for future use.

(4) A total message length field 14 storing data representing a data length of fields excluding the opcode field 11, the request type field 12, the reserved field 13, and the total message length field 14 from the device capability request message 1.

(5) At least one sub message 15 each including a type field 16, a sub message length field 17, and a sub message data field 18.

It is to be noted that, in the sub message 15, the type field 16 stores data representing a type of data stored in the sub message data field 18, the sub message length field 17 stores data representing a data length of the data stored in the sub message data field 18, and the sub message data field 18 stores the data having the type stored in the type field 16. Further, a header (not shown) including data on an ID of a destination device to which the device capability request message 1 is transmitted and an ID of the source device 110 that is a sender of the device capability request message 1 are added to the device capability request message 1.

FIG. 5 is a table showing types of the device capability requested using the request type field 12 of FIG. 4. As shown in FIG. 4, the types of the device capability requested using the request type field 12 includes device information, a device name, a MAC address, input format (supported format) information, and a vendor definition. For example, when requesting the sink device 120 to transmit the input format information, the source device 110 sets 1 to a bit which corresponds to the input format information among bits of the bitmap data stored in the request type field 12.

Figure 6:
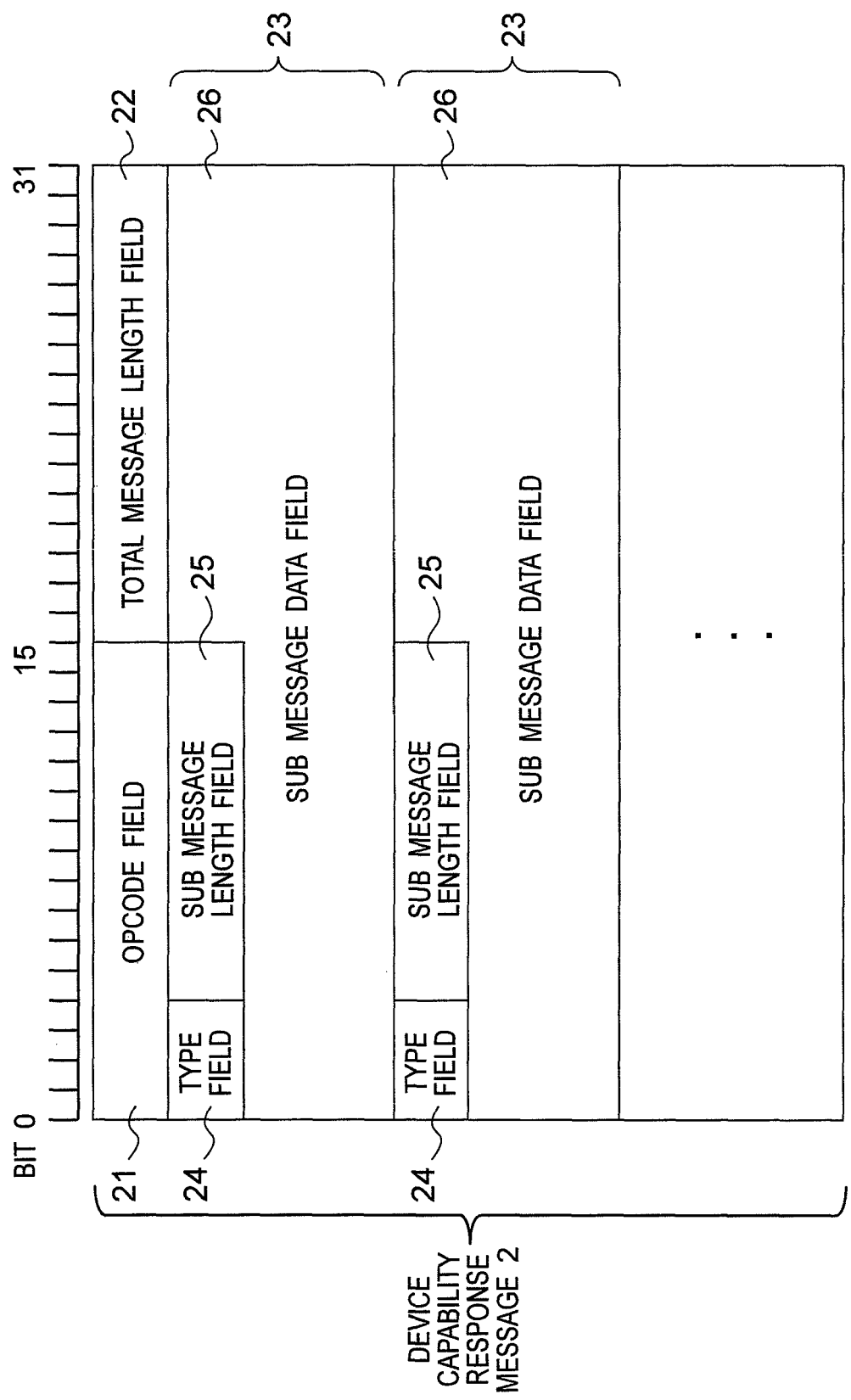
FIG. 6 is a diagram showing a format of a device capability response message 2 of FIG. 2.

FIG. 6 is a diagram showing a format of the device capability response message 2 of FIG. 2. Referring to FIG. 6, the device capability response message 2 includes the following fields:

(1) An opcode field 21 storing data representing a type of the device capability response message 2. Referring to FIG. 6, the opcode field 21 stores data representing that this device capability response message 2 is a device capability response message.

(2) A total message length field 22 storing data representing a data length of fields excluding the opcode field 21 and the total message length field 2 from the device capability response message 2.

(3) At least one sub message 23 each including a type field 24, a sub message length field 25, and a sub message data field 26.

It is to be noted that, in the sub message 23, the type field 24 stores data representing a type of data stored in the sub message data field 26, the sub message length field 25 stores data representing a data length of the data stored in the sub message data field 26, and the sub message data field 26 stores the data having the type stored in the type field 24. The sub message 23 including the type field 24 storing the data corresponding to the device information is referred to as a device information message 3, and the sub message 23 including the type field 24 storing data corresponding to the input format information is referred to as an input format information message 5 hereinafter. It is to be noted that a header (not shown) including an ID of a destination device to which the device capability response message 2 is transmitted and an ID of the sink device 120 that is a sender of the device capability response message 2.

Figure 7:
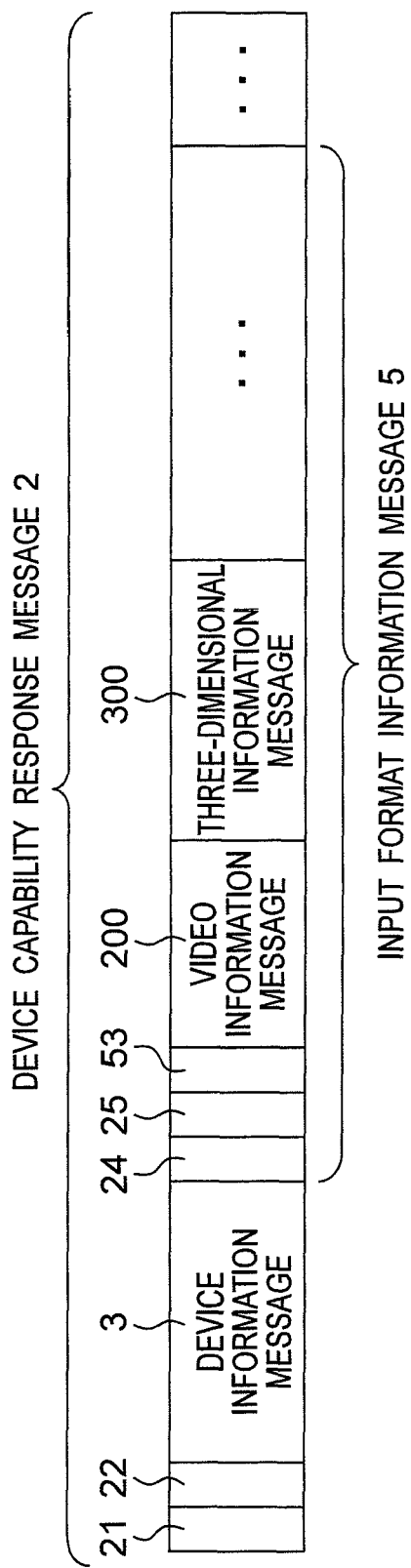
FIG. 7 is a diagram showing relation among the device capability response message 2 of FIG. 2, a device information message 3, and an input format information message 5.

FIG. 7 is a diagram showing relation among the device capability response message 2 of FIG. 2, the device information message 3, and the input format information message 5. When 1 is set to the bit corresponding to the device information of the bitmap data stored in the request type field 12 of the received device capability request message 1, the sink device 120 stores data corresponding to the device information in the type field 24 of one sub message 23 of the device capability response message 2, and wirelessly transmits the sub message 23 to the source device 110 as the device information message 3. In addition, when 1 is set to the bit corresponding to the input format information of the bitmap data stored in the request type field 12 of the received device capability request message 1, the sink device 120 stores data corresponding to the input format information in the type field 24 of one sub message 23 of the device capability response message 2, and wirelessly transmits the sub message 23 to the source device 110 as the input format information message 5.

Figure 8:
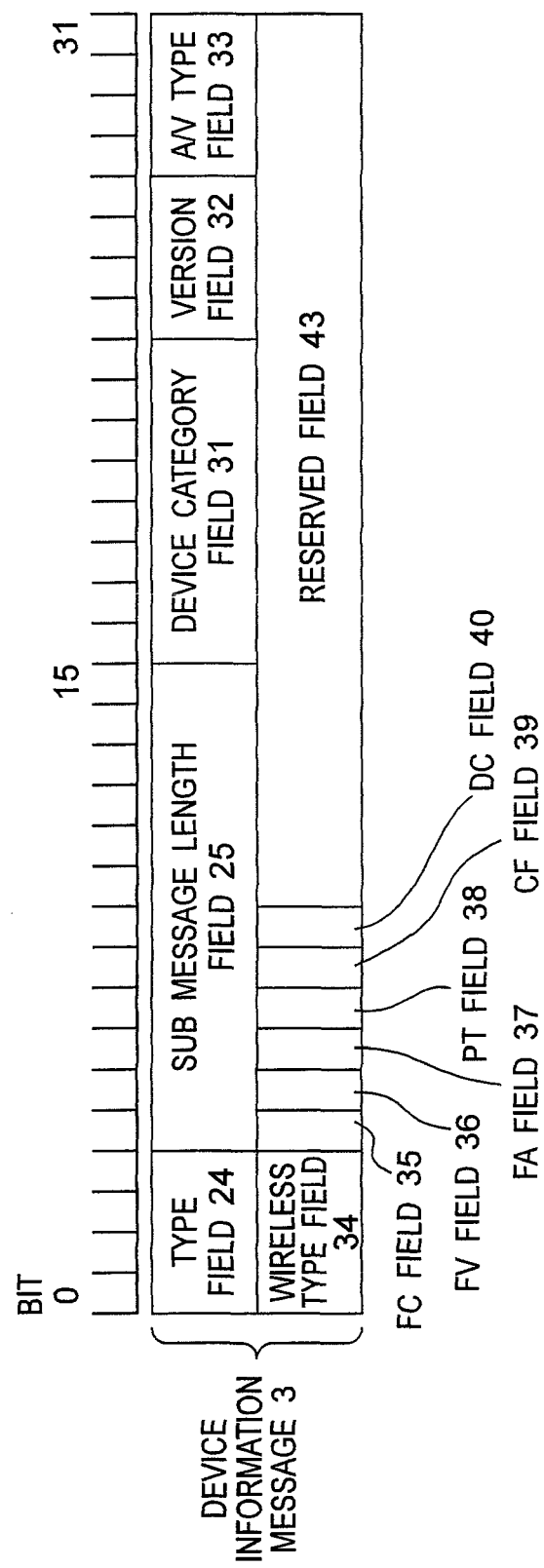
FIG. 8 is a diagram showing a format of the device information message 3 of FIG. 7.

FIG. 8 is a diagram showing a format of the device information message 3 of FIG. 7. Referring to FIG. 8, the device information message 3 includes the following fields:

(1) The type field 24 storing the data corresponding to the device information.

(2) The sub message length field 25 storing the data representing the data length of fields excluding the type field 24 and the sub message length field 25 from the device information message 3.

(3) A device category field 31 storing data representing a device category such as a television broadcasting receiver, a DVD player, or a set-top box.

(4) A version field 32 storing data representing a version of the specification. For example, the version field 32 stores 1 if the version of the specification is 1.0 or 1.0a, and stores 2 if the version of the specification is 1.1.

(5) An A/V type field 33 storing bitmap data representing an A/V type. Bit 0 (LSB: Least Significant Bit) of the bitmap data representing the A/V type is allocated to a function of a video source device, bit 1 is allocated to a function of a video sink device, bit 2 is allocated to a function of an audio source device, and bit 3 is allocated to a function of an audio sink device. If a value of a bit in the bitmap data is set to 1, it represents that a device supports a function corresponding to the bit. On the other hand, if the value of the bit is set to 0, it represents that the device does not support the function corresponding to the bit.

(6) A wireless type field 34 storing data representing a wireless type such as a wireless type which enables fast transmission and reception.

(7) An FC (Fast Connect) field 35 storing data representing whether or not the source device 110 supports a fast connect sequence function. The FC field 35 stores 1 when the source device 110 supports the fast connect sequence function, and stores 0 when the source device 110 does not support the fast connect sequence function.

(8) An FV (Fast Video) field 36 storing data representing whether or not the source device 110 supports a predetermined fast video adaptation function. The FV field 36 stores 1 when the source device 110 supports the predetermined fast video adaptation function, and stores 0 when the source device 110 does not support the predetermined fast video adaptation function.

(9) An FA (Fast Audio) field 37 storing data representing whether or not the source device 110 supports a predetermined fast audio adaptation function. The FA field 37 stores 1 when the source device 110 supports the predetermined fast audio adaptation function, and stores 0 when the source device 110 does not support the predetermined fast audio adaptation function.

(10) A PT (Pass Through) field 38 storing data representing whether or not a device supports an HDMI (High-Definition Multimedia Interface) pass-through mode as specified in the WirelessHD. The PT field 38 stores 1 when the device supports an HDMI pass-through mode, and stores 0 when the device does not support the HDMI pass-through mode.

(11) A CF (Content Flag) field 39 storing data representing whether or not a device is a sink device and supports a predetermined content type notify function. The CF field 39 stores 1 when the device supports the content type notify function, and stores 0 when the device does not support the content type notify function.

(12) A DC (Device Control) field 40 storing data representing whether or not a device supports a device control function (DEVCTL). The DC field 40 stores 1 when the device supports the device control function, and stores 0 when the device does not support the device control function.

(13) A reserved field 43 reserved for future use.

Figure 9:
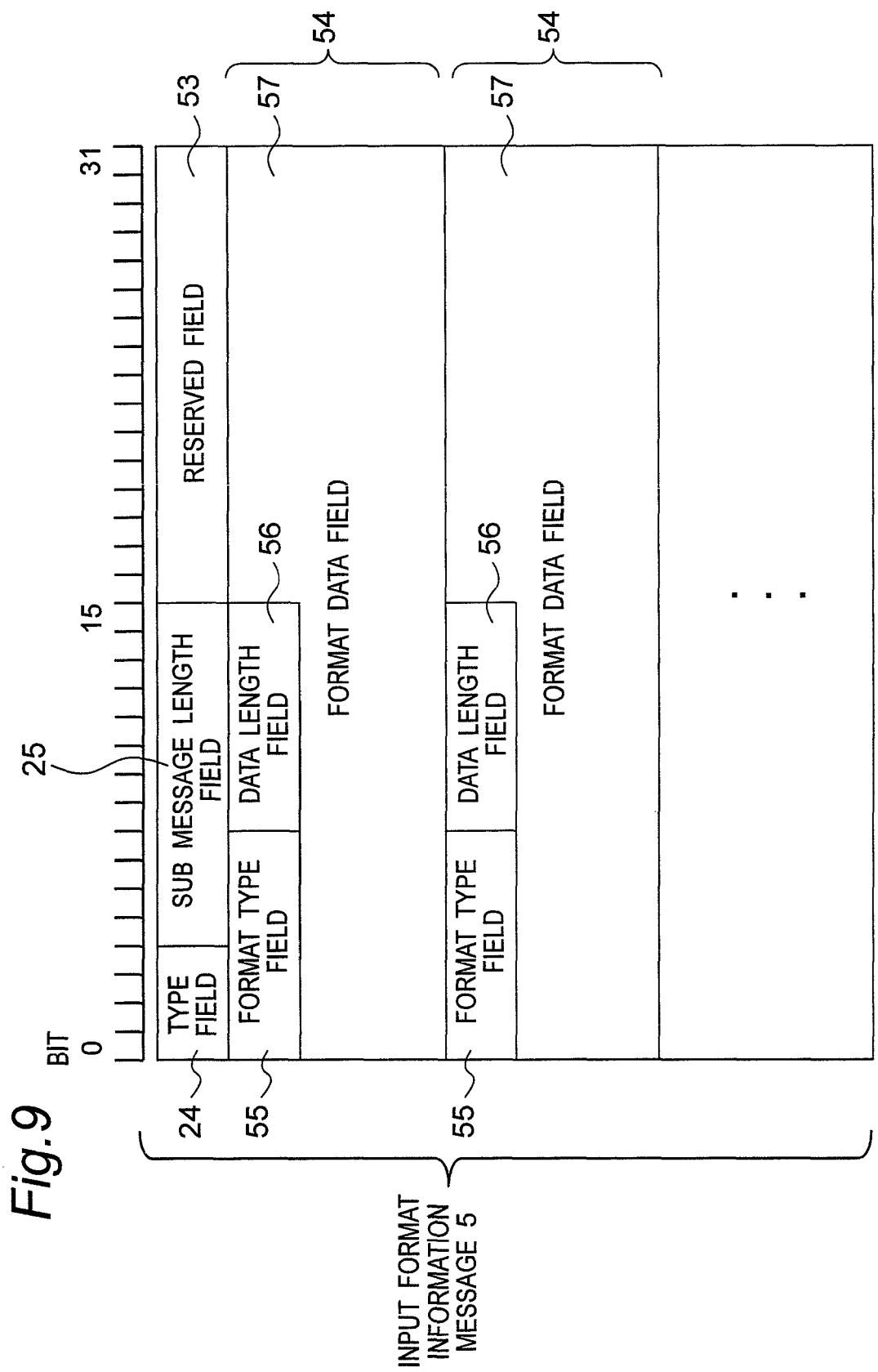
FIG. 9 is a diagram showing a format of the input format information message 5 of FIG. 7.

FIG. 9 is a diagram showing a format of the input format information message 5 of FIG. 7. Referring to FIG. 9, the input format information message 5 includes the following fields:

(1) The type field 24 storing the data corresponding to the input format information.

(2) The sub message length field 25 storing the data representing a data length of fields excluding the type field 24 and the sub message length field 25 from the input format information message 5.

(3) A reserved field 53 reserved for future use.

(4) At least one format data message 54 each including a format type field 55, a data length field 56, and a format data field 57.

In this case, in each format data message 54, the format type field 55 stores data representing a type of data stored in the format data field 57, the data length field 56 stores data representing a data length of the data stored in the format data field 57, and the format data field 57 stores the data having the format type stored in the format type field 55.

FIG. 10 is a table showing relation between values stored in the format type field 55 of FIG. 9 and format types. As shown in FIG. 10, the format types corresponding to values stored in the format type field 55 include video information (VIDEO_INFO), audio information (AUDIO_INFO), speaker allocation information (SPEAKER_ALLOCATION), detailed timing information (DETAILED_TIMING_INFO), maximum video buffer information (MAXIMUM_VIDEO_BUFFER), maximum audio buffer information (MAXIMUM_AUDIO_BUFFER), and three-dimensional information (3D_INFO). The format data message 54 including the format type field 55 storing the value (0x01) corresponding to the video information is referred to as a video information message 200 hereinafter. The format data message 54 including the format type field 55 storing the value (0x04) corresponding to the detailed timing information is referred to as a detailed timing information message hereinafter. The format data message 54 including the format type field 55 storing the value (0x07) corresponding to the three-dimensional information is referred to as a three-dimensional information message 300 (See FIG. 7) hereinafter. In the present specification, a numeric value starting from 0x represents a hexadecimal number, and a numeric value starting from 0b represents a binary number.

Figure 11:
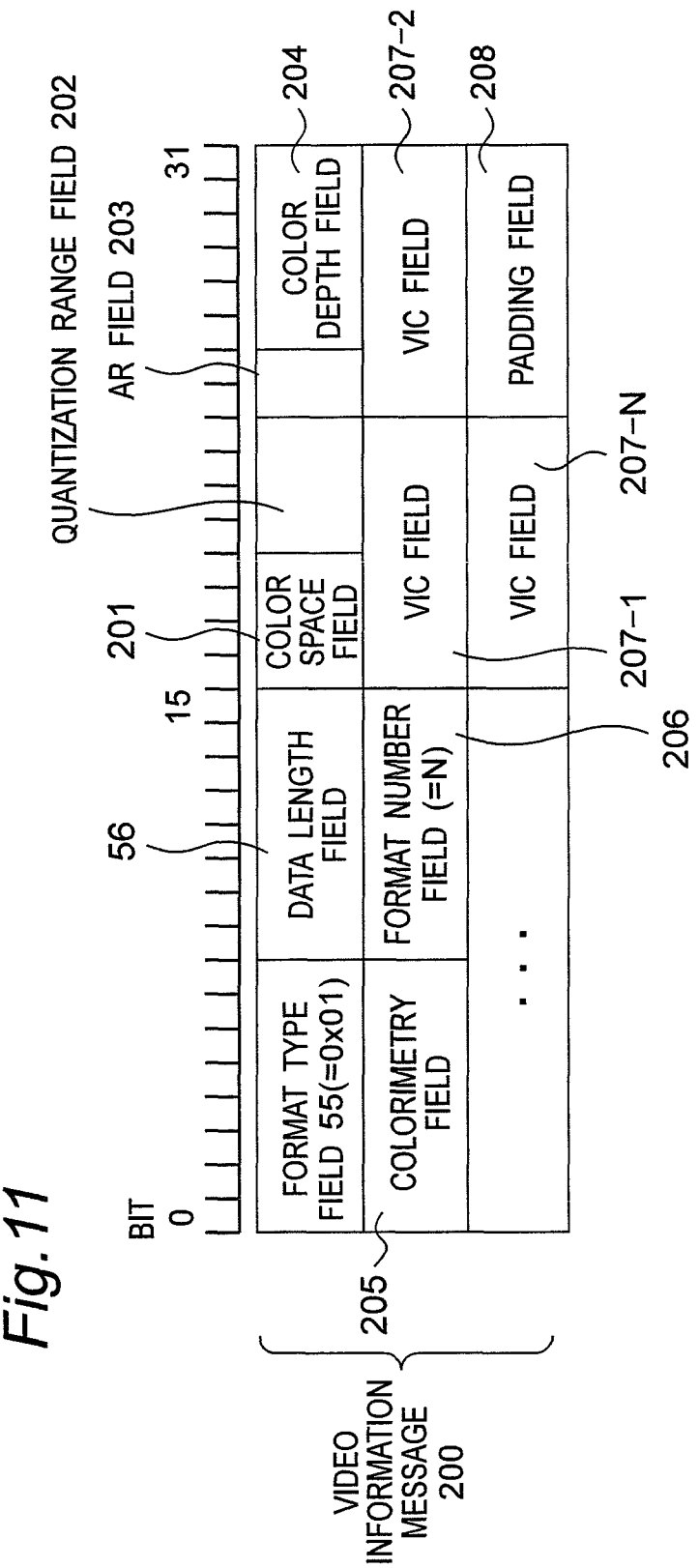
FIG. 11 is a diagram showing a format of a video information message 200 of FIG. 7.

FIG. 11 is a diagram showing a format of the video information message 200 of FIG. 7. Referring to FIG. 11, the video information message 200 includes the following fields:

(1) The format type field 55 storing the value (0x01) corresponding to the video information.

(2) The data length field 56 storing the data representing the data length of the fields excluding the format type field 55 and the data length field 56 from the video information message 200.

(3) A color space field 201 storing bitmap data representing a supported color space. Bit 0 of the bitmap data stored in the color space field 201 is allocated to RGB, bit 1 is allocated to YCbCr422, bit 2 is allocated to YCbCr444, and bit 3 is a reserved bit. When a value of a bit among the bits of the bitmap data is set to 1, this indicates that the color space corresponding to the bit is supported. On the other hand, when a value of a bit among the bits of the bitmap data is set to 0, this indicates that the color space corresponding to the bit is not supported.

(4) A quantization range (QC) field 202 storing bitmap data representing whether the device supports full range or limited range RGB quantization, and whether the device supports full range or limited range YCrCb quantization. Values of the quantization range are defined in IEC61966-2-1. When bit 0 of the bitmap data stored in the quantization range field 202 is 1, this indicates that the device supports the RGB quantization of the full range. When the bit 0 of the bitmap data stored in the quantization range field 202 is 0, this indicates that the device supports the RGB quantization of the limited range. In addition, when bit 1 of the bitmap data stored in the quantization range field 202 is 1, this indicates that the device supports the YCrCb quantization of the full range. When the bit 1 of the bitmap data stored in the quantization range field 202 is 0, this indicates that the device supports the YCrCb quantization of the limited range. Bits 2 and 3 of the bitmap data stored in the quantization range field 202 are reserved bits. The source device 110 does not transmit full-range data to the sink device that does not support the same data. Adobe601 and sYCC601 are always full range.

(5) An AR (Aspect Ratio) field 203 storing bitmap data representing supported aspect ratio. Bit 0 of the bitmap data stored in the AR field 203 is allocated to an aspect ratio of 4:3, and bit 1 is allocated to an aspect ratio of 16:9. When a value of a bit of the bitmap data is set to 1, this indicates that the aspect ratio corresponding to the bit is supported. When a value of a bit of the bitmap data is set to 0, this indicates that the aspect ratio corresponding to the bit is not supported.

(6) A color depth field 204 storing bitmap data representing supported color depth. Bit 0 of the bitmap data stored in the color depth field 204 is allocated to a color depth of 24 bits, bit 1 is allocated to a color depth of 30 bits, bit 2 is allocated to a color depth of 36 bits, bit 3 is allocated to a color depth of 48 bits, and bits 4 and 5 are reserved bits. When a value of a bit of the bitmap data is set to 1, this indicates that the color depth corresponding to the bit is supported. When a value of a bit of the bitmap data is set to 0, this indicates that the color depth corresponding to the bit is not supported.

(7) A colorimetry field 205 storing data representing supported colorimetry. Bit 0 of bitmap data stored in the colorimetry field 205 is allocated to ITU601/SMPTE 170M, bit 1 is allocated to ITU709, bit 2 is allocated to xvYCC601 for supporting IEC61966-2-4 with standard definition primaries, bit 3 is allocated to xvYCC709 for supporting IEC61966-2-4 with high definition primaries, bit 4 is allocated to sYCC601 for supporting IEC61966-2-1-am1 with still picture primaries, bit 5 is allocated to Adobe YCC601 for supporting IEC61966-2-5 (CVD) with still picture primaries, bit 6 is allocated to Adobe RGB, and bit 7 is a reserved bit. However, when the sink device does not support the RGB color space, the bit 6 of the bitmap data stored in the colorimetry field 205 is set to 0, and when the sink device does not support the YCbCr color space, the bit 2 is set to 0.

(8) A format number field 206 storing a total number N (where N is an integer equal to or larger than 1) of video formats which the sink device 120 supports.

(9) N VIC fields 207-1 to 207-N storing VICs of the respective video formats which the sink device 120 supports.

(10) A padding field 208 provided to set the message length of the video information message 200 to an integer multiple of a predetermined data length unit (32 bits in the present preferred embodiment).

Figure 12:
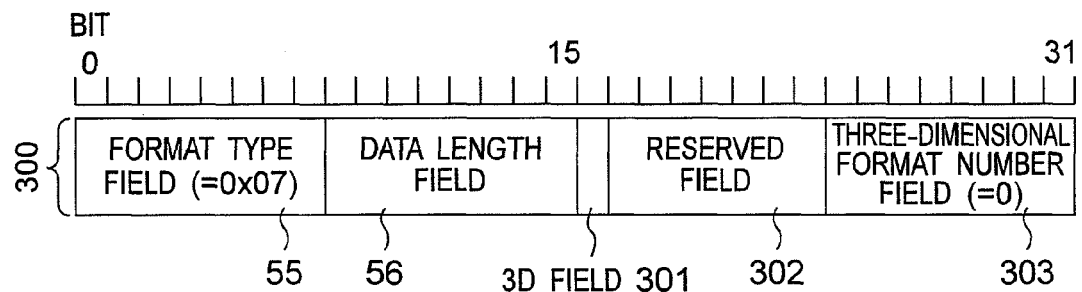
FIG. 12 is a diagram showing a format of a three-dimensional information message 300 of FIG. 7 when 0 is stored in a three-dimensional format number field 303.
Figure 13:
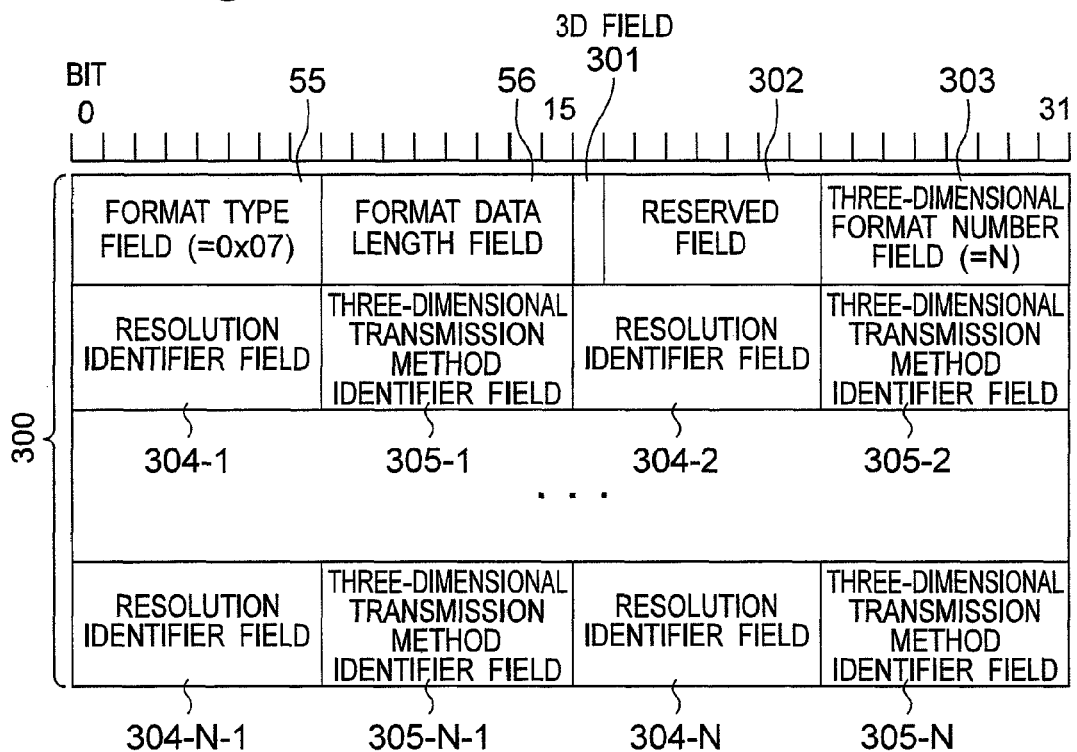
FIG. 13 is a diagram showing a format of the three-dimensional information message 300 of FIG. 7 when N is stored in the three-dimensional format number field 303.

FIG. 12 is a diagram showing a format of the three-dimensional information message 300 of FIG. 7 when 0 is stored in a three-dimensional format number field 303. FIG. 13 is a diagram showing a format of the three-dimensional information message 300 of FIG. 7 when N is stored in the three-dimensional format number field 303. Referring to FIGS. 12 and 13, the three-dimensional information message 300 includes the following fields:

(1) The format type field 55 storing the value (0x07) corresponding to the three-dimensional information.

(2) The data length field 56 storing the data representing the data length of the fields excluding the format type field 55 and the data length field 56 from the three-dimensional information message 300.

(3) A 3D field 301 storing data representing whether or not the sink device 120 supports three-dimensional display. The 3D field 301 stores 1 when the sink device 120 supports the three-dimensional display, and stores 0 when the sink device 120 does not support the three-dimensional display.

(4) A reserved field 302 reserved for future use.

(5) A three-dimensional format number field 303 which stores 1 when the sink device 120 supports only three-dimensional video data having video formats and three-dimensional transmission methods of predetermined mandatory combinations selected from among a plurality of combinations of video formats and three-dimensional transmission methods to be described later in detail, and which stores the number of formats N stored in the format number field 206 of the video information message 200 of FIG. 11 when the sink device 120 supports three-dimensional video data of the combinations of the video formats and the three-dimensional transmission methods other than the mandatory combinations.

(6) Resolution identifier fields 304-1 to 304-N provided so as to correspond to the VIC fields 207-1 to 207-N of the video format message 200 of FIG. 10, respectively. The resolution identifier fields 304-1 to 304-N stores identifiers for identifying resolutions of video data having VICs stored in the corresponding VIC fields 207-1 to 207-N, respectively. In this case, a term of "resolution" represents a number of active vertical pixels, a number of horizontal active pixels, a scanning method, and a field rate of video data.

(7) Three-dimensional transmission method identifier fields 305-1 to 305-N provided so as to correspond to the VIC fields 207-1 to 207-N of the video format message 200 of FIG. 10. The three-dimensional transmission method identifier fields 305-1 to 305-N stores identifiers for identifying three-dimensional transmission methods supported for video data having the VICs stored in the corresponding VIC fields 207-1 to 207-N, respectively.

In this case, the three-dimensional transmission method is also referred to as a format structure of video data. The format structure of the video data represents respective definitions of transmission order and transmission timings of respective video frame data such as left-eye video frame data, right-eye video frame data, left-eye top field video frame data, right-eye top field video frame data, left-eye bottom field video frame data, and right-eye bottom field video frame data included in the three-dimensional video data. Namely, information on the format structure or the three-dimensional transmission method of the video data is provided to identify respective parameters for combining a plurality of video frame data included in one video data into at least one combined video frame data for every video frame data in the packet processing circuit 113.

For example, if the format structure is frame packing (also referred to as frame sequential), the combined video frame data is configured so that, in a horizontal display interval Th, K pieces of video frame data are sequentially transmitted for first to Kth (where K is an integer equal to or larger than 2) time intervals, respectively, having time interval lengths the same as each other within a vertical display interval Tv. In this case, for example, when the number K of the video frame data included in the three-dimensional video frame data is 2, first and second video frame data are left-eye video frame data L and right-eye video frame data R, respectively. In this case, the above-mentioned parameters are numbers of pixels of a horizontal active interval Hactive, a horizontal blanking interval Hblank, a vertical active interval Vactive and a vertical blanking interval Vblank, field rates (Hz), pixel frequencies (MHz), and a number Vspace, which has value equal to or larger than 0, of lines provided between video frame data R and L. In addition, the combined video frame data is configured so that, in the horizontal display interval Th, the left-eye video frame data L having a predetermined number Vvideo of lines is transmitted for a first half of the vertical display interval Tv, and the right-eye video frame data R having the predetermined number Vvideo of lines is transmitted for a second half of the vertical display interval Tv. When the number N of video frame data included in the three-dimensional video data is 4, first to fourth video frame data are left-eye top video frame data L_top (also referred to as left-eye odd-numbered video frame data L_odd), right-eye top video frame data R_top (also referred to as right-eye even-numbered video frame data R_odd), left-eye bottom video frame data L_bottom (also referred to as left-eye even-numbered video frame data L_even), and right-eye bottom video frame data R_bottom (also referred to as right-eye odd-numbered video frame data R_even), respectively. In addition, if the format structure is the frame alternative, the left-eye top vide frame data L_top (also referred to as the left-eye odd-numbered video frame data L_odd) and the right-eye top vide frame data R_top (also referred to as the right-eye odd-numbered video frame data L_odd) are combined into first combined video frame data in a time interval Tv1, and the left-eye bottom video data L_bottom (also referred to as the left-eye even-numbered video frame data) and the right-eye bottom video data R_bottom (also referred to as the right-eye even-numbered video frame data) are combined into second combined video frame data in the time interval Tv2. The time intervals Tv1 and Tv2 are provided between two consecutive vertical synchronizing intervals out of three consecutive vertical synchronizing intervals of the vertical synchronizing signal, respectively. In this case, the first combined video frame data is configured so that, in the horizontal display interval Th, the left-eye top video frame data L_top having a predetermined number of lines is transmitted for a first half of the vertical display interval Tv1, and thereafter, the right-eye top video frame top having the predetermined number of lines is transmitted for a second half of the vertical display interval Tv1. In addition, the second combined video frame data is configured so that, in the horizontal display interval Th, the left-eye bottom video frame data L_bottom having the predetermined number of lines is transmitted for a first half of the vertical display interval Tv2, and thereafter, the right-eye bottom video frame R_bottom having the predetermined number of lines is transmitted for a second half of the vertical display interval Tv2. Further, if the format structure is line alternative, the combined video frame data is configured so that a plurality of horizontal line data L_H included in the left-eye video frame data L and a plurality of horizontal line data R_H included in the right-eye video frame data R are alternately transmitted for the vertical display interval in the horizontal display interval Th.

Still further, if the format structure is side by side (full), the combined video frame data is configured so that, in the vertical display interval Tv, the left-eye video frame data L having predetermined first pixels is transmitted for a first half of the horizontal display interval Th, and thereafter, the right-eye video frame data R having the predetermined first pixels is transmitted for a second half of the horizontal display interval Th. In addition, if the format structure is side by side (half), the combined video frame data is configured so that, in the vertical display interval Tv, the left-eye video frame data L having second pixels is transmitted for the first half of the horizontal display interval Th, and thereafter, the right-eye video frame data R having the predetermined second pixels is transmitted for a second half of the horizontal display interval Th. In this case, the number of the second pixels is half of the number of the first pixels.

If the format structure is L+Depth, the combined video frame data is configured so that two-dimensional video data L and depth data Depth are transmitted for the vertical display interval Tv. In addition, if the format structure is L+Depth+Graphics+(Graphics-Depth), the combined video frame data is configured so that two-dimensional video data L, the depth data Depth and graphics data Graphics, and a difference (Graphics-Depth) between the graphics data and the depth data are transmitted for the vertical display interval Tv.

Referring to FIG. 12, when the 3D field 301 stores 1 and the three-dimensional format number field 303 stores 0, this indicates that the sink device 120 supports only the three-dimensional video data of the predetermined mandatory combinations selected from among a plurality of combinations of the video formats and the three-dimensional transmission methods to be described later in detail. In the present preferred embodiment, the predetermined mandatory combinations selected from among the plurality of combinations of the video formats and the three-dimensional transmission methods are the following three combinations.

(1) 1080p, 23.97 Hz/24 Hz, frame packing;
(2) 720p, 59.94 Hz/60 Hz, frame packing; and
(3) 720p, 50 Hz, frame packing.

In addition, when the 3D field 301 stores 1 and the three-dimensional format number field 303 stores a value equal to or larger than 1, this indicates that the sink device 120 supports the three-dimensional display, and that the sink device 120 supports the above-mentioned plurality of combinations of the video formats and the three-dimensional transmission methods and a plurality of combinations of the video formats and the three-dimensional transmission methods specified as the other options.

Further, referring to FIG. 13, each of the three-dimensional transmission identifier fields 305-1 to 305-N includes a 4-bit three-dimensional structure field, and the 4-bit three-dimensional structure field stores one of the following values identifying the three-dimensional transmission methods:

Three-dimensional structure field="0b0000": two-dimensional video data;
Three-dimensional structure field="0b0001": frame packing;
Three-dimensional structure field="0b0010": frame alternative;
Three-dimensional structure field="0b0011": line alternative;
Three-dimensional structure field="0b0100": side by side (full);

Three-dimensional structure field="0b0101": side by side (half);
Three-dimensional structure field="0b0110": L+Depth;
Three-dimensional structure field="0b0111": L+Depth+Graphics+(Graphics-Depth); and
Three-dimensional structure fields="0b1000 to 0b1111": Reserved fields.

Next, operation of the wireless communication system of FIG. 1 will be described concretely. First of all, the source device 110 transmits the device capability request message 1 requesting the device information and the input format information to the sink device 120. In response to this, the sink device 120 transmits the device capability response message 2 (See FIG. 7) including the input format information message 5 that includes the video information message 200 and the three-dimensional information message 300 to the source device 110. The source device 110 identifies whether or not the sink device 120 supports the three-dimensional display, and identifies combinations of video formats and three-dimensional transmission methods of the three-dimensional video data supported by the sink device 120, based on the received device capability response message 2. Further, the source device 120 selects one combination of the combinations of the video formats and the three-dimensional transmission methods of the three-dimensional video data supported by the sink device 120, generates video data having the selected combination of the video format and the three-dimensional transmission method, and generates combined video frame data based on the video data by the packet processing circuit 113.

Figure 3:
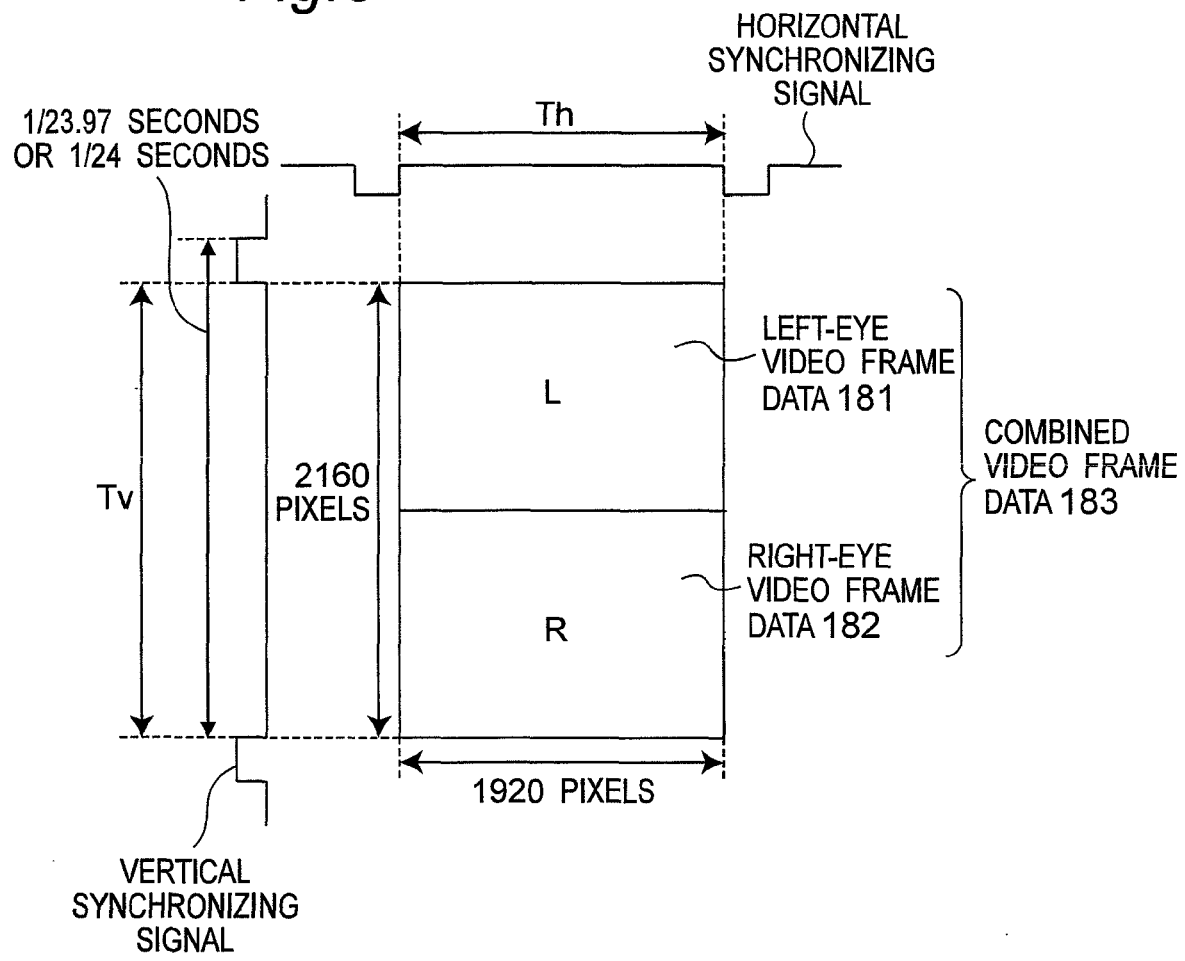
FIG. 3 is a data arrangement diagram of combined video frame data 183 generated by a source device 110 of FIG. 1, the data arrangement diagram being shown based on relation with a horizontal synchronizing signal and a vertical synchronizing signal.

FIG. 3 is a data arrangement diagram of combined video frame data 183 generated by the source device 110 of FIG. 1, the data arrangement diagram being shown based on relation with a horizontal synchronizing signal and a vertical synchronizing signal. In FIG. 3, the three-dimensional transmission method is the frame packing. Referring to FIG. 3, the horizontal display interval Th is a time interval provided between a horizontal synchronizing interval and a next horizontal synchronizing interval of the horizontal synchronizing signal, and the vertical display interval Tv is a time interval provided between a vertical synchronizing interval and a next vertical synchronizing interval of the vertical synchronizing signal. The number of horizontal active pixels and the number of vertical active pixels of each of left-eye video frame data 181 and right-eye video frame data 182 are 1920 and 1080, respectively. In addition, the number of horizontal pixels and the number of vertical pixels of the combined video frame data 183 are 1920 and 2160, respectively. Further, the vertical synchronizing frequency of the left-eye video frame data 181 and the right-eye video frame data 192 is 23.97 Hz or 24 Hz. The packet processing circuit 113 combines the left-eye video frame data 181 and the right-eye video frame data 182 into the combined video frame data 183. In this case, the combined video frame data 183 is configured so that, in the horizontal display interval Th, the left-eye video frame data 181 having 1080 lines is transmitted for the first half of the vertical display interval Tv, and thereafter, the right-eye video frame data 182 having 1080 lines is transmitted for the second half of the vertical display interval Tv.

Next, the controller 111 of the source device 110 controls the packet processing circuit 113 to divide the combined video frame data 183 into a plurality of packets according to a predetermined packet format compliant with the WirelessHD. In response to this, the packet processing circuit 113 divides the combined video frame data 183 into a plurality of packets according to the packet format compliant with the WirelessHD, so as to store horizontal position data in the horizontal display interval Th and vertical position data in the vertical display interval Tv of a first pixel of the combined video frame data 183 stored in each of sub-packets for transmitting the combined video frame data 183, in an H-position field and a V-position field included in a header of each of the sub-packet, as data for identifying the right-eye video frame data 182 and the left-eye video frame data 181. In addition, the controller 111 of the source device 110 transmits the stream start notify message 8 or the output format notify message 10 including information on the video format of the video data to be transmitted to the sink device 120, and thereafter, controls the packet wireless transceiver circuit 114 to wirelessly transmit AV data including the generated plurality of packets to the sink device 120 for the allocated reservation time period. The sink device 120 decodes the packets of the video data in the received AV data based on data on the video format included in the received output format notify message 10.

In the present preferred embodiment and the following preferred embodiments, the source device 110 divides audio data into a plurality of audio packets according to an audio packet format compliant with the WirelessHD, and wirelessly transmits the audio packets to the sink device 120 together with the plurality of packets of the combined video frame data 183. In addition, in the source device 110, when the type of the video data is two-dimensional video data, the packet processing circuit 113 generates two-dimensional video frame data according to a video format of a selected VIC for every video frame, and generates a plurality of packets by dividing the generated video frame data into the plurality of packets according to a packet format compliant with the WirelessHD.

With the WirelessHD according to the prior art, the values stored in the format type field 55 of the input format information message 5 are only 0x01 to 0x06 of FIG. 10. Accordingly, the sink device 120 cannot notify the source device 110 that the sink device 120 supports the three-dimensional display, and cannot notify the source device 110 of the resolution and three-dimensional transmission method of the supported three-dimensional video data. Therefore, the source device 110 cannot transmit the three-dimensional video data to the sink device 120.

According to the present preferred embodiment, in the wireless transmission method compliant with the WirelessHD, the value representing three-dimensional information is newly defined as a value stored in the format type field 55 of the input format information message 5. In addition, the sink device 120 transmits the input format information message 5 (See FIG. 7) including the video information message 200 and the three-dimensional information message 300 to the source device 110. Therefore, the sink device 120 can notify the source device 110 that the sink device 120 supports the three-dimensional display, and can notify the source device 110 of the resolutions and three-dimensional transmission methods of the supported three-dimensional video data. In addition, the source device 110 identifies the resolutions and the three-dimensional transmission methods of the three-dimensional video data supported by the sink device 120 based on the input format information message 5 from the sink device 120, generates the video data having the identified resolution and three-dimensional transmission method, and transmits the video data to the sink device 120. Therefore, the source device 110 can transmit the three-dimensional video data to the sink device 120.

Second Preferred Embodiment

Figure 14:
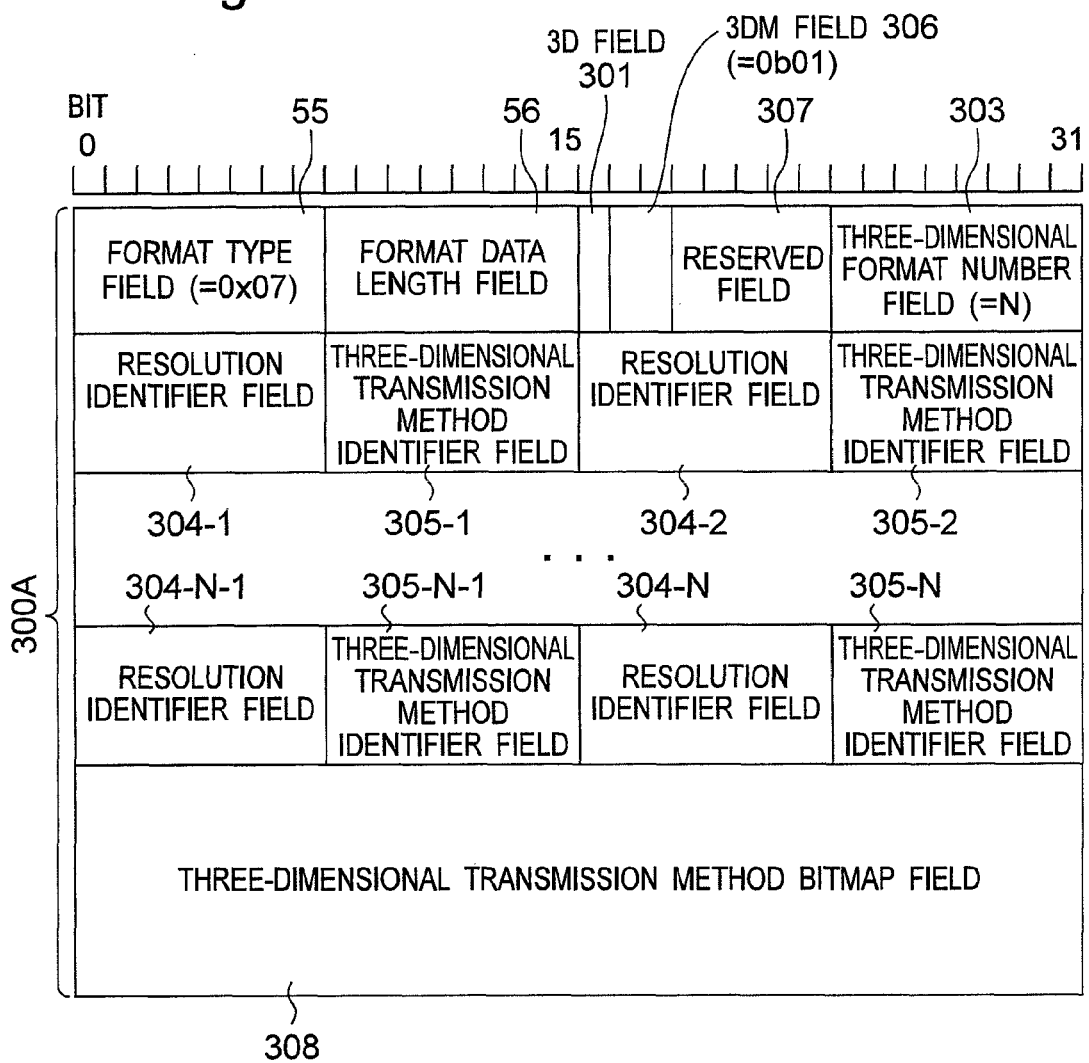
FIG. 14 is a diagram showing a format of a three-dimensional information message 300A according to a second preferred embodiment of the present invention when 0b01 is stored in a 3DM field 306.
Figure 15:
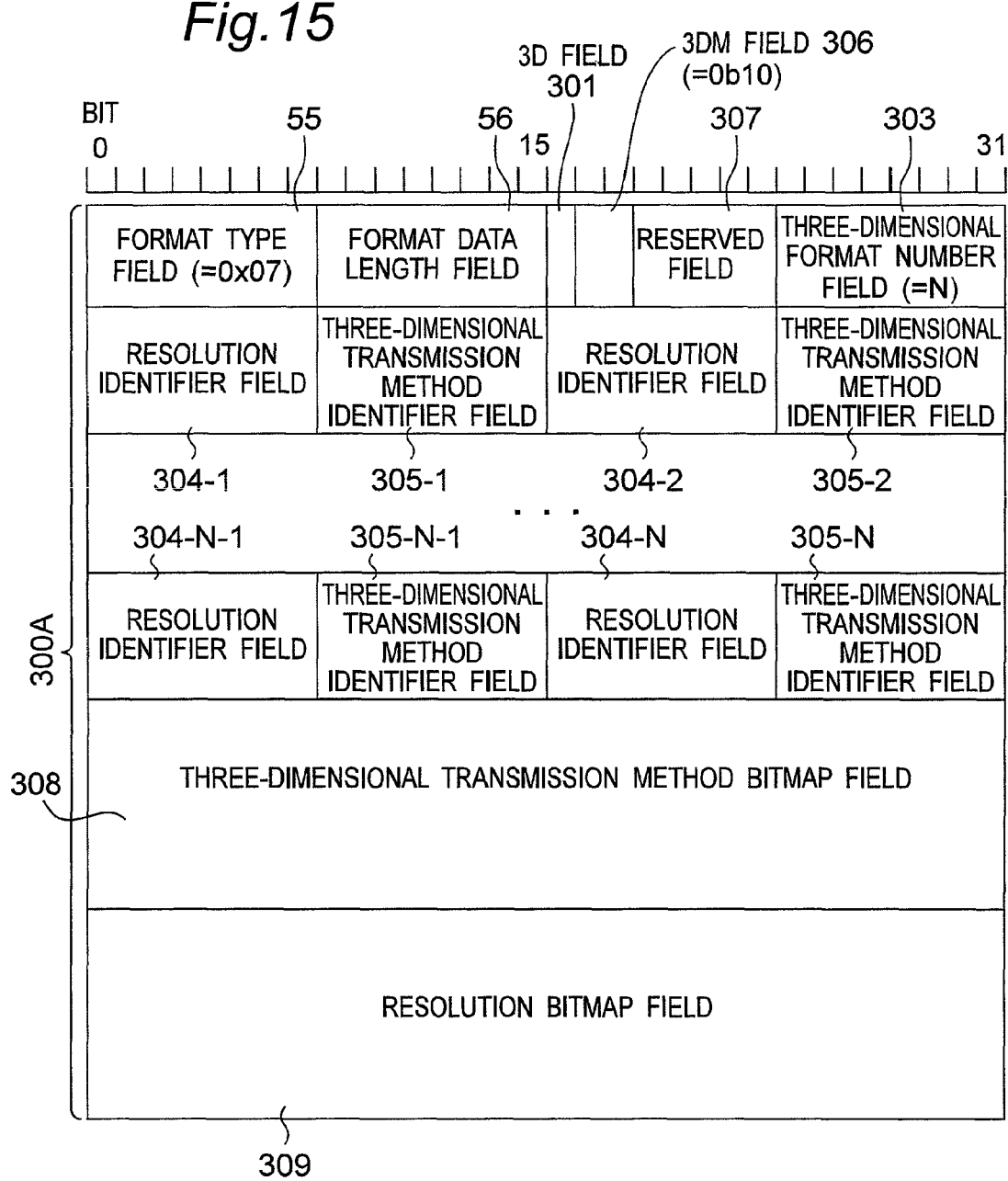
FIG. 15 is a diagram showing a format of the three-dimensional information message 300A according to the second preferred embodiment of the present invention when 0b10 is stored in the 3DM field 306.

FIG. 14 is a diagram showing a format of a three-dimensional information message 300A according to a second preferred embodiment of the present invention when 0b01 is stored in a 3DM field 306. FIG. 15 is a diagram showing a format of the three-dimensional information message 300A according to the second preferred embodiment of the present invention when 0b10 is stored in the 3DM field 306. The three-dimensional information message 300A according to the present preferred embodiment is different from the three-dimensional information message 300 according to the first preferred embodiment in the following respects.

(1) The three-dimensional information message 300A includes the 3DM field 306 and a reserved field 307 instead of the reserved field 30.

(2) The three-dimensional information message 300A further includes a three-dimensional transmission method bitmap field 308 when the 3DM field 306 stores 0b01, and includes the three-dimensional transmission method bitmap field 308 and a resolution bitmap field 309 when the 3DM field 306 stores 0b10.

Referring to FIG. 15, the 3DM field 306 stores data representing whether or not the three-dimensional transmission method bitmap field 308 is added to the three-dimensional information mess age 300A, and representing whether or not the three-dimensional transmission method bitmap field 308 and the resolution bitmap field 309 are added to the three-dimensional information message 300A. When the 3DM field 306 stores 0b01, the three-dimensional transmission method bitmap field 308 is added to the three-dimensional information message 300A. When the 3DM field 306 stores 0b10, the three-dimensional transmission method bitmap field 308 and the resolution bitmap field 309 are added to the three-dimensional information message 300A. In this case, the three-dimensional transmission method bitmap field 308 stores bitmap data having bits allocated to three-dimensional transmission methods, respectively. In addition, the resolution bitmap field 309 stores bitmap data having bits allocated to the VICs stored in the VIC fields 207-1 to 207-N of the video information message 200, respectively.

Referring to FIG. 14, when the 3DM field 306 stores 0b01, the three-dimensional transmission method bitmap field 308 stores bitmap data representing three-dimensional transmission methods supported by the sink device 120 for all of the VICs stored in the VIC fields 207-1 to 207-N of the video information message 200. When a value of a bit of the bitmap data is set to 1, this indicates that the sink device 120 supports the three-dimensional transmission method corresponding to the bit. On the other hand, when a value of a bit of the bitmap data is set to 0, this indicates that the sink device 120 does not support the three-dimensional transmission method corresponding to the bit.

In addition, referring to FIG. 15, when the 3DM field 306 stores 0b10, the three-dimensional information message 300A indicates that the sink device 120 supports three-dimensional transmission methods corresponding to the bits, each of which is set to 1, of the bitmap data stored in the three-dimensional transmission method bitmap field 308, for VICs corresponding to the bits, each of which is set to 1, of the bitmap data stored in the resolution bitmap field 309. It is to be noted that the resolution bitmap field 309 may store bitmap data having respective bits allocated to the VICs included in the VIC table 127t.

As described above, according to the present preferred embodiment, the sink device 120 transmits the input format information message 5 including the video information message 200 and the three-dimensional information message 300A to the source device 110. Therefore, the sink device 120 can notify the source device 110 that the sink device 120 supports the three-dimensional display, and can notify the source device 110 of all of the resolutions and the three-dimensional transmission methods of the supported three-dimensional video data. In addition, the source device 110 identifies the resolutions and three-dimensional transmission methods of the supported three-dimensional video data based on the input format information message 5 from the sink device 120, generates the video data having the identified resolution and three-dimensional transmission method, and transmits the video data to the sink device 120. Therefore, the source device 110 can transmit the three-dimensional video data to the sink device 120.

Third Preferred Embodiment

Figure 16:
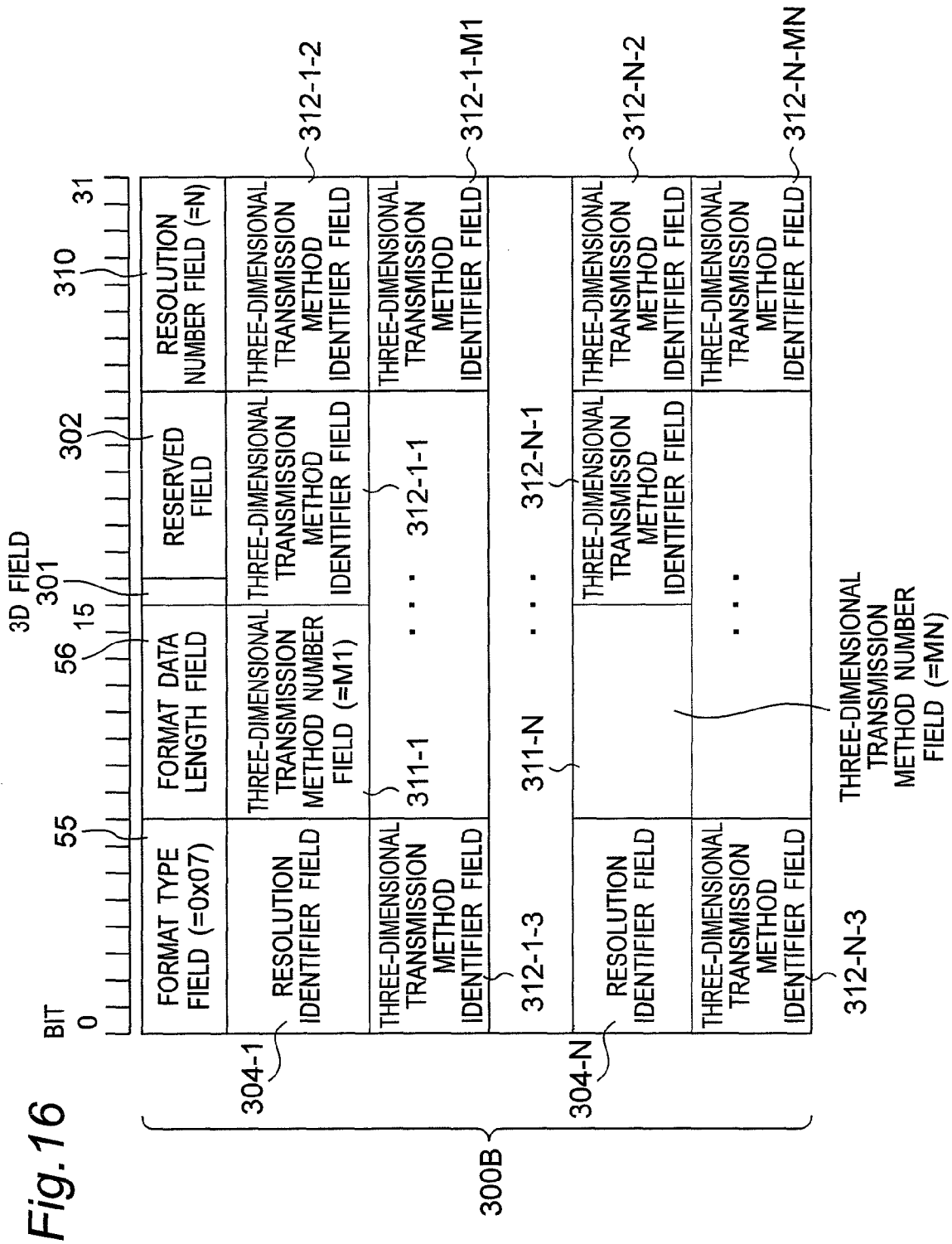
FIG. 16 is a diagram showing a format of a three-dimensional information message 300B according to a third preferred embodiment of the present invention.

FIG. 16 is a diagram showing a format of a three-dimensional information message 300B according to a third preferred embodiment of the present invention. The three-dimensional information message 300B according to the present preferred embodiment is different from the three-dimensional information message 300 according to the first preferred embodiment in the following respects.

(1) The three-dimensional information message 300B includes a resolution number field 310 storing the total number N of the VICs included in the video information message 200 instead of the three-dimensional format number field 303.

(2) The three-dimensional information message 300B includes three-dimensional transmission method number fields 311-1 to 311-N and three-dimensional transmission method identifier fields 312-1-1, . . . , 312-1-M1, 312-2-1, . . . , 312-1-M2, . . . , 312-N-1, . . . , and 312-N-NM instead of the three-dimensional transmission method identifier fields 305-1 to 305-N. In this case, the three-dimensional transmission method number fields 311-1 to 311-N are provided so as to correspond to resolution identifier fields 304-1 to 304-N, respectively, and store the numbers M1 to MN of three-dimensional transmission methods supported by the sink device 120 for the resolutions corresponding to the resolution identifiers stored in the corresponding resolution identifier fields 304-1 to 304-N, respectively. In addition, subsequent to the respective three-dimensional transmission method number fields 311-n (n=1, 2, . . . , N), there is provided Mn three-dimensional transmission method identifier fields 312-n-1, . . . , and 312-n-Mn each storing a three-dimensional transmission method identifier for identifying the three-dimensional transmission method, respectively.

As described above, according to the present preferred embodiment, the sink device 120 transmits the input format information message 5 including video information message 200 and the three-dimensional information message 300B to the source device 110. Therefore, the sink device 120 can notify the source device 110 that the sink device 120 supports the three-dimensional display, and can notify the source device 110 of all of the resolutions and the three-dimensional transmission methods of the supported three-dimensional video data. In addition, the source device 110 identifies the resolutions and three-dimensional transmission methods of the supported three-dimensional video data based on the input format information message 5 from the sink device 120, generates the video data having the identified resolution and three-dimensional transmission method, and transmits the video data to the sink device 120. Therefore, the source device 110 can transmit the three-dimensional video data to the sink device 120.

Fourth Preferred Embodiment

Figure 17:
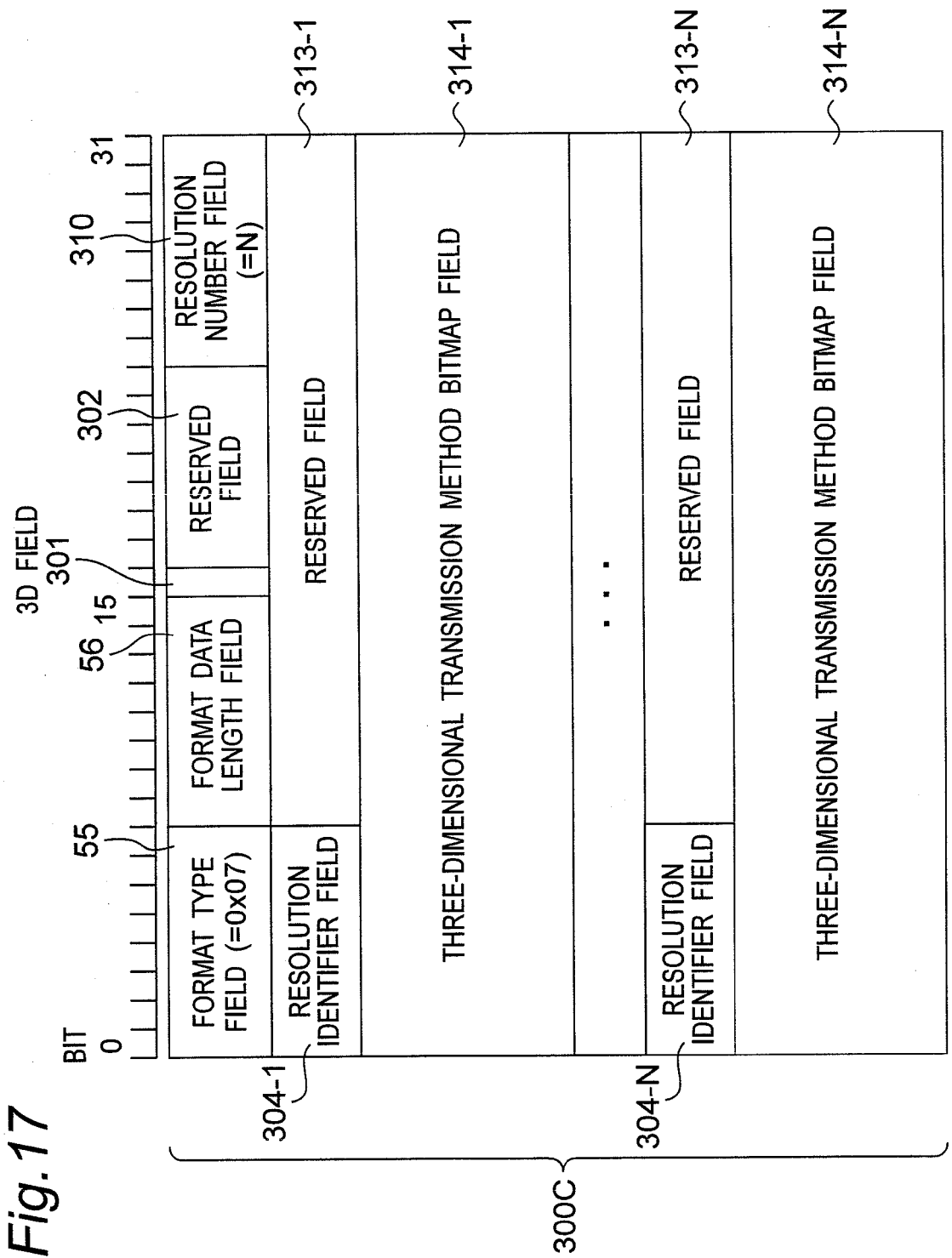
FIG. 17 is a diagram showing a format of a three-dimensional information message 300C according to a fourth preferred embodiment of the present invention.

FIG. 17 is a diagram showing a format of a three-dimensional information message 300C according to a fourth preferred embodiment of the present invention. The three-dimensional information message 300C according to the present preferred embodiment is different from the three-dimensional information message 300B according to the third preferred embodiment in such a respect that the three-dimensional information message 300C includes reserved fields 313-1 to 313-N and three-dimensional transmission method bitmap fields 314-1 to 314-N, instead of the three-dimensional transmission method number fields 311-1 to 311-N and the three-dimensional transmission method identifier fields 312-1-1, . . . , 312-1-M1, 312-2-1, . . . , 312-2-M2, . . . , 312-N-1, . . . , and 312-N-NM.

Referring to FIG. 17, the three-dimensional transmission method bitmap fields 314-1 to 314-N are provided so as to correspond to resolution identifier fields 304-1 to 304-N, respectively. The three-dimensional transmission method bitmap fields 314-1 to 314-N store bitmap data representing three-dimensional transmission methods supported by the sink device 120 for the resolution corresponding to the resolution identifiers stored in the corresponding resolution identifier fields 304-1 to 304-N, respectively. In this case, when a value of a bit of bitmap data is set to 1, this indicates that the sink device 120 supports a three-dimensional transmission method corresponding to the bit. On the other hand, when a value of a bit of bitmap data is set to 0, this indicates that the sink device 120 does not support the three-dimensional transmission method corresponding to the bit.

As described above, according to the present preferred embodiment, the sink device 120 transmits the input format information message 5 including video information message 200 and the three-dimensional information message 300C to the source device 110. Therefore, the sink device 120 can notify the source device 110 that the sink device 120 supports the three-dimensional display, and can notify the source device 110 of all of the resolutions and the three-dimensional transmission methods of the supported three-dimensional video data. In addition, the source device 110 identifies the resolutions and three-dimensional transmission methods of the supported three-dimensional video data based on the input format information message 5 from the sink device 120, generates the video data having the identified resolution and three-dimensional transmission method, and transmits the video data to the sink device 120. Therefore, the source device 110 can transmit the three-dimensional video data to the sink device 120.

Fifth Preferred Embodiment

Figure 18:
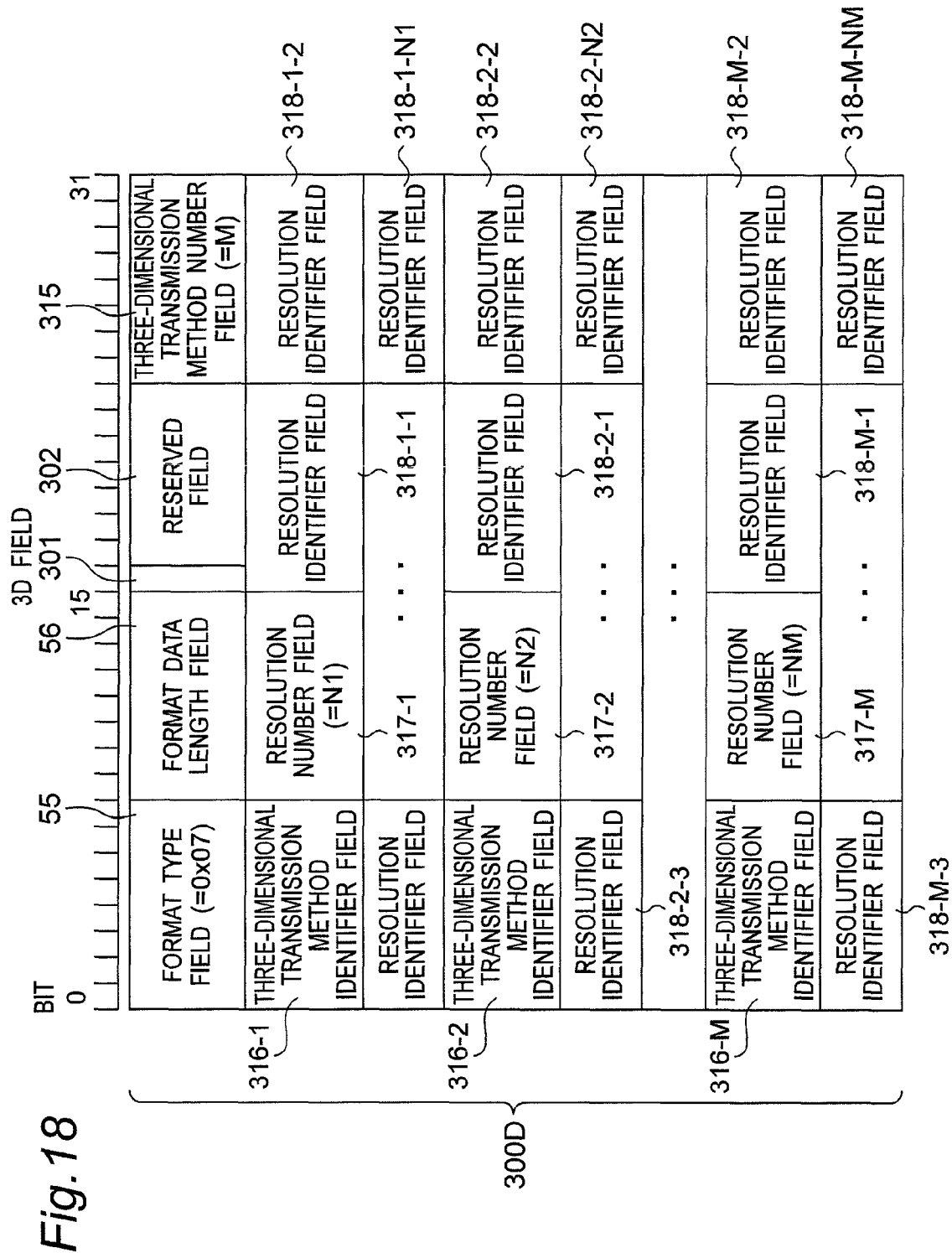
FIG. 18 is a diagram showing a format of a three-dimensional information message 300D according to a fifth preferred embodiment of the present invention.

FIG. 18 is a diagram showing a format of a three-dimensional information message 300D according to a fifth preferred embodiment of the present invention. Referring to FIG. 18, the three-dimensional information message 300D includes the following fields, in addition to the format type field 55, the format data length field 56, the 3D field 301, and the reserved field 302.

(1) A three-dimensional transmission method number field 315 storing data representing a number M of three-dimensional transmission methods supported by the sink device 120.

(2) Three-dimensional transmission method identifier fields 316-1 to 316-M storing three-dimensional transmission method identifiers for identifying the three-dimensional transmission methods supported by the sink device 120, respectively.

(3) Resolution number fields 317-1 to 317-M provided so as to correspond to the three-dimensional transmission method identifier fields 316-1 to 316-M, and storing numbers N1 to NM of resolutions supported by the sink device 120 for the three-dimensional transmission methods corresponding to the three-dimensional transmission method identifiers stored in the corresponding three-dimensional transmission method identifier fields 316-1 to 316-M, respectively.

(4) Resolution identifier fields 318-1-1, . . . , 318-1-N1, 318-2-1, 318-2-N2, . . . , 318-M-1, and 318-M-NM. In this case, subsequent to the respective resolution number fields 317-1 to 317-$m$ ($m$=1, 2, . . . , M), there are provided Nm resolution identifier fields 318-$m$-1 to 318-Nm storing resolution identifiers for identifying resolutions, respectively.

In the first to fourth preferred embodiments described above, the sink device 120 transmits the input format information message 5 including the video information message 200, and the three-dimensional information message 300, 300A, 300B or 300C to the source device 110. However, in the present preferred embodiment, the sink device 120 transmits an input format information message 5 which does not include the video information message 200 but includes the three-dimensional information message 300C to the source device 110. Therefore, the sink device 120 can notify the source device 110 that the sink device 120 supports the three-dimensional display, and can notify the source device 110 of all of the resolutions and the three-dimensional transmission methods of the supported three-dimensional video data. In addition, the source device 110 identifies the resolutions and three-dimensional transmission methods of the supported three-dimensional video data based on the input format information message 5 from the sink device 120, generates the video data having the identified resolution and three-dimensional transmission method, and transmits the video data to the sink device 120. Therefore, the source device 110 can transmit the three-dimensional video data to the sink device 120.

Sixth Preferred Embodiment

Figure 19:
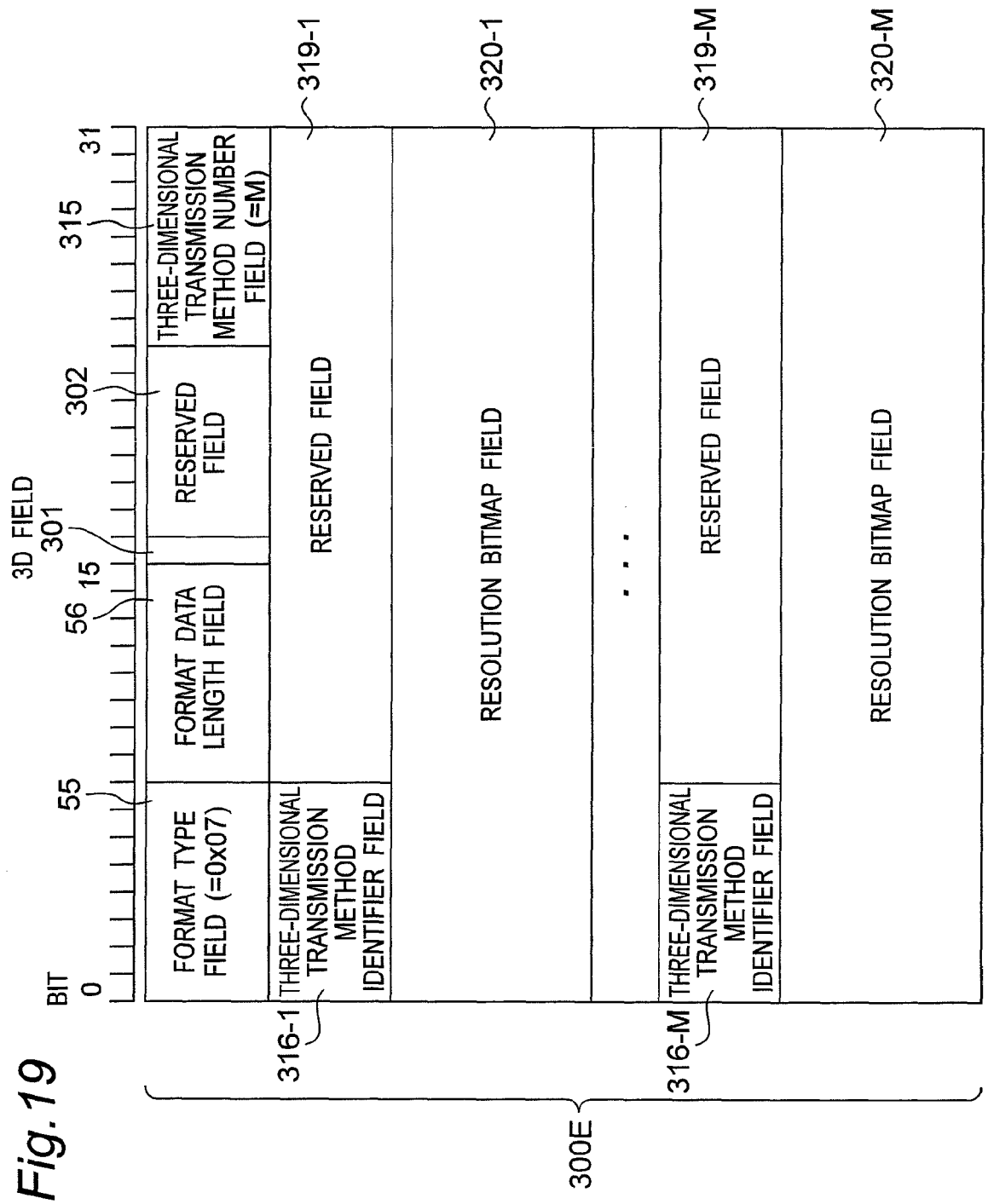
FIG. 19 is a diagram showing a format of a three-dimensional information message 300E according to a sixth preferred embodiment of the present invention.

FIG. 19 is a diagram showing a format of a three-dimensional information message 300E according to a sixth preferred embodiment of the present invention. The three-dimensional information message 300E according to the present preferred embodiment is different from the three-dimensional information message 300D according to the fifth preferred embodiment in such a respect that the three-dimensional information message 300E includes reserved fields 319-1 to 319-M and resolution bitmap fields 320-1 to 320-M instead of the resolution identifier fields 318-1-1, . . . , 318-1-N1, 318-2-1, 318-2-N2, . . . , 318-M-1, and 318-M-NM.

Referring to FIG. 19, the resolution bitmap fields 320-1 to 320-M are provided so as to correspond to the three-dimensional transmission method fields 316-1 to 316-M, and store bitmap data representing resolutions supported by the sink device 120 for the three-dimensional transmission methods corresponding to the three-dimensional transmission method identifiers stored in the corresponding three-dimensional transmission method fields 316-1 to 316-M, respectively. In this case, when a value of a bit of the bitmap data is set to 1, this indicates that the sink device 120 supports the resolution corresponding to the bit. On the other hand, when the value of a bit of the bitmap data is set to 0, this indicates that the sink device 120 does not support the resolution corresponding to the bit.

As described above, according to the present preferred embodiment, the sink device 120 transmits the input format information message 5 including the three-dimensional information message 300E to the source device 110. Therefore, the sink device 120 can notify the source device 110 that the sink device 120 supports the three-dimensional display, and can notify the source device 110 of all of the resolutions and the three-dimensional transmission methods of the supported three-dimensional video data. In addition, the source device 110 identifies the resolutions and three-dimensional transmission methods of the supported three-dimensional video data based on the input format information message 5 from the sink device 120, generates the video data having the identified resolution and three-dimensional transmission method, and transmits the video data to the sink device 120. Therefore, the source device 110 can transmit the three-dimensional video data to the sink device 120.

Seventh Preferred Embodiment

Figure 20:
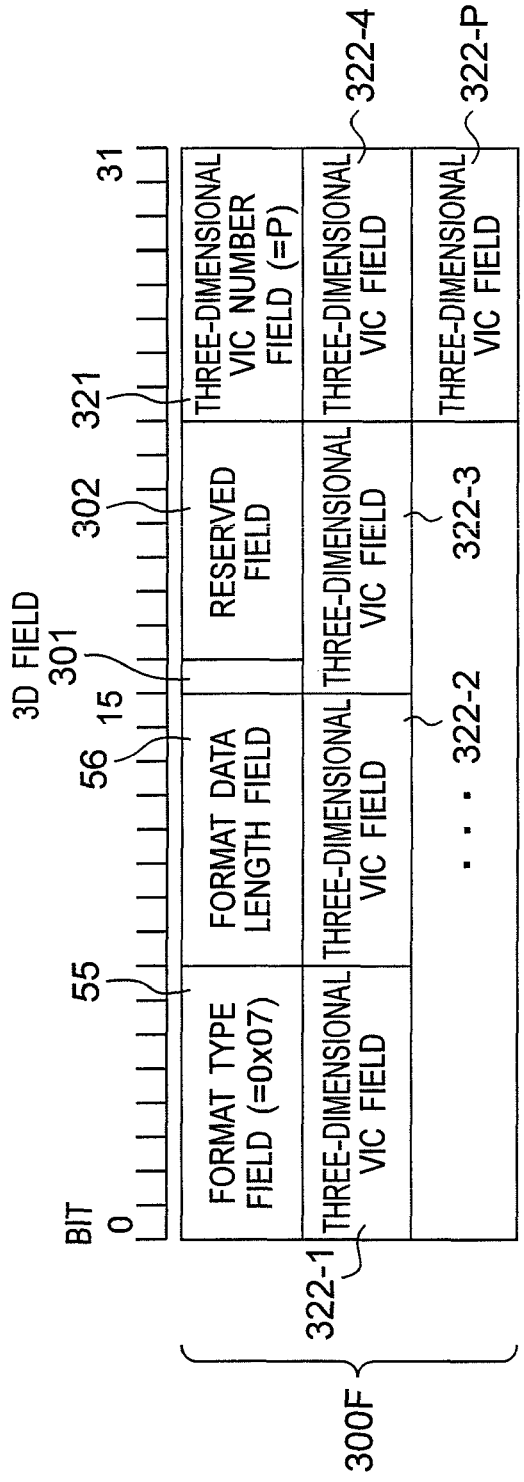
FIG. 20 is a diagram showing a format of a three-dimensional information message 300F according to a seventh preferred embodiment of the present invention.

FIG. 20 is a diagram showing a format of a three-dimensional information message 300F according to a seventh preferred embodiment of the present invention. Referring to FIG. 20, the three-dimensional information message 300F includes the following fields, in addition to the format type field 55, the format data length field 56, the 3D field 301, and the reserved field 302.

(1) A three-dimensional VIC number field 321 storing data representing a number P of three-dimensional VICs supported by the sink device 120.

(2) Three-dimensional VIC fields 321-1 to 321-P storing the three-dimensional VICs supported by the sink device 120, respectively.

In this case, the three-dimensional VICs are identifiers for identifying resolutions (namely, each of the resolutions represents the number of vertical active pixels, the number of horizontal active pixels, the scanning method, and the field rate) of the video data, and the three-dimensional transmission methods. For example, the three-dimensional VICs are defined as follows.

Three-dimensional VIC="1": 1080p, 23.97 Hz/24 Hz, frame packing;
Three-dimensional VIC="2": 720p, 59.94 Hz/60 Hz, frame packing; and
Three-dimensional VIC="3": 720p, 50 Hz, frame packing.

As described above, according to the present preferred embodiment, the sink device 120 transmits the input format information message 5 including the three-dimensional information message 300F to the source device 110. Therefore, the sink device 120 can notify the source device 110 that the sink device 120 supports the three-dimensional display, and can notify the source device 110 of all of the resolutions and the three-dimensional transmission methods of the supported three-dimensional video data. In addition, the source device 110 identifies the resolutions and three-dimensional transmission methods of the supported three-dimensional video data based on the input format information message 5 from the sink device 120, generates the video data having the identified resolution and three-dimensional transmission method, and transmits the video data to the sink device 120. Therefore, the source device 110 can transmit the three-dimensional video data to the sink device 120.

The three-dimensional VICs may be defined as VICs extended from the VICs according to the first to sixth preferred embodiments. For example, VICs having values of 38 to 40, respectively, may be allocated to video formats of three-dimensional video data as follows, respectively.

VIC="38": 1080p, 23.97 Hz/24 Hz, frame packing;
VIC="39": 720p, 59.94 Hz/60 Hz, frame packing; and
VIC="40": 720p, 50 Hz, frame packing.

When the sink device 120 supports the video formats corresponding to the VICs having the values of 38 to 40, the sink device 120 stores 38, 39, 40 in the VIC fields 322-1 to 322-3 of the video information message 300F, respectively, and transmits the video information message 300F to the source device 110. In response to this, the source device 110 selects one of the VICs having the values of 38, 39, and 40, and transmits video data having the video format corresponding to the selected VIC to the sink device 120.

Eighth Preferred Embodiment

Figure 21:
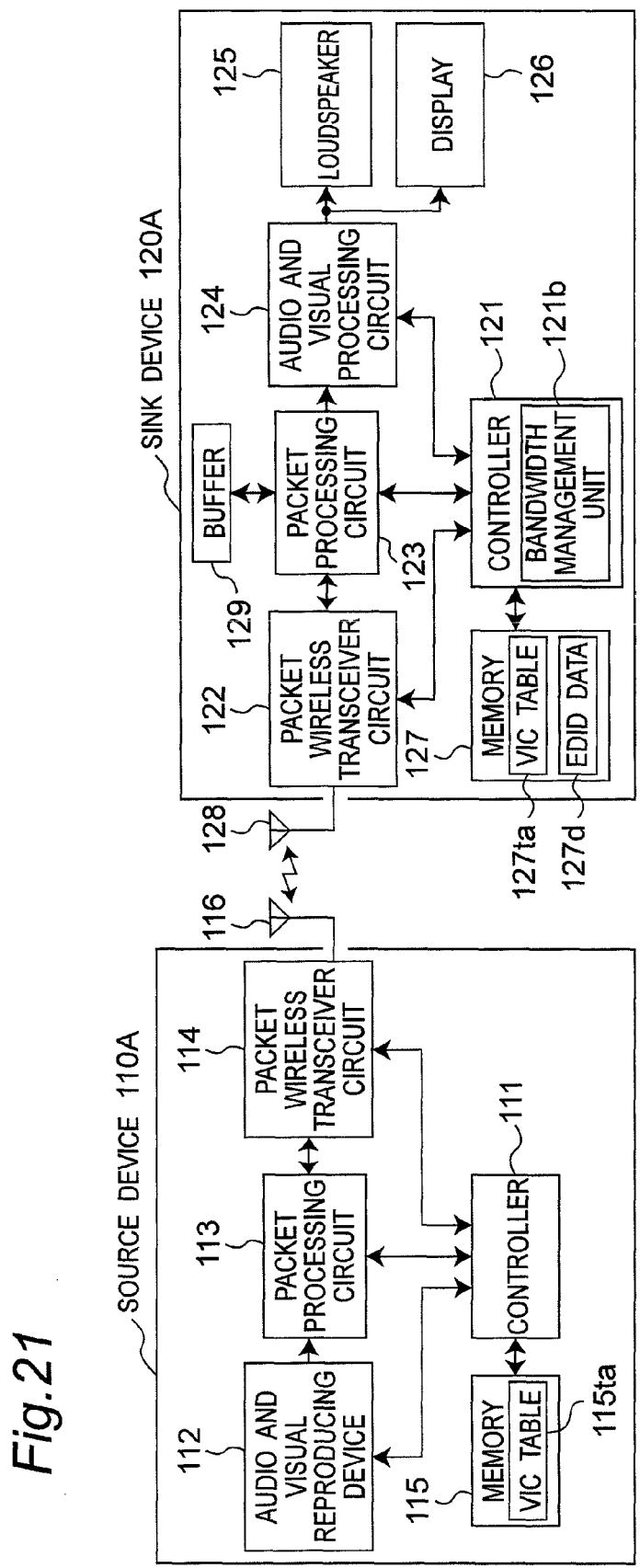
FIG. 21 is a block diagram showing a configuration of a wireless communication system for transmitting video data using a video data packet transmission method according to an eighth preferred embodiment of the present invention.

FIG. 21 is a block diagram showing a configuration of a wireless communication system for transmitting video data using a video data packet transmission method according to an eighth preferred embodiment of the present invention. FIGS. 22 and 23 are tables showing each of VIC tables 115ta and 127ta of FIG. 21.

Referring to FIG. 21, the wireless communication system according to the present preferred embodiment is configured to include a source device 110A and a sink device 120A. As described later in detail, the sink device 120A is characterized by transmitting a video information message 200A including VICs for identifying video formats supported by the sink device 120A, which are selected from among a plurality of VICs for identifying video formats, to the source device 110A. Each of the video formats includes a resolution of the video data, a type of the video data, and a three-dimensional transmission method for three-dimensional video data when the type of the video data is the three-dimensional video data including first and second video frames. In addition, the source device 110A is characterized by receiving the video information message 200A from the sink device 110A, selects one VIC of the VICs included in the received video information message 200A, generating video data having a video format corresponding to the selected VIC, and transmitting the video data to the sink device 120A.

Referring to FIG. 21, as compared with the source device 110 according to the first preferred embodiment, the source device 110A is characterized by previously storing the VIC table 115ta instead of the VIC table 115 in the memory 115. In addition, as compared with the sink device 120 according to the first preferred embodiment, the sink device 120A is characterized by previously storing the VIC table 127ta instead of the VIC table 127t in the memory 127 and by further including a buffer 129 used to decode (expand) coded (compressed) video data (referred to as coded video data hereinafter). In the above-described preferred embodiments, each of the VIC tables 115t and 127t is configured to show the relation among the VICs, the numbers of vertical active pixels of video data, the numbers of horizontal active pixels of the video data, the scanning methods, and the field rates, and the VICs are allocated only to the video formats of the two-dimensional video data. On the other hand, according to the present preferred embodiment, as shown in FIGS. 22 and 23, each of the VIC tables 115ta and 127ta is configured to show relation among the VICs, the numbers of vertical active pixels of video data, the numbers of horizontal active pixels of the video data, the scanning methods, the field rates, the type of the video data (two-dimensional video data (2D) or three-dimensional video data (3D)), and the three-dimensional transmission methods of three-dimensional video data when the video data is the three-dimensional video data. Namely, in the present preferred embodiment, the VICs are allocated to the respective video formats of the two-dimensional video data and the respective video formats of the three-dimensional video data, and identify the numbers of vertical active pixels of the video data, the numbers of horizontal active pixels of the video data, the scanning methods, the field rates, the types of the video data, and the three-dimensional transmission methods of three-dimensional video data when the video data is the three-dimensional video data. As shown in FIG. 23, in the present preferred embodiment, VICs having values from 96 to 99 are allocated to the video formats of the three-dimensional video data, respectively.

In addition, in FIG. 21, the packet processing circuit 123 decodes the received packets by extracting only the video data, the audio data, and the predetermined command from the inputted digital signal by the predetermined packet separation processing, outputs the video data and the audio data to the audio and visual processing circuit 124, and outputs the control command to the controller 121. In this case, the packet processing circuit 123 decodes (expands) the video data using the buffer 129 when the extracted video data is coded (compressed).

FIG. 24 is a table showing relation between values stored in the format type field 55 of FIG. 9 according to the eighth preferred embodiment of the present invention and format types. As shown in FIG. 24, in the present preferred embodiment, as compared with the first preferred embodiment (See FIG. 10), coded video information (CODED_VIDEO_INFO) is newly defined instead of the three-dimensional information as a format type indicated using the value stored in the format type field 55 of the input format information message 5. In the present preferred embodiment and each of the following preferred embodiments, the format data message 54 including the format type field 55 storing a value (0x07) corresponding to the coded video information will be referred to as a coded video information message 400.

Figure 25:
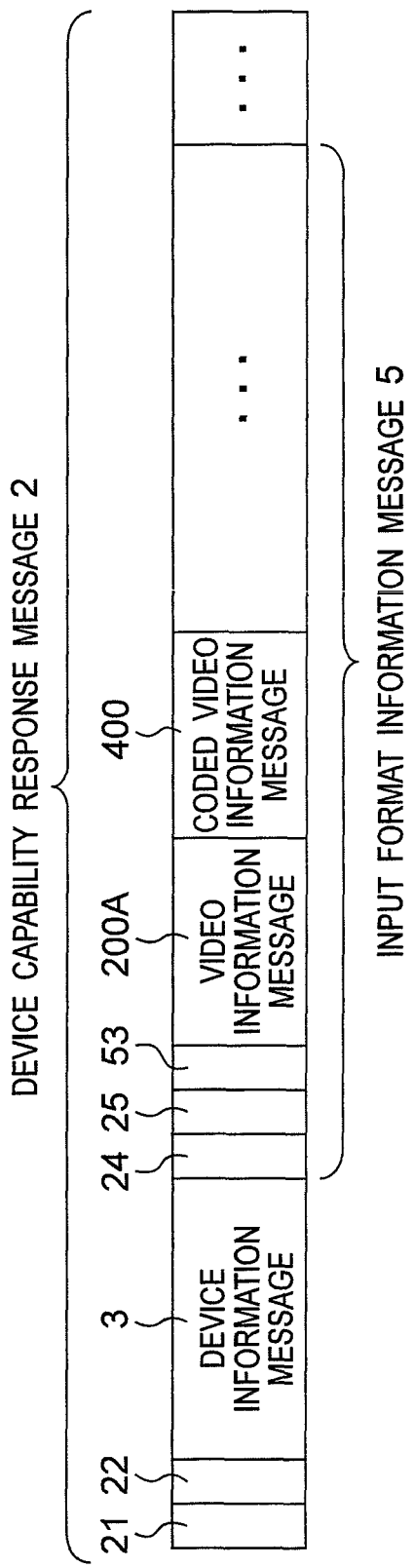
FIG. 25 is a diagram showing a format of the device capability response message 2 transmitted by a sink device 120A of FIG. 21.

FIG. 25 is a diagram showing a format of the device capability response message 2 transmitted by the sink device 120A of FIG. 21. The sink device 120A supports the coded video data, and transmits the device capability response message 2 including the input format information message 5 which includes the video information message 200A to be described later in detail and the coded video information message 400 to the source device 110A.

Figure 26:
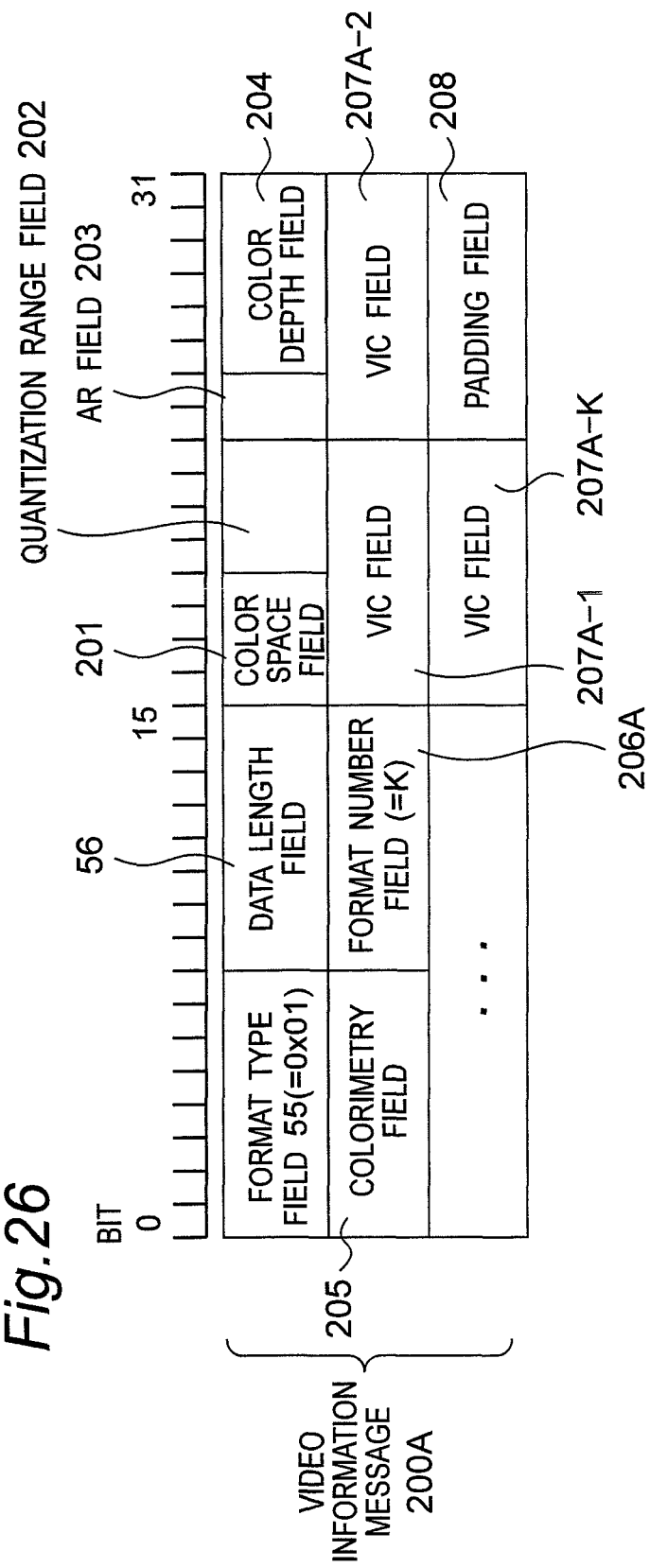
FIG. 26 is a diagram showing a format of a video information message 200A of FIG. 25.

FIG. 26 is a diagram showing a format of the video information message 200A of FIG. 25. The video information message 200A according to the present preferred embodiment is different from the video information message 20 according to the first preferred embodiment in the following respects.

(8) The video information message 200A includes a format number field 206A storing a total number K (K is an integer equal to or larger than 1) of the two-dimensional video formats and the three-dimensional video formats supported by the sink device 120A, instead of the format number field 206.

(9) The video information message 200A includes K VIC fields 207A-1 to 207A-K storing the VICs for identifying the two-dimensional video formats and the three-dimensional video formats supported by the sink device 120A, respectively, instead of the VIC fields 207-1 to 207-N. In this case, the VIC fields 207A-1 to 207A-K store the VICs, which are supported by the sink device 120A, included in the EDID data 127d, and selected from among the VICs included in the VIC table 127ta.

Figure 27:
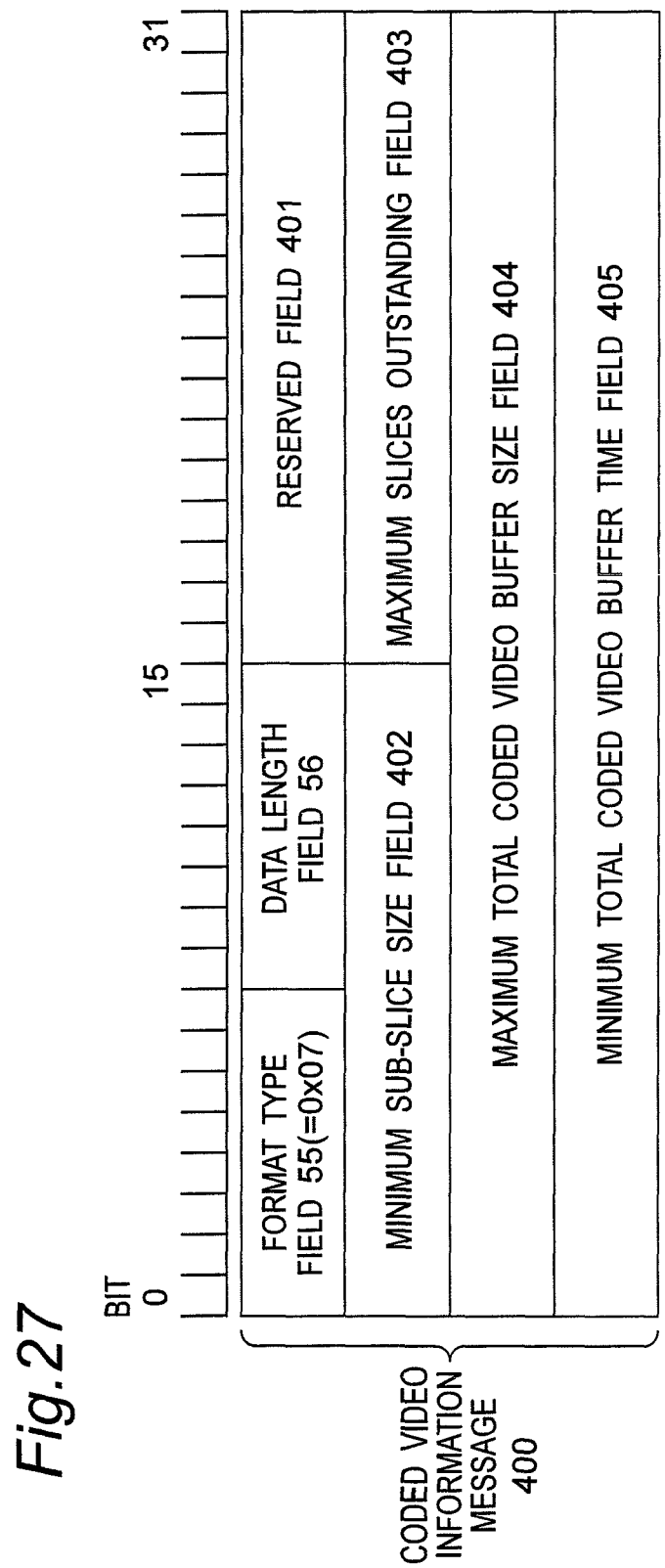
FIG. 27 is a diagram showing a format of a coded video information message 400 of FIG. 25.

FIG. 27 is a diagram showing a format of the coded video information message 400 of FIG. 25. Referring to FIG. 27, the coded video information message 400 includes the following fields.

(1) The format type field 55 storing the value (0x07) corresponding to the coded video information.

(2) The data length field 56 storing data representing the data length of the fields excluding the format type field 55 and the data length field 56 from the coded video information message 400.

(3) A reserved field 401 reserved for future use.

(4) A minimum sub-slice size field 402 storing data representing a minimum sub-slice size, in octets, that the sink device 120A is able to handle.

(5) A maximum slices outstanding field 403 storing data representing a maximum number of slices that the sink device 120A is able to buffer.

(6) A maximum total coded video buffer size field 404 storing data representing a maximum size, in octets, of the buffer 129 of the sink device 120A allocated for the coded (compressed) video data.

(7) A maximum total coded video buffer time field 405 storing data representing a maximum time that the sink device 120A is able to buffer for the coded video data.

Referring to FIG. 27, parameters stored in the fields 402 to 405 are coding (compressing) parameters used when the source device 110A codes (compresses) the video data by a predetermined coding (compressing) method, respectively. It is to be noted that when the sink device 120A supports or can decode (expand) the coded video data, the sink device 120A transmits the coded video information message 400 to the source device 110A, and when the sink device 120A does not support or cannot decode (expand) the coded video data, the sink device 120A does not transmit the coded video information message 400 to the source device 110A.

Next, operation of the wireless communication system of FIG. 21 will be described concretely. First of all, the source device 110A transmits the device capability request message 1 for requesting the device information and the format information to the sink device 120A. In response to this, the sink device 120A transmits the device capability response message 2 (See FIG. 25) including the input format information message 5, which includes the video information message 200A and the coded video information message 400, to the source device 110A. The source device 110A refers to the VIC table 115ta based on the VICs included in the received device capability response message 2, and identifies the video formats of the two-dimensional video data and the video formats of the three-dimensional video data supported by the sink device 120A. Further, the source device 110A identifies whether or not the sink device 120A supports the coded video data, based on whether or not the received device capability response message 2 includes the coded video information mess age 400. Further, the source device 110A selects one video format of the video formats of the two-dimensional video data and the video formats of the three-dimensional video data supported by the sink device 120A. Then, the source device 110A generates video data having the selected video format by the packet processing circuit 113. Further, the packet processing circuit 113 combines a plurality of video frame data included in the video data into one combined video frame data for every video frame based on the generated video data in a manner similar to that of the first preferred embodiment, when the selected video format is the video format of the three-dimensional video data. Further, the packet processing circuit 113 divides the combined video frame data into a plurality of packets according to the packet format compliant with the WirelessHD, so as to store horizontal position information in the horizontal display interval and vertical position information in the vertical display interval of a first pixel of the combined video frame data stored in each of sub-packets for transmitting the combined video frame data, in the H-position field and the V-position field included in the header of each of the sub-packets, respectively, as information for identifying the plurality of video frame data. Further, the packet processing circuit 113 codes (compresses) the packets with a predetermined coding method using the coding parameters included in the received coded video information message 400.

The controller 111 of the source device 110A transmits the stream start notify message 8 or the output format notify message 10 including information on the video format of the video data to be transmitted to the sink device 120A, and thereafter, controls the packet wireless transceiver circuit 114 to wirelessly transmit the AV data including the generated plurality of packets to the sink device 120A for the allocated reservation time period. The sink device 120A extends the received packets, and decodes the video data in the received AV data based on the data on the video format included in the received output format notify message 10.

As described above, according to the present preferred embodiment, the sink device 120A transmits the input format information message 5 including the video information message 200A, which includes the VICs of the video formats supported by the sink device 120A, which are selected from among a plurality of VICs for identifying the video formats to the source device 110A. Each of the video formats includes the number of vertical active pixels of video data, the number of horizontal active pixels of the video data, the scanning method, the field rate, the type, and the three-dimensional transmission method of three-dimensional video data when the type of the video data is the three-dimensional video data, to the source device 110. Therefore, the sink device 120A can notify the source device 110A that the sink device 120A supports the three-dimensional display, and can notify the source device 110A of the resolutions and three-dimensional transmission methods of the supported three-dimensional video data. In addition, the source device 110A refers to the VIC table 115ta based on the VICs included in the video information message 200A from the sink device 120A, identifies the resolutions and three-dimensional transmission methods of the three-dimensional video data supported by the sink device 120A, generates video data having one of the identified resolutions and one of the identified three-dimensional transmission methods, and transmits the video data to the sink device 120A. Therefore, the source device 110A can transmit the three-dimensional video data to the sink device 120A.

Ninth Preferred Embodiment

FIG. 28 is diagram showing a format of a video information message 200B according to a ninth preferred embodiment of the present invention. As compared with the video information message 200A according to the eighth preferred embodiment, the video information message 200B according to the present preferred embodiment is characterized by further including the following fields.

(1) A CFBM (supported Content Flag Bitmap) field 209 storing bitmap data representing types of contents supported by the sink device 120A. Bit 8 of the bitmap data stored in the CFBM field 209 is allocated to Text, bit 9 is allocated to Photo, bit 10 is allocated to Cinema, bit 11 is allocated to Game, and bits 0 to 7 and 12 to 15 are reserved bits. When a value of a bit of the bitmap data is set to 1, this indicates that the sink device 120A supports the content corresponding to the bit. On the other hand, when a value of a bit of the bitmap data is set to 0, this indicates that the sink device 120A does not support the content corresponding to the bit.

(2) A PMBM (Partition Mode Bitmap) field 210 storing data representing partition modes supported by the sink device 120A. In this case, in each partition mode, video pixel data is divided into a plurality of fields, and the fields are transmitted using sub-packets different from each other, respectively. For example, when the partition mode is "2x2", four video pixel data adjacent to each other are transmitted using one sub-packet. Bit 0 of the bitmap data stored in the PMBM field 210 is allocated to 2x2, bit 1 is allocated to 1x1, bit 2 is allocated to 1x2, bit 3 is allocated to 2x1, bit 4 is allocated to 2x4, bit 5 is allocated to 4x2, bit 6 is allocated to 4x4, bit 7 is allocated to 2x2 chroma, and bits 8 to 15 are reserved bits. When a value of a bit of the bitmap data is set to 1, this indicates that the sink device 120A supports the partition mode corresponding to the bit. On the other hand, when a value of a bit of the bitmap data is set to 0, this indicates that the sink device 120A does not support the partition mode corresponding to the bit.

(3) An ST field 211 storing data representing whether or not the sink device 120A supports the three-dimensional video data. The ST field 211 stores 1 when the sink device 120A supports the three-dimensional video data, and stores 0 when the sink device 120A does not support the three-dimensional video data.

(4) A reserved field 212 reserved for future use.

It is noted that, in the present preferred embodiment, the sink device 120A performs a predetermined processing according to the type of a content of the video data. For example, when the type of the content of video data is Game, the sink device 120A performs only a predetermined minimum processing so as to minimize a delay generated by a data processing.

As described above, according to the present preferred embodiment, the video information message 200B further includes the ST field 211 as compared with the video information message 200A. Therefore, as compared with the eighth preferred embodiment, the sink device 120A can notify the source device 110A whether or not the sink device supports the three-dimensional video data or not.

Tenth Preferred Embodiment

FIG. 29 is a table showing relation between values stored in the format type field 55 of FIG. 9 according to a to nth preferred embodiment of the present invention and format types. As shown in FIG. 29, in the present preferred embodiment, extended video information (EXTENDED_VIDEO_INFO) is newly defined as one format type represented using the value stored in the format type field 55 of the input format information message 5, as compared with the eighth preferred embodiment (See FIG. 24). In the present preferred embodiment and the following preferred embodiments, the format data message 54 including the format type field 55 storing a value (0x08) corresponding to the extended video information will be referred to as an extended video information message 900.

FIG. 30 is a diagram showing a format of the device capability response message 2 transmitted by the sink device 120A of FIG. 21 in the tenth preferred embodiment of the present invention. As shown in FIG. 30, the sink device 120A transmits the device capability response message 2 including the input format information message 5, which includes the video information message 200A and the coded video information message 400, to the source device 110A. In addition, when the sink device 120A supports the coded video data, the sink device 120A sets the coded video information message 400 to the input format information message 5. On the other hand, when the sink device 120A does not support the coded video data, the sink device 120A does not set the coded video information message 400 to the input format information message 5.

Figure 31:
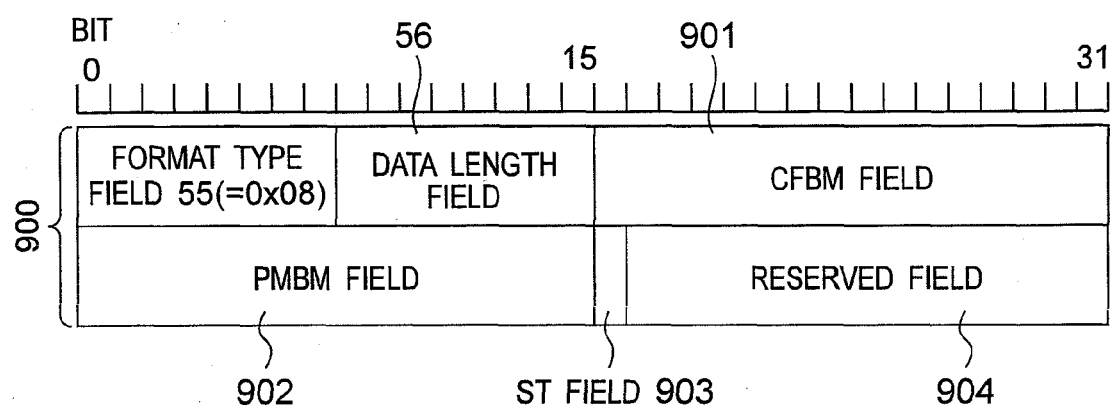
FIG. 31 is a diagram showing a format of an extended video information message 900 of FIG. 30.

FIG. 31 is a diagram showing a format of the extended video information message 900 of FIG. 30. Referring to FIG. 31, the extended video information message 900 includes the following fields.

(1) The format type field 55 storing a value (0x08) corresponding to the extended video information.

(2) The data length field 56 storing the data representing the data length of the fields excluding the format type field 55 and the data length field 56 from the extended video information message 900.

(3) A CFBM field 901 storing bitmap data representing types of contents supported by the sink device 120A. The CFBM field 901 is configured in a manner similar to that of the CFBM field 209 of the video information message 200B.

(4) A PBM field 902 storing data representing partition modes supported by the sink device 120A. The PBM field 902 is configured in a manner similar to that of the PMBM field of the video information message 200B.

(5) An ST field 902 storing data representing whether or not the sink device 120A supports the three-dimensional video data. The ST field 903 stores 1 when the sink device 120A supports the three-dimensional video data, and stores 0 when the sink device 120A does not support the three-dimensional video data.

(6) A reserved field 904 reserved for future use.

As described above, according to the present preferred embodiment, the sink device 120A transmits the extended video information message 900 including the ST field 211 to the source device 110A. Therefore, as compared with the eighth preferred embodiment, the sink device 120A can notify the source device 110A whether or not the sink device 120A supports three-dimensional video data.

Eleventh Preferred Embodiment

Figure 32:
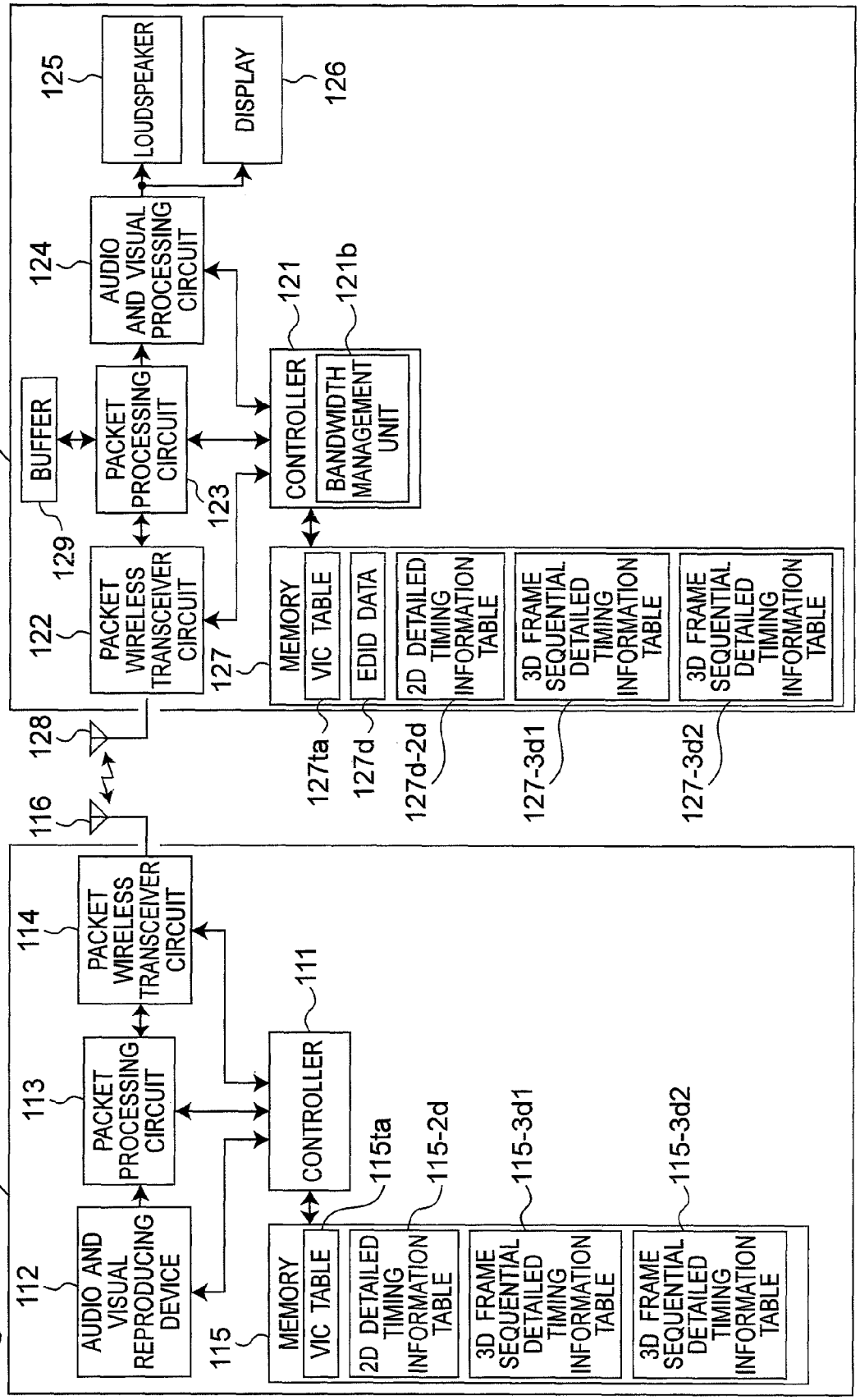
FIG. 32 is a block diagram showing a configuration of a wireless communication system for transmitting video data using a video data packet transmission method according to an eleventh preferred embodiment of the present invention.

FIG. 32 is a block diagram showing a configuration of a wireless communication system for transmitting video data using a video data packet transmission method according to an eleventh preferred embodiment of the present invention. In addition, FIG. 33 is a table showing each of 3D frame sequential detailed timing information tables 115-3$d$1 and 127-3$d$1 of FIG. 32. FIG. 34 is a table showing each of 3D frame sequential detailed timing information tables 115-3$d$2 and 127-3$d$2 of FIG. 32. Referring to FIG. 32, the wireless communication system according to the present preferred embodiment is configured to include a source device 110B and a sink device 120B. As compared with the source device 110A according to the eighth preferred embodiment, the source device 110B is characterized by previously storing the VIC table 115$ta$, a 2D detailed timing information table 115-2$d$, the 3D frame sequential detailed timing information tables 115-3$d$1 and 115-3$d$2 in the memory 115. In addition, as compared with the sink device 120A according to the eighth preferred embodiment, the sink device 120B is characterized by previously storing the VIC table 127$ta$, a 2D detailed timing information table 127-2$d$, and the 3D frame sequential detailed timing information tables 127-3$d$1 and 127-3$d$2 in the memory 127.

Referring to FIG. 32, each of the 2D detailed timing information tables 115-2$d$ and 127-2$d$ shows relation between (a) the VICs of the two-dimensional video data, and (b) parameters for generating two-dimensional video frame data based on the two-dimensional video data for every video frame. Concretely speaking, each of the 2D detailed timing information tables 115-2$d$ and 127-2$d$ shows a relation among the VICs (having values from 1 to 50, respectively) for identifying the video formats of the two-dimensional video data defined in each of the VIC tables 115$ta$ and 127$ta$, the scanning methods, the number of pixels of the horizontal active interval Hactive, the number of pixels of the horizontal blanking interval Hblank, the number of pixels of the vertical active interval Vactive, the number of pixels of the vertical blanking interval Vblank, the field rates (Hz), and the pixel frequencies (MHz).

In addition, referring to FIG. 33, each of the 3D frame sequential detailed timing information tables 115-3$d$1 and 127-3$d$1 shows relation between (a) the VICs of the three-dimensional video data, and (b) parameters for combining left-eye video frame data 181A and right-eye video frame data 182A included in the three-dimensional video data into combined video frame data 183A, which does not include any blanking interval, using a first combining method for every video frame. Concretely speaking, each of the 3D frame sequential detailed timing information tables 115-3$d$1 and 127-3$d$1 shows the relation among the VICs (having values from 96 to 99, respectively) for identifying the video formats of the three-dimensional video data defined in each of the VIC tables 115$ta$ and 127$ta$, the scanning methods, the number of pixels of the horizontal active interval Hactive, the number of pixels of the horizontal blanking interval Hblank, the number of pixels of the vertical active interval Vactive, the number of pixels of the vertical blanking interval Vblank, the field rates (Hz), and the pixel frequencies (MHz).

Figure 35:
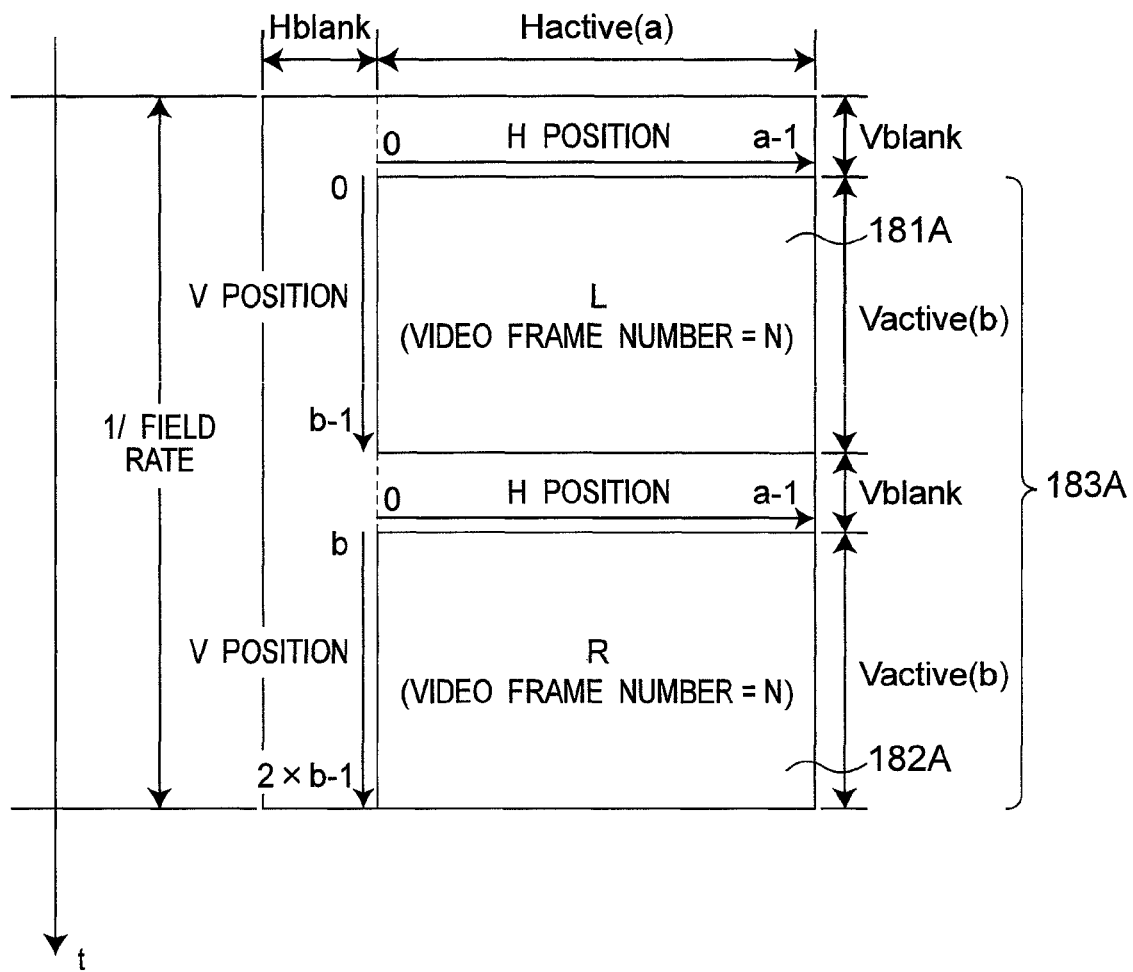
FIG. 35 is a data arrangement diagram showing relation among combined video frame data 183A generated by a source device 110B of FIG. 32 using a first combining method, and respective timing values of FIG. 33.

FIG. 35 is a data arrangement diagram showing relation among the combined video frame data 183A generated by the source device 110B of FIG. 32 using the first combining method, and the respective parameters (timing values) of FIG. 33. Referring to FIG. 35, the combined video frame data 183A is configured so that, in the horizontal display interval, the left-eye video frame data 181A, which has the number of lines the same as the pixels of the vertical active interval Vactive, is transmitted for the first half of the vertical display interval, and thereafter, the right-eye video frame data 182A, which has the number of lines the same as the pixels of the vertical active interval Vactive, is transmitted for the second half of the vertical display interval. In this case, the packet processing circuit 113 divides the combined video frame data 183A into a plurality of packets according to the packet format compliant with the WirelessHD, so as to insert horizontal position information in the horizontal display interval and vertical position information in the vertical display interval of a first pixel of the combined video frame data 183A stored in each of packets for transmitting the combined video data 183A, into a header of each of the packets, respectively, as information for identifying the left-eye video frame data 181A and the right-eye video frame data 182A, to generate the plurality of packets. Concretely speaking, when the number of pixels of the horizontal active interval Hactive is 'a' and the number of pixels of the vertical active interval Vactive is 'b', values stored in a video frame number field, an H-position field, and a V-position field included in each header are set as follows.

(a) A value stored in the video frame number field of a header of a packet for transmitting the left-eye video frame data 181A and a value stored in the video frame number field of a header of a packet for transmitting the right-eye video frame data 182A are set to the same value N.

(b) Each of a value stored in the H-position field of the header of the packet for transmitting the left-eye video frame data 181A, and a value stored in the H-position field of the header of the packet for transmitting the right-eye video frame data 182A is set to a value from 0 to a−1.

(c) A value stored in the V-position field of the header of the packet for transmitting the left-eye video frame data 181A is set to a value from 0 to b−1, and a value stored in the V-position field of the header of the packet for transmitting the right-eye video frame data 182A is set to a value from b to 2×b−1.

In addition, referring to FIG. 34, each of the 3D frame sequential detailed timing information tables 115-3d2 and 127-3d2 shows relation between (a) the VICs of the three-dimensional video data, and (b) parameters for combining the left-eye video frame data 181A and the right-eye video frame data 182A into combined video frame data 183B, which includes a blanking interval 184, using a second combining method for every video frame. Concretely speaking, each of the 3D frame sequential detailed timing information tables 115-3d2 and 127-3d2 shows the relation among the VICs (values from 96 to 99, respectively) for identifying the video formats of the three-dimensional video data defined in the VIC table 115ta or 127ta, the number of pixel s of the horizontal active interval Hactive, the number of pixels of the horizontal blanking interval Hblank, the number of pixels in the vertical active interval Vactive, the number of lines Vvideo of each of intervals for transmitting the left-eye video frame data 181A and the right-eye video frame data 182A in the vertical display interval Vvideo, the number of lines of the blanking interval 184 provided between the left-eye video frame data 181A and the right-eye video frame data 182A in the vertical display interval Vspace, the number of pixels of the vertical blanking interval Vblank, the field rates (Hz), and the pixel frequencies (MHz).

Figure 36:
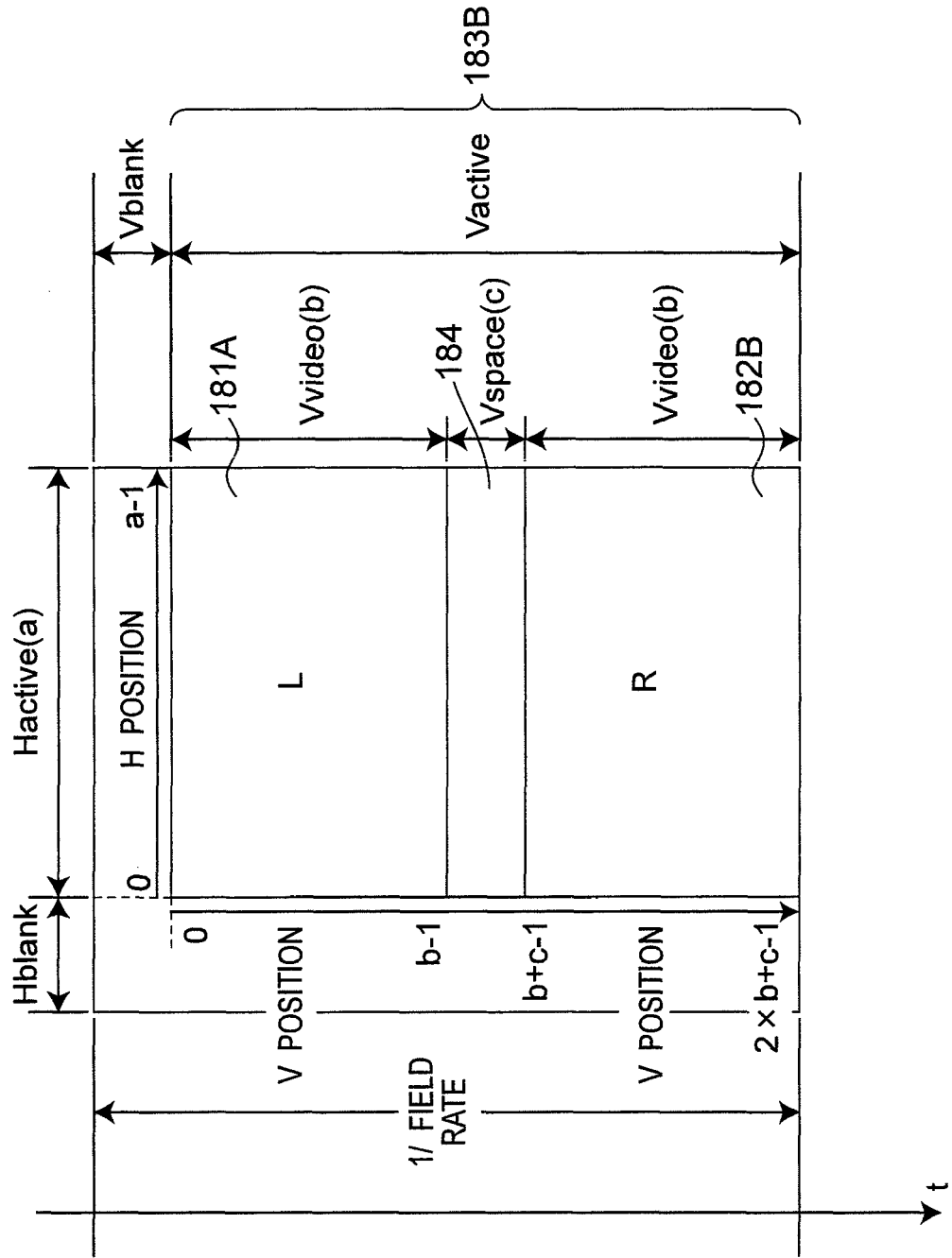
FIG. 36 is a data arrangement diagram showing relation among combined video frame data 183B generated by the source device 110B of FIG. 32 using a second combining method, and respective timing values of FIG. 34.

FIG. 36 is a data arrangement diagram showing relation among the combined video frame data 183B generated by the source device 110B of FIG. 32 using the second combining method, and the respective timing values of FIG. 34. When the second combining method is selected, the combined video frame data 183B is configured so that, in the horizontal display interval, the left-eye video frame data 181A having the number of lines the same as the number of lines Vvideo is transmitted for the first half of the vertical di splay interval, the blanking interval 184 having the number of lines Vspace is then transmitted, and thereafter, right-eye video frame data 182A having the number of lines Vvideo is transmitted for the second half of the vertical display interval. In this case, the packet processing circuit 113 divides the combined video frame data 183B into a plurality of packets according to the packet format compliant with the WirelessHD, so as to insert horizontal position information in the horizontal display interval and vertical position information in the vertical display interval of a first pixel of the combined video frame data 183B stored in each of packets for transmitting the combined video data 183B, into a header of each of the packets, respectively, as information for identifying the left-eye video frame data 181A and the right-eye video frame data 182A, to generate the plurality of packets. Concretely speaking, when the number of pixels of the horizontal active interval Hactive is 'a', the number of pixels of the vertical active interval Vactive is 'b', and the number of lines Vspace is 'c', values stored in the H-position field and the V-position field included in each header are set as follows.

(a) Each of a value stored in the H-position field of the header of the packet for transmitting the left-eye video frame data 181A, and a value stored in the H-position field of the header of the packet for transmitting the right-eye video frame data 182A is set to a value from 0 to a−1.

(b) A value stored in the V-position field of the header of the packet for transmitting the left-eye video frame data 181A is set to a value from 0 to b−1, and a value stored in the V-position field of the header of the packet for transmitting the right-eye video frame data 182A is set to a value from b+c−1 to 2×b+c−1.

Figure 37:
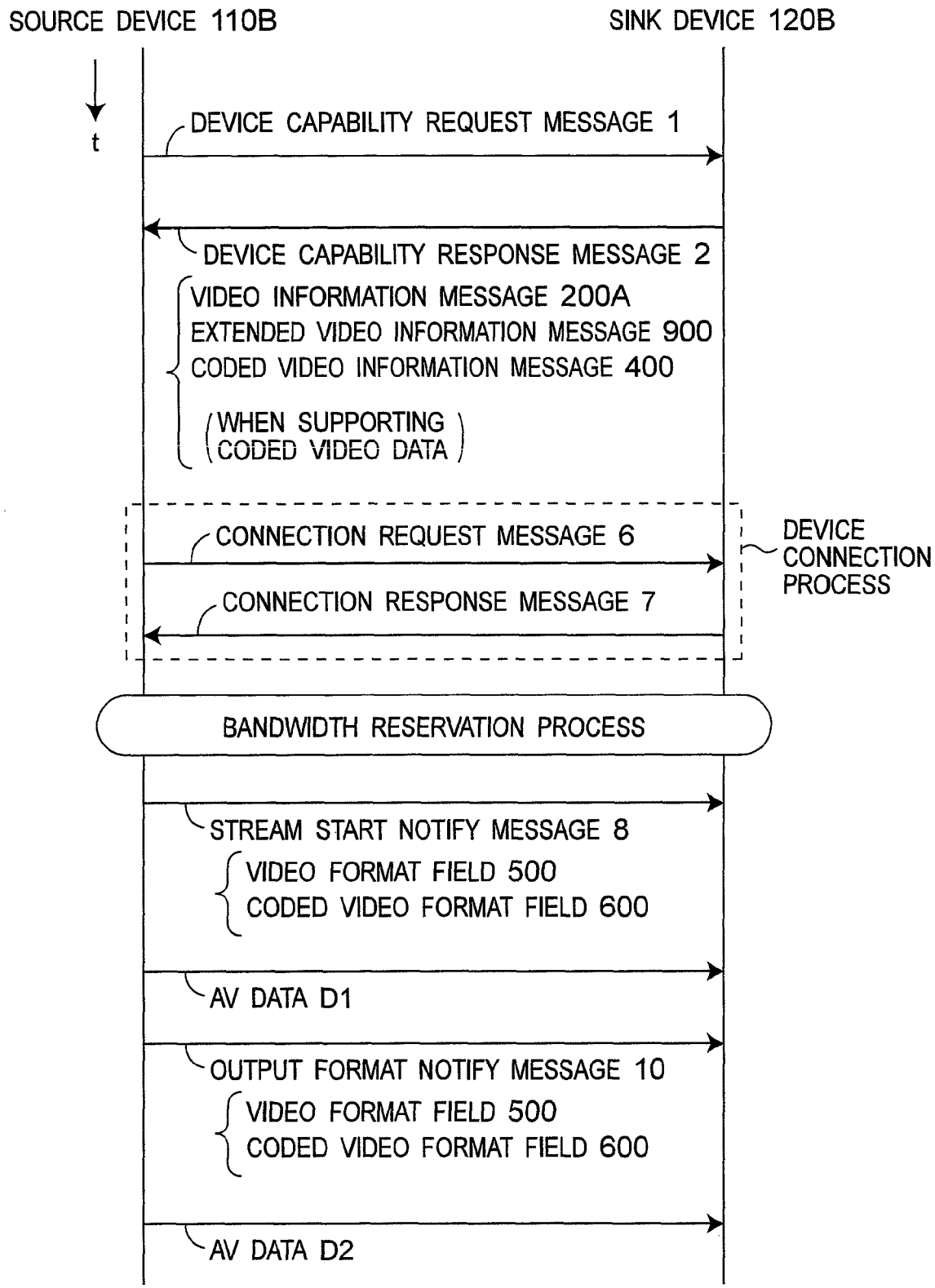
FIG. 37 is a sequence diagram showing operation of the wireless communication system of FIG. 32.

FIG. 37 is a sequence diagram showing operation of the wireless communication system of FIG. 32. Referring to FIG. 37, the source device 110B transmits the device capability request message 1 for requesting the input format information on the sink device 120B, to the sink device 120B. In response to this, the sink device 120B transmits the device capability response message 2 including (a) the video information message 200A which includes the VICs for identifying the video formats supported by the sink device 120B, and (b) the extended video information message 900 which includes information as to whether or not the sink device 120B supports the three-dimensional video data, to the source device 110B. In this case, when the sink device 120B supports the coded (compressed) video data, the sink device 120B also includes the coded video information message 400 including the coding parameters used by the source device 110A to code (compress) video data by a predetermined coding method, in the device capability response message 2. The source device 110B refers to the VIC table 115ta based on the VICs included in the video information message 200A received from the sink device 120B so as to identify the video formats supported by the sink device 120B. In addition, the source device 110B identifies whether or not the sink device 110B supports the three-dimensional video data based on the value stored in the ST field 903 of the extended video information message 900 received from the sink device 120B. Further, the source device 110B identifies whether or not the sink device 120B supports coded video data based on whether or not the device capability response message 2 received from the sink device 120B includes the coded video information message 400. Next, the source device 110B selects one of the video formats supported by the sink device 120B, and generates video data having the selected video format.

Further, the packet processing circuit 113 selects the 2D detailed timing information table 115-2d when the video data to be transmitted is the two-dimensional video data. In addition, the packet processing circuit 113 decides parameters for generating two-dimensional video frame data referring to the 2D detailed timing information table 115-2d based on the VIC of the video data to be transmitted. Based on the decided parameters, the packet processing circuit 113 generates two-dimensional video frame data based on the two-dimensional video data for every video frame. Next, the packet processing circuit 113 divides the generated two-dimensional video frame data into a plurality of packets according to the packet format compliant with the WirelessHD.

Further, the packet processing circuit 113 selects the 3D frame sequential detailed timing information table 115-3d1. When the video data to be transmitted is the three-dimensional video data and the sink de vice 120B supports the coded video data, the packet processing circuit 113 decides parameters for generating combined video frame data referring to the 3D frame sequential detailed timing information table 115-3d1 based on the VIC of the video data to be transmitted. Based on the decided parameters, the packet processing circuit 113 generates the combined video frame data using the above-mentioned first combining method based on the three-dimensional video data for every video frame. Further, the packet processing circuit 113 divides the generated combined video frame data into a plurality of packets as described above, and codes (compresses) the packets by the predetermined coding method using the coding parameters included in the received coded video information message 400.

Further, when the video data to be transmitted is the three-dimensional video data and the sink device 120B does not support the coded video data, the packet processing circuit 113 selects the 3D frame sequential detailed timing table 115-3d2. In addition, the packet processing circuit 113 decides parameters for generating combined video frame data referring to the 3D frame sequential detailed timing information table 115-3d2 based on the VIC of the video data to be transmitted. Based on the decided parameters, the packet processing circuit 113 generates the combined video frame data using the above-mentioned second combining method based on the three-dimensional video data for every video frame. Further, the packet processing circuit 113 divides the generated combined video frame data into a plurality of packets as described above.

Next, referring to FIG. 37, in a manner similar to that of the first preferred embodiment, the device connection process and the bandwidth reservation process are performed between the source device 110E and the sink device 120B. When the bandwidth reservation process is completed, the source device 110B transmits the stream start notify message 8, which includes information on the video format and information on the audio format of the AV data D1 to be transmitted to the sink device 120B, to the sink device 120B.

Figure 38:
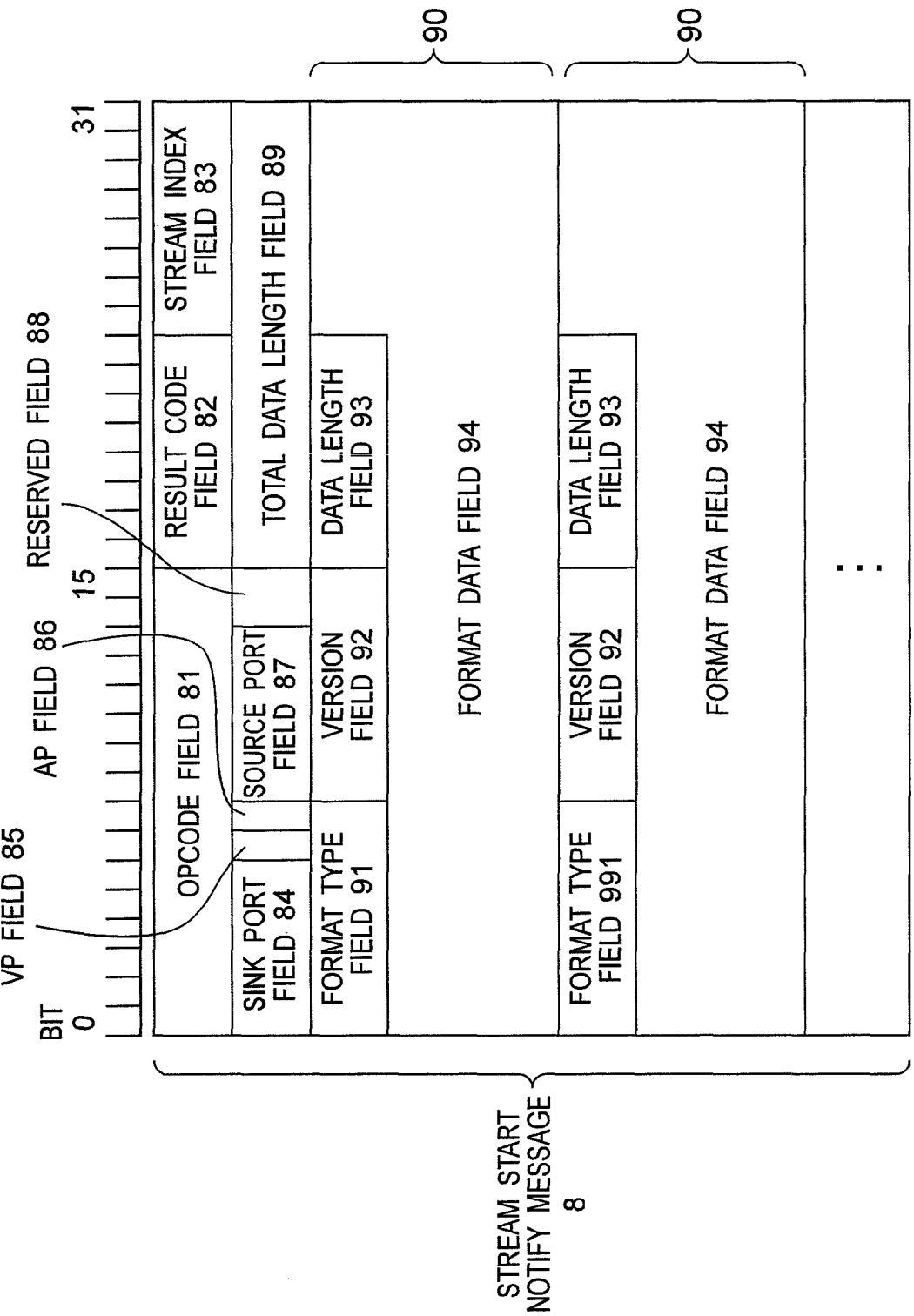
FIG. 38 is a diagram showing a format of a stream start notify message 8 of FIG. 37.

FIG. 38 is a diagram showing a format of the stream start notify message 8 of FIG. 37. The stream start notify message 8 is used by the source device 110B to notify the sink device 120B of a result of the bandwidth reservation process and an output format of the AV data D1 (namely, the video format of the video data and the audio format of the audio data included in the AV data). Referring to FIG. 38, the stream start notify message 8 includes the following fields.

(1) An opcode field 81 storing an operation code of the stream start notify message 8.

(2) A result code field 82 storing data representing whether or not the bandwidth reservation process of FIG. 37 succeeds (whether or not transmission of a stream normally starts).

(3) A stream index field 83 storing a stream index obtained (or allocated) from a MAC layer in the bandwidth reservation process of FIG. 37.

(4) A sink port field 84 storing a sink port number reserved for transmission of the AV data.

(5) A VP field 85 storing 1 when a sink port and a source port are used for the video data, and storing 0 when the sink port and the source port are not used for the video data.

(6) An AP field 86 storing 1 when the sink port and the source port are used for the audio data, and storing 0 when the sink port and the source p ort are not used for the audio data.

(7) A source port field 87 storing a source port number reserved for transmission of the AV data.

(8) A reserved field 88 reserved for future use.

(9) A total data length field 89 storing data representing a data length of fields excluding the opcode field 81 and the total data length field 89 from the stream start notify message 8.

(10) At least one format field 90 each including a format type field 91, a version field 92, a data length field 93, and a format field 94.

In this case, in each format field 90, the format type field 91 stores data representing a type of data stored in the format data field 94, a version field 92 stores a version number of standards of the format data field 94, a data length field 93 stores data representing a data length of the data stored in the format data field 94, and the format data field 94 stores the data having the format type stored in the format type field 91.

FIG. 39 is a table showing relation between values stored in the format type field 91 of FIG. 38 and format types. As shown in FIG. 39, the format types corresponding to the respective values stored in the format type field 91 include video format information, audio format information, gamut metadata information, vendor dependent information, detailed timing information, maximum video buffer information, maximum audio buffer information, and coded video information. The format field 90 including the format type field 91 storing a value (0x01) corresponding to the video format information will be referred to as a video format field 500, and the format field 90 including the format type field 91 storing a value (0x07) corresponding to the coded video information will be referred to as a coded video format field 600 hereinafter.

Figure 40:
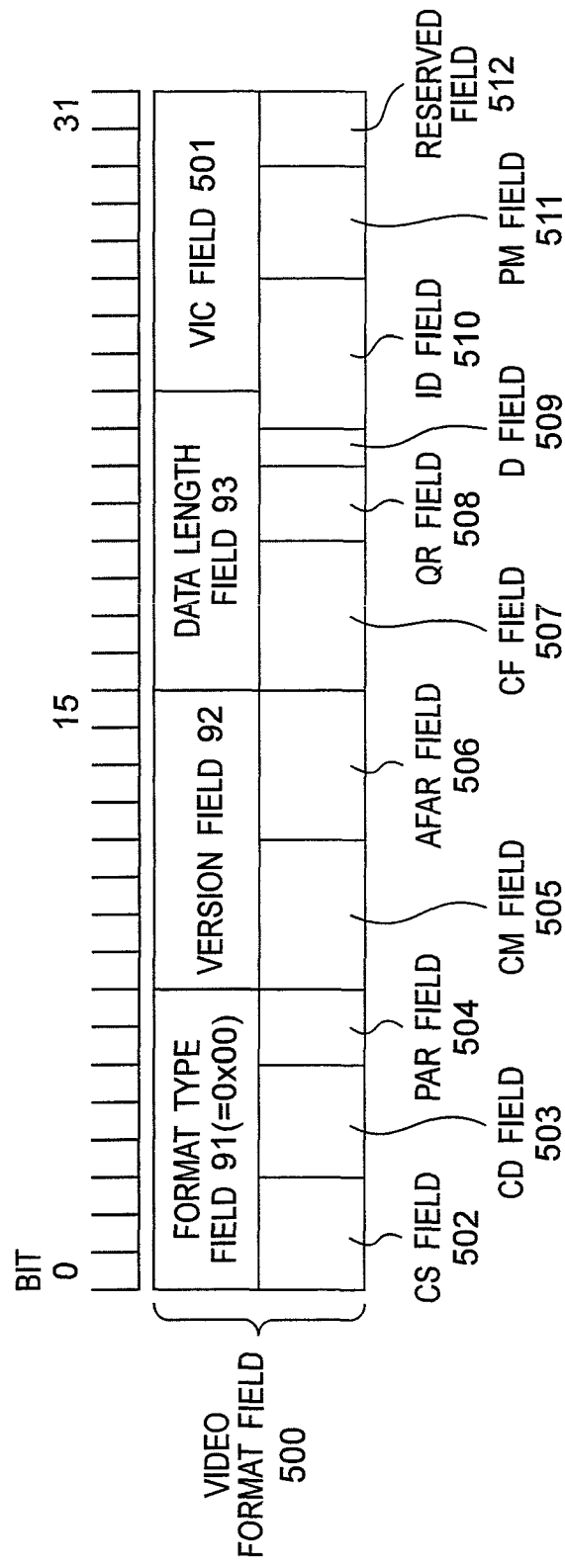
FIG. 40 is a diagram showing a format of a video format field 500 included in the stream start notify message 8 of FIG. 38 as a format field 90.

FIG. 40 is a diagram showing a format of the video format field 500 included in the stream start notify message 8 of FIG. 38 as the format field 90. Referring to FIG. 40, the video format field 500 includes the following fields.

(1) The format type field 91 storing a value (0x00) corresponding to the video format information.

(2) The version field 92 storing the version number of the specification of the following fields 501 to 512.

(3) The data length field 93 storing the data representing the data length of the fields excluding the format type field 91, the version field 92, and the data length field 93 from the video format field 500.

(4) A VIC field 501 storing the VIC representing the video format of the video data to be transmitted.

(5) A CS (Color Space) field 502 storing data representing a type of a color format of the video data to be transmitted.

(6) A CD (Color Depth) field 503 storing a number of bits of a color depth of the video data to be transmitted.

(7) A PAR (Picture Aspect Ratio) field 504 storing data representing an aspect ratio of the video data to be transmitted.

(8) A CM (Colorimetry) field 205 storing colorimetry information (ITUBT.601, BT.709 or the like) on the video data to be transmitted.

(9) An AFAR (Active Format Aspect Ratio) field 506 storing data representing an aspect ratio of active pixels of the video data to be transmitted.

(10) A CF (Content Flag) field 507 storing data representing a class (type) of a content supported.

(11) A QR (Quantization Range) field 508 storing data representing a quantization (bit) range of the video data to be transmitted.

(12) D (Detailed Timing Information) field 509 storing 1 when detailed timing information (DETAILED_TIMING_INFO) is used as timing information on the video data to be transmitted, and storing 0 when the detailed timing information (DETAILED_TIMING_INFO) is used as timing information on the video data to be transmitted.

(13) An ID (ID of Detailed Timing Information) field 510 storing an ID of the detailed timing information when 1 is stored in the D field 509, and storing 0 when 0 is stored in the D field 509.

(14) A PM (Partition Mode) field 511 storing data representing a partition mode of the video format.

(15) A reserved field 512 reserved for future use.

Figure 41:
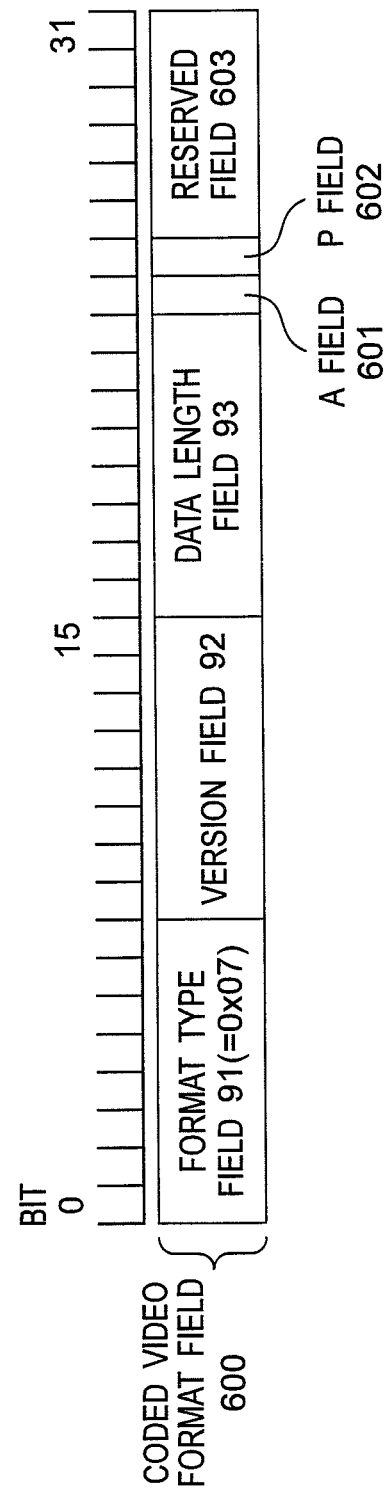
FIG. 41 is a diagram showing a format of a coded video format field 600 included in the stream start notify message 8 of FIG. 38 as the format field 90.

FIG. 41 is a diagram showing a format of the coded video format field 600 included in the stream start notify message 8 of FIG. 38 as the format field 90. Referring to FIG. 41, the coded video format field 600 includes the following fields.

(1) The format type field 91 storing a value (0x07) corresponding to the coded video format information.

(2) The version field 92 storing a version number 0x01.

(3) The data length field 93 storing the data representing a total data length of the following fields 601 to 603.

(4) An A (Active) field 601 storing 1 when the video data to be transmitted is coded (compressed), and storing 0 when the video data to be transmitted i s not coded.

(5) A P (Partition Mode) field 602 storing 1 when the partition mode is used, and storing 0 when the partition mode is not used.

(6) A reserved field 603 reserved for future use.

Referring back to FIG. 37, the source device 11013 transmits the stream start notify message 8 including the video format field 500, which includes the VIC for identifying the video format of the video data to be transmitted, and the coded video format field 600, which includes information whether or not the video data to be transmitted is coded, to the sink device 120B. The sink device 120B identifies the type (two-dimensional video data or three-dimensional video data) of the video data to be received by identifying the video format of the video data to be received with referring to the VIC table 127ta based on the VIC included in the stream start notify message 8 from the source device 110B. Further, the sink device 120B identifies whether or not the video data to be received is coded based on the data stored in the A field 601 of the coded video format field 600 included in the stream start notify message 8 from the source device 110B. In addition, the sink device 120B selects the 2D detailed timing information table 127-2d when the type of the video data to be received is the two-dimensional video data, selects the 3D frame sequential detailed timing information table 127-3d1 when the type of the video data to be received is the three-dimensional video data and the video data to be received is coded (compressed), and selects the 3D frame sequential detailed timing information table 127-3d2 when the type of the video data to be received is the three-dimensional video data and the video data to be received is not coded (compressed). Further, in the sink device 120B, the packet processing circuit 123 decides parameters for decoding the video data referring to the selected detailed timing information table 127-2d, 127-3d1 or 127-3d2 based on the VIC of the received video data, and decodes the received video data using the decided parameters.

Further, referring to FIG. 37, when at least one of the video format and the audio format of the AV data D1 is changed, the source device 110B wirelessly transmits the output format notify message 10 including information on the changed video format or audio format to the sink device 120B before wirelessly transmitting AV data D2 having the changed video format or audio format to the sink device 120B. In this case, in a manner similar to that of the stream start notify message 8, the output format notify message 10 includes the video format field 500, which includes the VIC for identifying the video format of the video data to be transmitted, and the coded video format field 600, which includes information whether or not the video data to be transmitted is coded. The sink device 120B receives the output format notify message 10 and the AV data D2, and decodes the video data in the AV data D2 in a manner similar to receiving of the AV data D1.

As described above, according to the present preferred embodiment, the sink device 120B transmits the device capability response message 2 including the video information message 200A, the extended video information message 900, and the coded video information message 400 to the source device 110B. Therefore, the source device 110B can identify whether or not the sink device 120B supports the coded video data. Further, the source device 110B generates the combined video frame data 183A using the first method based on the three-dimensional video data when the sink device 120B supports the coded video data, and generates the combined video frame data 183B using the second method based on the three-dimensional video data when the sink device 120B does not support the coded video data. In addition, based on the type of the received video data and whether or not the received video data is coded, the sink device 120B selects one of the detailed timing information tables 127-2d, 127-3d1, and 127-3d2, decides parameters for decoding the video data with referring to the selected detailed timing information tables 127-2d, 127-3d1 or 127-3d2, and decodes (expands) the received video data using the decided parameters. Generally speaking, when the combined video frame data 183A including the blanking interval 184 is coded, a coding process sometimes fails, as compared with such a case in which the combined video frame data 183A not including the blanking interval 184 is coded. According to the present preferred embodiment, when the sink device 120B supports the coded video data, the source device 110B generates the combined video frame data 183A that does not include the blanking interval, and codes the combined video frame data 183A. Therefore, as compared with the prior art, the source device 110B can stably transmit coded video data to the sink device 120B.

It is to be noted that audio data, control data or the like may be transmitted for the blanking interval 184 of FIG. 36.

Twelfth Preferred Embodiment

Figure 42:
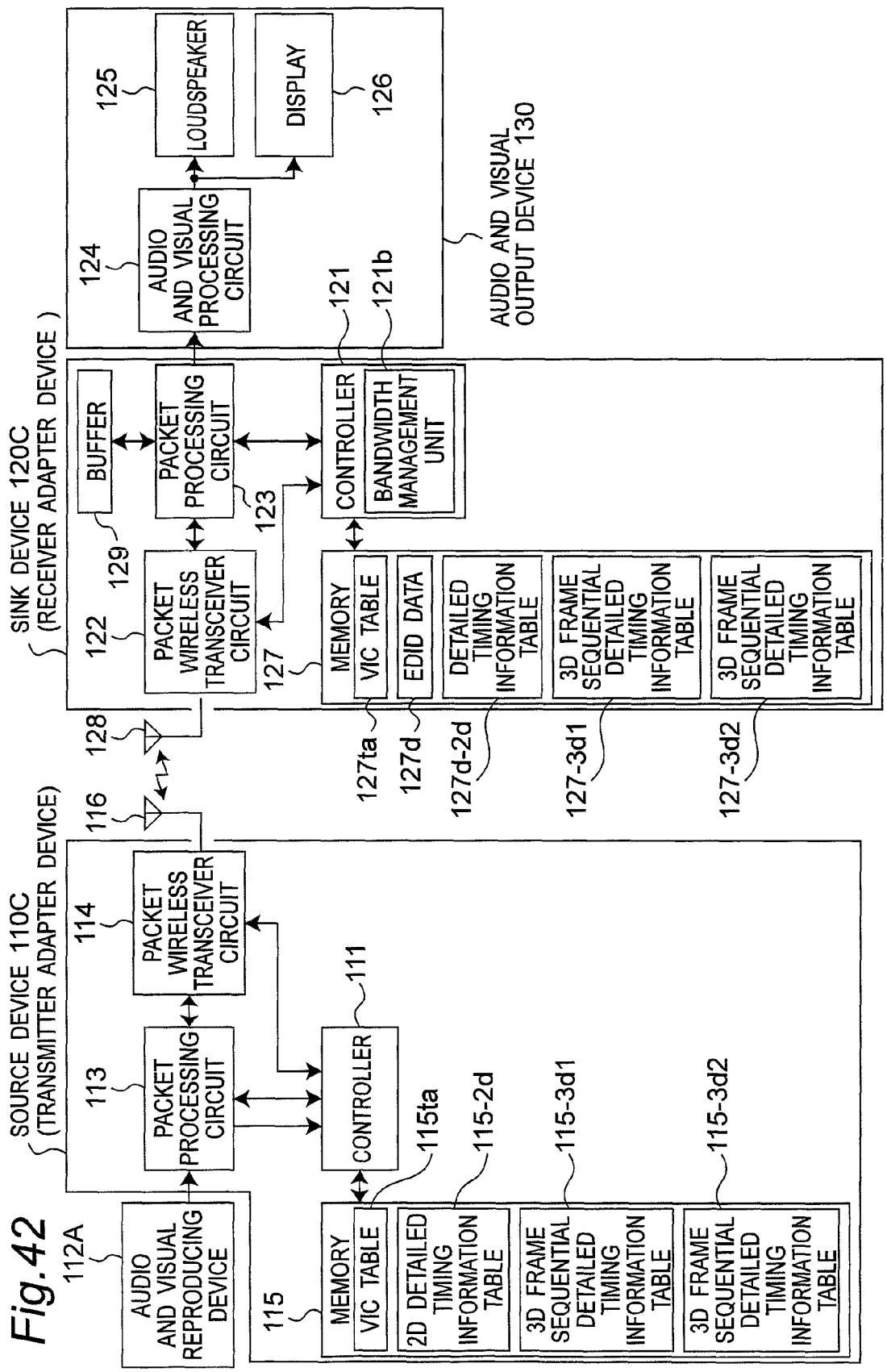
FIG. 42 is a block diagram showing a configuration of a wireless communication system for transmitting video data using a video data packet transmission method according to a twelfth preferred embodiment of the present invention.

FIG. 42 is a block diagram showing a configuration of a wireless communication system for transmitting video data using a video data packet transmission method according to a twelfth preferred embodiment of the present invention. Referring to FIG. 42, the wireless communication system according to the present preferred embodiment is configured to include an audio and visual reproducing device 112A of an AV data source device, a source device 110C of a transmitter adapter device, a sink device 120C of a receiver adapter device, and an audio and visual output device 130 of an AV data sink device. The audio and visual reproducing device 112A, which is, for example, a DVD player, reproduces video data and audio data from an external storage device or a recording medium such as an MD or a DVD, and output the video data and the audio data to the packet processing circuit 113 of the source device 110C. In addition, the source device 110C is different from the source device 110B according to the eleventh preferred embodiment, only in such a respect that the source device 110C does not include the audio and visual reproducing device 112. The source device 110C processes the AV data from the audio and visual reproducing device 112A instead of the AV data from the audio and visual reproducing device 112 in a manner similar to that of the source device 110B, and wirelessly transmits the AV data to the sink device 120C. In this case, the source device 110C supports the HDMI pass-through mode when being connected to the audio and visual reproducing device 112A by an HDMI cable compliant with HDMI, and does not support the HDMI pass-through mode when being connected to the audio and visual reproducing device 112A by a connection cable other than the HDMI cable.

Further, referring to FIG. 42, the sink device 120C is different from the sink device 120B according to the eleventh preferred embodiment only in such a respect that the sink device 120C does not include the audio and visual processing circuit, a loudspeaker 125, and a display 126. The sink device 120C processes the AV data wirelessly received from the source device 110C similarly to the sink device 120B, and outputs the processed AV data to the audio and visual processing circuit 124 of the audio and visual output device 130. Still further, the audio and visual output device 130 is configured to include the audio and visual processing circuit 124, the loudspeaker 125, and the display 126. The audio and visual processing circuit 124 executes a predetermined signal processing and a predetermined D/A conversion processing on the inputted audio data, outputs the audio data to the loudspeaker 125 so as to output sound, executes a predetermined signal processing and a predetermined D/A conversion processing on the inputted video data, and outputs the video data to the display 126 so as to display video.

Figure 43:
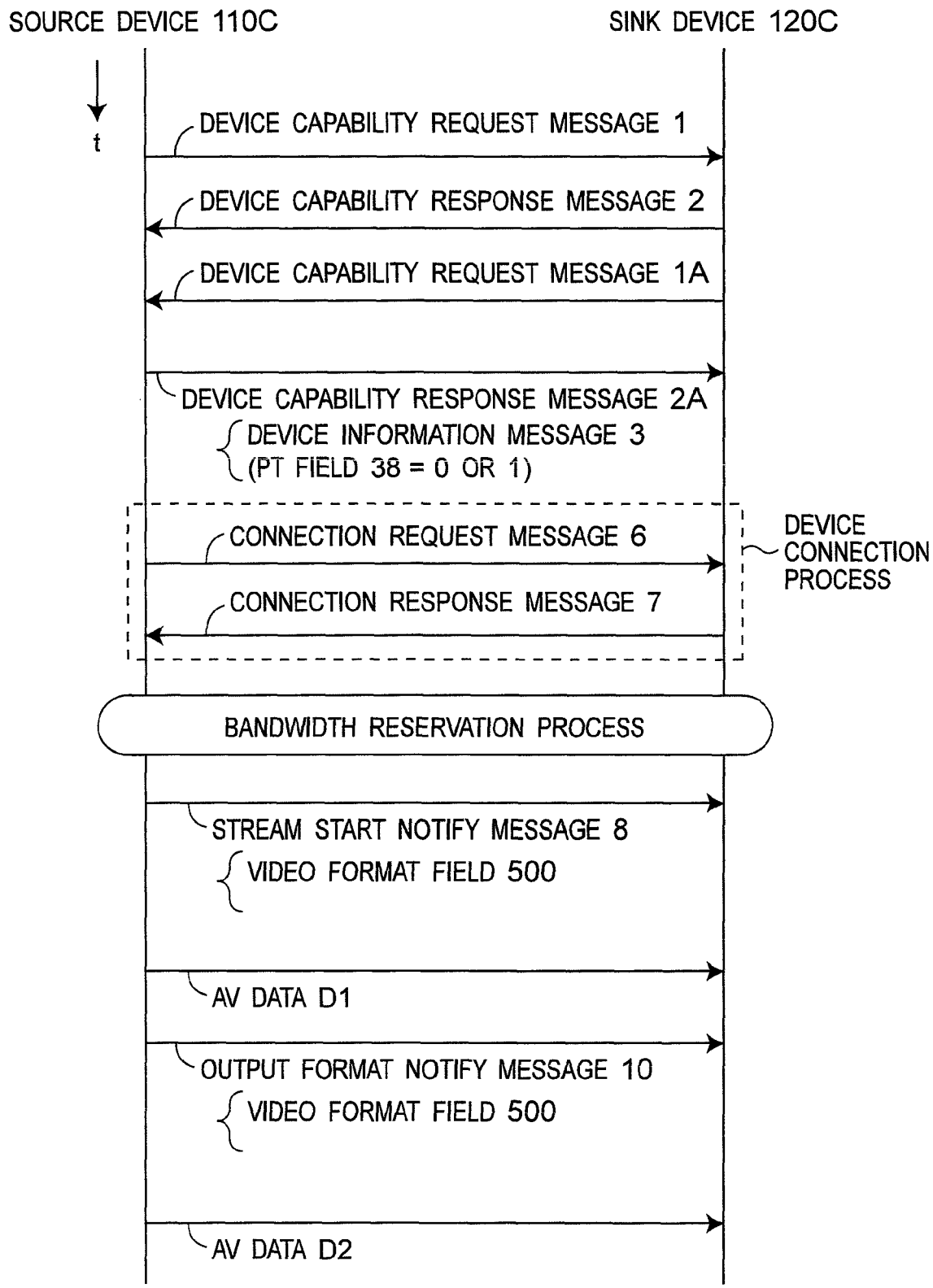
FIG. 43 is a sequence diagram showing operation of the wireless communication system of FIG. 42.

FIG. 43 is a sequence diagram showing operation of the wireless communication system of FIG. 42. Referring to FIG. 43, first of all, the source device 110C transmits the device capability request message 1 for requesting the input format information on the sink device 120C to the sink device 120C. In response to this, the sink device 120C transmits the device capability response message 2 including (a) the video information message 200A which includes the VICs for identifying the video formats supported by the sink device 120C, and (b) the extended video information message 900 which includes information as to whether or not the sink device 120C supports the three-dimensional video data, to the source device 110C. The source device 110C identifies the video formats supported by the sink device 120C with referring to the VIC table 115*ta* based on the VICs included in the video information message 200A received from the sink device 120C. In addition, the source device 110C identifies whether or not the sink device 110C supports the three-dimensional video data based on the value stored in the ST field 903 of the extended video information message 900 received from the sink device 120C. Next, the source device 110C selects one of the video formats supported by the sink device 120C, and generates video data having the selected video format.

The packet processing circuit 113 selects the 2D detailed timing information table 115-2*d* when the video data to be transmitted is the two-dimensional video data. In addition, the packet processing circuit 113 decides parameters for generating two-dimensional video frame data referring to the 2D detailed timing information table 115-2*d* based on the VIC of the video data to be transmitted. Based on the decided parameters, the packet processing circuit 113 generates two-dimensional video frame data based on the two-dimensional video data for every video frame. Next, the packet processing circuit 113 divides the generated two-dimensional video frame data into a plurality of packets according to the packet format compliant with the WirelessHD.

In addition, the packet processing circuit 113 selects the 3D frame sequential detailed timing information table 115-3*d*1 when the video data to be transmitted is the three-dimensional video data and the source device 110C does not support the HDMI pass-through mode. In addition, the packet processing circuit 113 decides parameters for generating combined video frame data referring to the 3D frame sequential detailed timing information table 115-3*d*1 based on the VIC of the video data to be transmitted. Based on the decided parameters, the packet processing circuit 113 generates the combined video frame data using the above-mentioned first combining method based on the three-dimensional video data for every video frame. Further, the packet processing circuit 113 divides the generated combined video frame data into a plurality of packets as described above, and codes (compresses) the packets by the predetermined coding method using the coding parameters included in the received coded video information message 400.

Further, when the video to be transmitted is the three-dimensional video data and the source device 110C supports the HDMI pass-through mode, the packet processing circuit 113 selects the 3D frame sequential detailed timing table 115-3*d*2. In addition, the packet processing circuit 113 decides parameters for generating combined video frame data referring to the 3D frame sequential detailed timing information table 115-3*d*2 based on the VIC of the video data to be transmitted. Based on the decided parameters, the packet processing circuit 113 generates the combined video frame data using the above-mentioned second combining method based on the three-dimensional video data for every video frame. Further, the packet processing circuit 113 divides the generated combined video frame data into a plurality of packets according to the packet format compliant with the WirelessHD.

Next, referring to FIG. 43, the sink device 120C transmits a device capability request message 1A for requesting device information on the source device 110C to the source device 110C. In response to this, the source device 110C transmits a device capability response message 2A including the device information message 3 (See FIG. 8) to the sink device 120C. In this case, the source device 110C stores 1 in the PT field 83 of the device information message 3 when the source device 110C supports the above-mentioned HDMI pass-through mode, and stores 0 in the PT field 83 of the device information message 3 when the source device 110C does not support the above-mentioned HDMI pass-through mode. The sink device 120C identifies whether or not the source device 110C supports the HDMI pass-through mode based on the data stored in the PT field 83 of the device information message 3 from the source device 110C.

Next, referring to FIG. 42, in a manner similar to that of the first preferred embodiment, the device connection process and the bandwidth reservation process are performed between the source device 110C and the sink device 120C. When the bandwidth reservation process is completed, the source device 110C transmits the stream start notify message 8, which includes information on the video format and information on the audio format of the AV data D1 to be transmitted to the sink device 120C, to the sink device 120C. The sink device 120C identifies the type (two-dimensional video data or three-dimensional video data) of the video data to be received, by identifying the video format of the video data to be received with referring to the VIC table 127*ta* based on the VIC stored in the video format field 500 included in the stream start notify message 8 from the source device 110C. In addition, the sink device 120C selects the 2D detailed timing information table 127-2*d* when the type of the video data to be received is the two-dimensional video data, selects the 3D frame sequential detailed timing information table 127-3*d*1 when the type of the video data to be received is the three-dimensional video data and the source device 110C does not support the HDMI pass-through mode, and selects the 3D frame sequential detailed timing information table 127-3*d*2 when the type of the video data to be received is the three-dimensional video data and the source device 110C supports the HDMI pass-through mode. Further, in the sink device 120C, the packet processing circuit 123 decides parameters for decoding the video data referring to the selected detailed timing information table 127-2*d*, 127-3*d*1 or 127-3*d*2 based on the VIC of the received video data, and decodes the received video data using the decided parameters.

Further, referring to FIG. 42, when at least one of the video format and the audio format of the AV data D1 is changed, the source device 110C wirelessly transmits the output format notify message 10 including information on the changed video format or audio format to the sink device 120C before wirelessly transmitting AV data D2 having the changed video format or audio format to the sink device 120C. In this case, in a manner similar to that of the stream start notify message 8, the output format notify message 10 includes the video format field 500, which includes the VIC for identifying the video format of the video data to be transmitted, and the coded video format field 600, which includes information whether or not the video data to be transmitted is coded. The sink device 120C receives the output format notify message 10 and the AV data D2, and decodes the video data in the AV data D2 in a manner similar to receiving of the AV data D1.

As described above, according to the present preferred embodiment, since the source device 110C transmits the device information message 3 to the sink device 120C, the sink device 120C can identify whether or not the source device 110C support the HDMI pass-through mode. Further, the source device 110C generates the combined video frame data 183A using the first method based on the three-dimensional video data when the source device 110C does not support the HDMI pass-through mode, and generates the combined video frame data 183B using the second method based on the three-dimensional video data when the source device 110C supports the HDMI pass-through mode. In addition, based on the type of the received video data and whether or not the source device 110C supports the HDMI pass-through mode, the sink device 120C selects one of the detailed timing information tables 127-2d, 127-3d1, and 127-3d2, refers to the selected detailed timing information tables 127-2d, 127-3d1 or 127-3d2, decides parameters for decoding the video data, and decodes the received video data using the decided parameters. Generally speaking, the combined video frame data 183B that includes the blanking interval 184 is compatible with frame packing specified in the HDMI, as compared with the combined video frame data 183A that does not include the blanking interval 184. According to the present preferred embodiment, when the source device 110C supports the HDMI pass-through mode, the source device 110C generates the combined video frame data 138A that includes the blanking interval using the second method based on the three-dimensional video data. Therefore, as compared with the prior art, the source device 110C can stably transmit three-dimensional video data to the sink device 120C.

In the eleventh and twelfth preferred embodiments, the sink device 120B or 120C transmits the device capability response message 2 including the video information message 200A and the extended video information message 900 to the source device 110B or 110C. However, the present invention is not limited to this. The sink device 120B or 120C may transmit the device capability response message 2 including the video information message 200B to the source device 110B or 110C.

In addition, the formats of the messages shown in the respective preferred embodiments are given only for illustrative purposes, and the orders of arrangement, sizes and the like of the respective fields may be changed as long as fields similar to the above-described fields are included in the messages.

Further, in the preferred embodiments described above, the bandwidth management unit 121b is provided in the sink devices 120, 120A, 120B or 120C. However, the present invention is not limited to this. The bandwidth management unit 121b may be provided in the source device 110, 110A, 110B or 110C or the other device.

INDUSTRIAL APPLICABILITY

As described above, according to the method of transmitting video data, the source device for transmitting the video data, the sink device for receiving the video data, and the wireless communication system including the source device and the sink device according to the present invention, the sink device transmits the video information message to the source device. In this case, the video information message includes video format information identifiers for identifying video formats supported by the sink device, which are selected from among a plurality of video format information identifiers for identifying video formats each including a resolution of the video data and a type of the video data, and a three-dimensional transmission method for three-dimensional video data when the type of the video data is the three-dimensional video data including first and second video frame data. The source device selects one video format information identifier of the video format information identifiers included in a received video format message, generates video data having a video format corresponding to a selected video format information identifier, and transmits a generated video data to the sink device. Therefore, the source device can transmit the three-dimensional video data to the sink device.

In particular, the method of transmitting video data, the source device for transmitting the video data, the sink device for receiving the video data, and the wireless communication system including the source device and the sink device according to the present invention can be used, for example, for transmitting AV content data in a wireless communication system compliant with wireless communication standards such as the WirelessHD.

REFERENCE SINGS LIST 1 and 1A . . . device capability request message,
2 and 2A . . . device capability response message,
3 . . . device information message,
5 . . . input format information message,
6 . . . connection request message,
7 . . . connection response message,
8 . . . stream start notify message,
10 . . . output format notify message,
110, 110A, 110B and 110c . . . source device,
111 . . . controller,
112 and 112A . . . audio and visual reproducing device,
113 . . . packet processing circuit,
114 . . . packet wireless transceiver circuit,
115 . . . memory,
115t and 115ta . . . VIC table,
115-2d . . . 2D detailed timing information table,
115-3d1 and 115-3d2 . . . 3D frame sequential detailed timing information table,
116 . . . antenna,
120 . . . sink device,
121 . . . controller,
121b . . . bandwidth management unit,
122 . . . packet wireless transceiver circuit,
123 . . . packet processing circuit,
124 . . . audio and visual processing circuit,
125 . . . loudspeaker,
126 . . . display,
127 . . . memory,
127d . . . EDID data,
127t and 127ta . . . VIC table,
127-2d . . . 2D detailed timing information table,
127-3d1 and 127-3d2 . . . 3D frame sequential detailed timing information table,
129 . . . buffer,
130 . . . audio and visual output device,
181 and 181A . . . left-eye video frame data, 182 and 182A . . . right-eye video frame data,
183, 183A and 183B . . . combined video frame data,
200, 200A and 200B . . . video information message,
300 and 300A to 300F . . . three-dimensional information message,
400 . . . coded video information message,
500 . . . video format field,
600 . . . coded video format field, and
900 . . . extended video information message.

The invention claimed is:

1. A sink device for a wireless communication system for wirelessly transmitting video data from a source device to the sink device,
   wherein the sink device comprises a controller for transmitting a video information message to the source device, the video information message including video format information identifiers for identifying video formats supported by the sink device, which are selected from among a plurality of video format information identifiers for identifying video formats each including a resolution of the video data and a type of the video data, and a three-dimensional transmission method for three-dimensional video data when the type of the video data is the three-dimensional video data including first and second video frame data,
   wherein the sink device further comprises a storage device for previously storing:
   (1) a 2D detailed timing information table showing a relation between (a) video format information identifiers of two-dimensional video data including third video frame data and (b) parameters for generating two-dimensional video frame data based on the two-dimensional video data for every video frame;
   (2) a first 3D detailed timing information table showing a relation between (a) the video format information identifiers of the three-dimensional video data and (b) parameters for combining the first video frame data and the second video frame data into first combined video frame data, which does not include a blanking interval, using a predetermined first combining method for every video frame; and
   (3) a second 3D detailed timing information table showing a relation between (a) the video format information identifiers of the three-dimensional video data and (b) parameters for combining the first video frame data and the second video frame data into second combined video frame data, which includes the blanking interval, using a predetermined second combining method for every video frame,
   wherein, upon receiving the video data from the source device, (a) when the type of the video data is the two-dimensional video data, the controller selects the 2D detailed timing information table, (b) when the type of the video data is the three-dimensional video data and the video data is coded, the controller selects the first 3D detailed timing information table, and (c) when the type of the video data is the three-dimensional video data and the video data is not coded, the controller selects the second 3D detailed timing information table, and
   wherein the controller refers to a selected detailed timing information table based on the video format information identifier of the video data so as to decide parameters for decoding the video data, and decodes the video data using decided parameters.

2. A sink device for a wireless communication system for wirelessly transmitting video data from a source device to the sink device,
   wherein the sink device comprises a controller for transmitting a video information message to the source device, the video information message including video format information identifiers for identifying video formats supported by the sink device, which are selected from among a plurality of video format information identifiers for identifying video formats each including a resolution of the video data and a type of the video data, and a three-dimensional transmission method for three-dimensional video data when the type of the video data is the three-dimensional video data including first and second video frame data,
   wherein the sink device further comprises a storage device for previously storing:
   (1) a 2D detailed timing information table showing a relation between (a) video format information identifiers of two-dimensional video data including third video frame data and (b) parameters for generating two-dimensional video frame data based on the two-dimensional video data for every video frame;
   (2) a first 3D detailed timing information table showing a relation between (a) the video format information identifiers of the three-dimensional video data and (b) parameters for combining the first video frame data and the second video frame data into first combined video frame data, which does not include a blanking interval, using a predetermined first combining method for every video frame; and
   (3) a second 3D detailed timing information table showing a relation between (a) the video format information identifiers of the three-dimensional video data and (b) parameters for combining the first video frame data and the second video frame data into second combined video frame data, which includes the blanking interval, using a predetermined second combining method for every video frame,
   wherein the controller receives a device information message including data representing whether or not the source device supports an HDMI (High-Definition Multimedia Interface) pass-through mode specified in WirelessHD from the source device, and identifies whether or not the source device supports the HDMI pass-through mode based on the device information message,
   wherein, upon receiving the video data from the source device, (a) when the type of the video data is the two-dimensional video data, the controller selects the 2D detailed timing information table, (b) when the type of the video data is the three-dimensional video data and the source device does not support the HDMI pass-through mode, the controller selects the first 3D detailed timing information table, and (c) when the type of the video data is the three-dimensional video data and the source device supports the HDMI pass-through mode, the controller selects the second 3D detailed timing information table, and
   wherein the controller refers to a selected detailed timing information table based on the video format information identifier of the video data so as to decide parameters for decoding the video data, and decodes the video data using decided parameters.

3. A source device for a wireless communication system for wirelessly transmitting video data from the source device to a sink device,
   wherein the source device comprises a controller for receiving a video information message from the sink device, the video information message including video format information identifiers for identifying video formats supported by the sink device, which are selected from among a plurality of video format information identifiers for identifying video formats each including a resolution of the video data and a type of the video data, and a three-dimensional transmission method for three-dimensional video data when the type of the video data is the three-dimensional video data including first and second video frame data, wherein the controller selects one video format information identifier of the video format information identifiers included in a received video format message, generates video data having a video format corresponding to a selected video format information identifier, and transmits a generated video data to the sink device;

wherein the sound device further comprises a storage device for previously storing:
  (1) a 2D detailed timing information table showing a relation between (a) video format information identifiers of two-dimensional video data including third video frame data and (b) parameters for generating two-dimensional video frame data based on the two-dimensional video data for every video frame;
  (2) a first 3D detailed timing information table showing a relation between (a) the video format information identifiers of the three-dimensional video data and (b) parameters for combining the first video frame data and the second video frame data into first combined video frame data, which does not include a blanking interval, using a predetermined first combining method for every video frame; and
  (3) a second 3D detailed timing information table showing a relation between (a) the video format information identifiers of the three-dimensional video data and (b) parameters for combining the first video frame data and the second video frame data into second combined video frame data, which includes the blanking interval, using a predetermined second combining method for every video frame, wherein, upon transmitting the video data to the sink device, (a) when the type of the video data is the two-dimensional video data, the controller selects the 2D detailed timing information table, (b) when the type of the video data is the three-dimensional video data and the sink device supports coded three-dimensional video data, the controller selects the first 3D detailed timing information table, and (c) when the type of the video data is the three-dimensional video data and the sink device does not support the coded three-dimensional video data, the controller selects the second 3D detailed timing information table, and wherein the controller refers to a selected detailed timing information table based on the video format information identifier of the video data so as to decide parameters for generating one of the two-dimensional video frame data, the first combined video frame data and the second combined video frame data based on the video data, generates one of the two-dimensional video frame data, the first combined video frame data and the second combined video frame data based on the video data using decided parameters, and transmits a generated combined data to the sink device.

4. A source device for a wireless communication system for wirelessly transmitting video data from the source device to a sink device, wherein the source device comprises a controller for receiving a video information message from the sink device, the video information message including video format information identifiers for identifying video formats supported by the sink device, which are selected from among a plurality of video format information identifiers for identifying video formats each including a resolution of the video data and a type of the video data, and a three-dimensional transmission method for three-dimensional video data when the type of the video data is the three-dimensional video data including first and second video frame data, wherein the controller selects one video format information identifier of the video format information identifiers included in a received video format message, generates video data having a video format corresponding to a selected video format information identifier, and transmits a generated video data to the sink device;

wherein the sound device further comprises a storage device for previously storing:
  (1) a 2D detailed timing information table showing a relation between (a) video format information identifiers of two-dimensional video data including third video frame data and (b) parameters for generating two-dimensional video frame data based on the two-dimensional video data for every video frame;
  (2) a first 3D detailed timing information table showing a relation between (a) the video format information identifiers of the three-dimensional video data and (b) parameters for combining the first video frame data and the second video frame data into first combined video frame data, which does not include a blanking interval, using a predetermined first combining method for every video frame; and
  (3) a second 3D detailed timing information table showing a relation between (a) the video format information identifiers of the three-dimensional video data and (b) parameters for combining the first video frame data and the second video frame data into second combined video frame data, which includes the blanking interval, using a predetermined second combining method for every video frame, wherein the controller transmits a device information message including data representing whether or not the source device supports an HDMI pass-through mode specified in WirelessHD to the sink device, wherein, upon transmitting the video data to the sink device, (a) when the type of the video data is the two-dimensional video data, the controller selects the 2D detailed timing information table, (b) when the type of the video data is the three-dimensional video data and the sink device does not support the HDMI pass-through mode, the controller selects the first 3D detailed timing information table, and (c) when the type of the video data is the three-dimensional video data and the sink device supports the HDMI pass-through mode, the controller selects the second 3D detailed timing information table, and wherein the controller refers to a selected detailed timing information table based on the video format information identifier of the video data so as to decide parameters for generating one of the two-dimensional video frame data, the first combined video frame data and the second combined video frame data based on the video data, generates one of the two-dimensional video frame data, the first combined video frame data and the second combined video frame data based on the video data using decided parameters, and transmits a generated combined data to the sink device.

* * * * *